(12) United States Patent
He

(10) Patent No.: US 10,352,289 B1
(45) Date of Patent: Jul. 16, 2019

(54) HARVESTING ENERGY FROM WATER WAVES

(71) Applicant: Zhengxu He, Reno, NV (US)

(72) Inventor: Zhengxu He, Reno, NV (US)

(*) Notice: Subject to any disclaimer, the term of this patent is extended or adjusted under 35 U.S.C. 154(b) by 8 days.

(21) Appl. No.: 15/892,640

(22) Filed: Feb. 9, 2018

(51) Int. Cl.
*F03B 13/18* (2006.01)
*F03B 11/06* (2006.01)

(52) U.S. Cl.
CPC .......... *F03B 13/1815* (2013.01); *F03B 11/06* (2013.01); *F03B 13/181* (2013.01); *Y02E 10/38* (2013.01)

(58) Field of Classification Search
CPC .... F03B 13/181; F03B 13/1815; F03B 13/16; F03B 13/18; F03B 13/1805; F03B 13/1845; F03B 13/1885; F03B 13/189; F03B 13/1895; F03B 11/06; Y02E 10/38
See application file for complete search history.

(56) References Cited

U.S. PATENT DOCUMENTS

| | | | | |
|---|---|---|---|---|
| 1,540,364 A | * | 6/1925 | Roldan | F03B 13/1815 60/505 |
| 3,259,361 A | * | 7/1966 | Cantu | F03B 13/1815 60/505 |
| 4,013,382 A | * | 3/1977 | Diggs | F03B 13/1815 417/332 |
| 4,319,454 A | * | 3/1982 | Lucia | F03B 13/1815 417/332 |
| 4,792,290 A | * | 12/1988 | Berg | F03B 13/1815 417/332 |
| 2003/0110767 A1 | * | 6/2003 | Lee | F03B 13/1815 60/495 |
| 2003/0167765 A1 | * | 9/2003 | Hansen | F03B 13/1815 60/495 |

(Continued)

FOREIGN PATENT DOCUMENTS

| | | | | |
|---|---|---|---|---|
| DE | 4129180 A1 | * | 3/1993 | .......... F03B 13/1815 |
| DE | 102006043306 A1 | * | 3/2008 | ............ F03B 13/181 |

(Continued)

*Primary Examiner* — Mark A Laurenzi
*Assistant Examiner* — Xiaoting Hu

(57) ABSTRACT

The present application discloses an energy harvesting system for harvesting energy from water waves, such as ocean waves. The energy harvesting system comprises: a base rotational mechanism comprising a first shaft and a positive rotational direction about the axis of the first shaft; an electricity generator configured to generate electricity from the rotation of the first shaft in the positive rotational direction; and a plurality of rotation driving apparatuses. Each rotation driving apparatus comprises a freewheel mechanism whose axis of rotation is the same as the axis of the first shaft, a swing component which may make a two-way rotation of limited angular range, a floating component comprising a buoy which is connected to an of the swing component, and a spring or weight which directly or indirectly exerts a force on the swing component. The floating component of a rotation driving apparatus may be pushed up by a rising water wave, and at the same time, energy may be stored by the spring or the weight. When water level recedes, the spring or the weight may release its stored energy and may force a rotational part of the freewheel mechanism to rotate in the positive rotational direction.

18 Claims, 47 Drawing Sheets

(56) References Cited

U.S. PATENT DOCUMENTS

| | | | | |
|---|---|---|---|---|
| 2006/0028026 A1* | 2/2006 | Yim | ................... | F03B 13/1815 |
| | | | | 290/53 |
| 2008/0164699 A1* | 7/2008 | Vieira | ................. | F03B 13/1815 |
| | | | | 290/54 |
| 2009/0021017 A1* | 1/2009 | Steenstrup | .......... | F03B 13/1815 |
| | | | | 290/53 |
| 2011/0316280 A1* | 12/2011 | Khesali | ............... | F03B 13/1815 |
| | | | | 290/53 |

FOREIGN PATENT DOCUMENTS

| | | | | | |
|---|---|---|---|---|---|
| WO | WO-2010043735 A1 | * | 4/2010 | .............. | F03B 13/14 |
| WO | WO-2015181402 A1 | * | 12/2015 | .......... | F03B 13/1815 |

* cited by examiner

HARVESTING ENERGY FROM WATER WAVES

CROSS-REFERENCE TO RELATED APPLICATIONS

Background of the Invention

The present application relates to systems for the purpose of harvesting energy from water waves, such as ocean waves, in the nature.

BRIEF SUMMARY OF THE INVENTION

An energy harvesting system comprises: a base support component configured to be connected to the ground; a base rotational mechanism comprising a first mating part, a second mating part and a connection configured to constrain the two mating parts to a rotation around a base axis. The second mating part of the base rotational mechanism is configured to be fixedly or otherwise connected to the base support component. The energy harvesting system also comprises a rotational direction around the base axis, referred to as the positive rotational direction; the rotational direction which is opposite to the positive rotational direction is referred to as the negative rotational direction. The energy harvesting system may further comprise an electricity generation mechanism configured to generate electricity from the rotational motion of the first mating part relative to the second mating part in the base rotational mechanism.

The energy harvesting system also comprises a plurality of rotation driving apparatuses. Each rotation driving apparatus comprises: a bearing housing; a freewheel mechanism (usually comprising a one-way freewheel clutch bearing) configured to join the bearing housing and the first mating part of the base rotational mechanism, so that the bearing housing may freely rotate relative to the first mating part of the base rotational mechanism around the base axis in the negative rotational direction, and the rotation of the bearing housing relative to the first mating part of the base rotational mechanism in the positive rotational direction around the base axis is restricted or limited; a rigid component which is mounted on the base support component; a rotatable component configured to be rotatable relative to the rigid component around an axis; a floating component configured to be floated on water (e.g., water in an ocean, lake or river) in the nature; a connection joining the floating component and the rotatable component so that a movement of the floating component may induce a movement in the rotatable component; a connection joining the bearing housing and the rotatable component so that a movement in the rotatable component may induce a movement in the bearing housing.

The energy harvesting system also comprises a lubrication system comprising: a sealed enclosure comprising an inlet and an outlet, wherein the sealed enclosure is configured to wrap parts of the freewheel mechanisms of the rotation driving apparatus, wherein interior of the sealed enclosure is configured to hold a certain amount of lubricating liquid; a pump is configured to pump lubricating liquid through a sequence of connected pipes, from a bottom outlet of the sealed enclosure into a top opening of the sealed enclosure; a refrigeration mechanism is configured to cool the lubricating liquid as the lubricating liquid flows through the sequence of pipes; a filter is configured to filter impurities of the lubricating liquid as the lubricating liquid flows through the pipes. The lubrication system may also comprise a liquid level sensor in the interior of the sealed enclosure, wherein the liquid level sensor is configured to monitor the level of the lubricating liquid in the sealed enclosure. The lubrication system may also comprise a temperature sensor which is configured to detect the temperature of the lubricating liquid in the sealed enclosure. The lubricating liquid is configured to lubricate and cool the freewheel mechanisms and bearings in the energy harvesting system. A computer may be configured to control the lubrication system.

It should be noted that except water waves which changes water level in every second at each location, the average water level over a region may rise or fall, e.g. forming periodic tides, especially in case of ocean water. Implementations of our system may include one or more of the following. The base support component may be configured to rise and fall with tide. In fact, the base support component may optionally be configured to float on water. On the other hand, the base support component may be connected to the ground by cables, ropes, chains, and/or other devices, so that the base support component does not move too far away from an original position.

Implementations of our system may include one or more of the following. The first mating part of the base rotational mechanism may be a shaft whose axis coincides with the base axis, and the second mating part of the base rotational mechanism may be a plurality of bearing housings which are mounted on the base support component; and the connection in the base rotational mechanism may comprise a plurality of bearings and accessories. Alternatively, the first mating part of the base rotational mechanism may comprise a bearing housing in which case the second mating part of the base rotational mechanism may comprise a shaft, and the connection constraining the relative motion of the first and second mating part may comprise a plurality of bearings and accessories.

The base axis may be configured to be horizontal or nearly horizontal, though this is not a requirement.

Our energy harvesting system may comprise wires or cables of various sizes, chains, ropes, hooks, universal joints or other types of joints, etc., configured to reinforce or stabilize various components, mechanisms, apparatuses, or their connections.

These and other aspects, their implementations and other features are described in detail in the drawings, the description and the claims.

DETAILED DESCRIPTION OF THE INVENTION

The present application discloses energy harvesting systems capable of generating electricity from water waves, especially ocean waves.

For the purpose of the present patent application, an axial rotational mechanism, abbreviated a "rotational mechanism," refers to a mechanism comprising two mating parts and a connection configured to constrain the relative motion of the mating parts to an axial rotation; wherein the axis of the rotation is fixed relative to each of the mating parts. The two mating parts are not required to touch each other.

It should be noted here that the mating parts of an axial rotational mechanism are not required to touch each other. The mating parts of a rotational mechanism can be a rigid component of any shape, or of any material.

For the purpose of the present patent application, a bearing housing is a pedestal or other solid used to provide support for a rotating shaft with help of compatible bearings and various accessories. In the case the rotating shaft has an axis, the axis of the rotating shaft may be called the axis of the bearing housing. The bearings and various accessories together form a connection of the shaft and the bearing housing; and the connection constrains the relative motion of the shaft and bearing housing to an axial rotation. If so, the shaft and the bearing housing form the two mating parts of a rotational mechanism, and the bearings and various accessories together form the connection of the rotational mechanism. It should be noted that the two mating parts of a rotational mechanism may or may not touch each other.

For the purpose of the present patent application, a shaft always comprises an axis.

Our first energy harvesting system, its components and sub-systems will be described in detail in FIGS. 1A-18G.

Figure 1A:
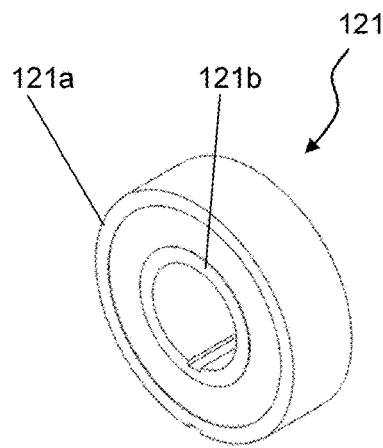
FIG. 1A shows an aerial view of a one-way freewheel clutch bearing.

Referring to FIG. 1A, a one-way freewheel clutch bearing 121 comprises an outer ring 121a, an inner ring 121b and a connection configured to constrain the movement of the outer ring 121a relative to the inner ring 121b to a one-way rotation around the axis of the ring 121a (as viewed in the figure). In our application, the inner ring 121b may freely rotate relative to the outer ring 121a in the counter-clockwise direction around the axis of the ring 121a; but the rotation of the inner ring 121b relative to the outer ring in the clockwise direction is restricted.

In some applications, the one-way freewheel clutch bearing 121 may be a sprag clutch.

Figure 1B:
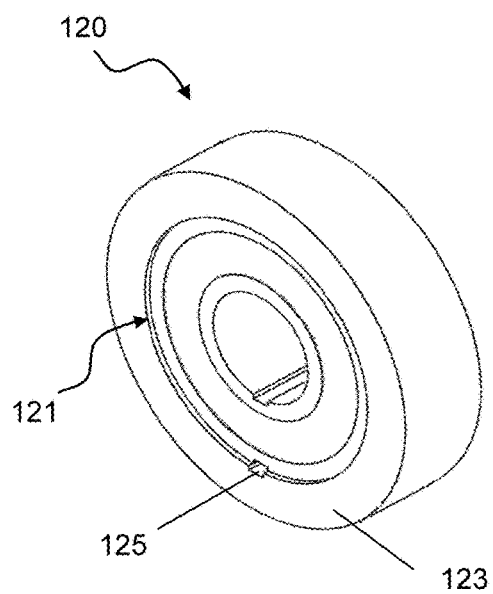
FIG. 1B shows an aerial view of a freewheel mechanism.

Referring to FIG. 1B, a freewheel mechanism 120 comprises a bearing housing 123 and a one-way freewheel clutch bearing 121, wherein the outer ring 121a of the one-way freewheel clutch bearing 121 is fixedly connected with and concentric with the bearing housing 123, wherein the connection of the outer ring 121a and the bearing housing 123 comprises a key 125 wherein the key 125 is configured to prevent a relative rotation between the outer ring 121a and the bearing housing 123. Thus, the bearing housing 123 is free to rotate in the clockwise direction relative to the inner ring 121b of the one-way freewheel clutch bearing 121.

The bearing housing 123 in the freewheel mechanism 120 is referred to as the first mating part of the freewheel mechanism. The inner ring 121b of the one-way freewheel clutch bearing 121 in the freewheel mechanism 120 is referred to as the second mating part of the freewheel mechanism.

Figure 1C:
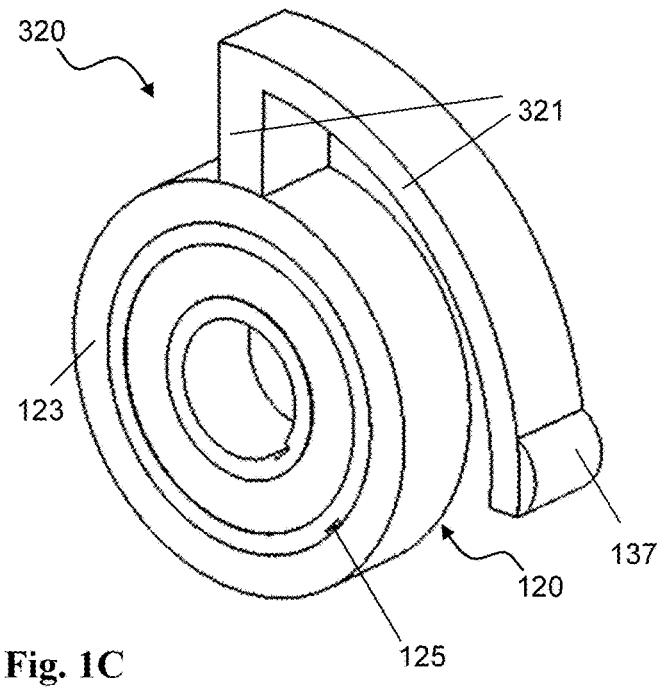
FIG. 1C shows an aerial view of a freewheel mechanism.

Referring to FIG. 1C, a freewheel mechanism 320 comprises a freewheel mechanism 120, a connector 137, and a rigid component 321 which rigidly connects the connector 137 to the bearing housing 123 of the freewheel mechanism 120. The rigid component 321 is referred to as the first mating part of the freewheel mechanism 320; and the inner ring 121b of the one-way freewheel clutch bearing 121 is referred to as the second mating part. The first mating part is free to rotate in the clockwise direction relative to the second mating part in the freewheel mechanism. The first mating part is restricted or prohibited to rotate in the counter-clockwise direction relative to the second mating part.

Figure 2A:
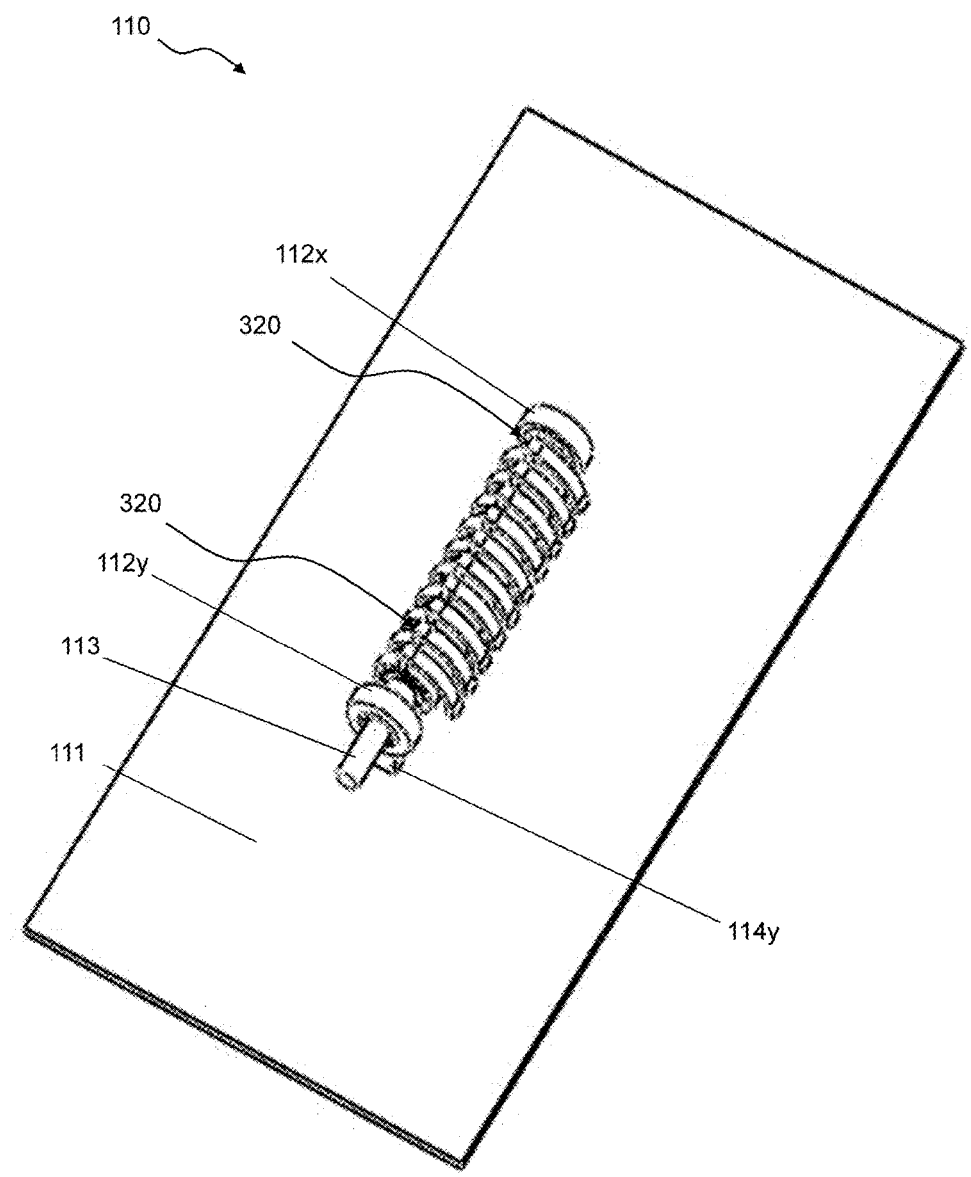
FIG. 2A shows an aerial view of a base apparatus.
Figure 2B:
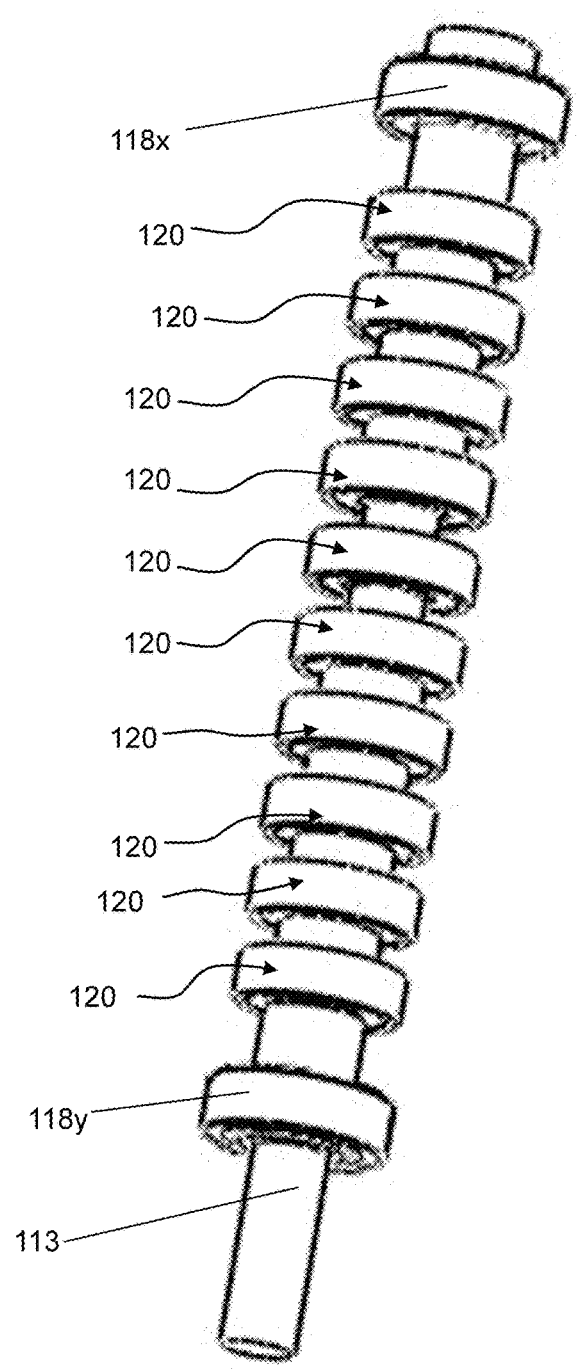
FIGS. 2B-2E show aerial views of parts of the base apparatus.
Figures 2C, 2D:
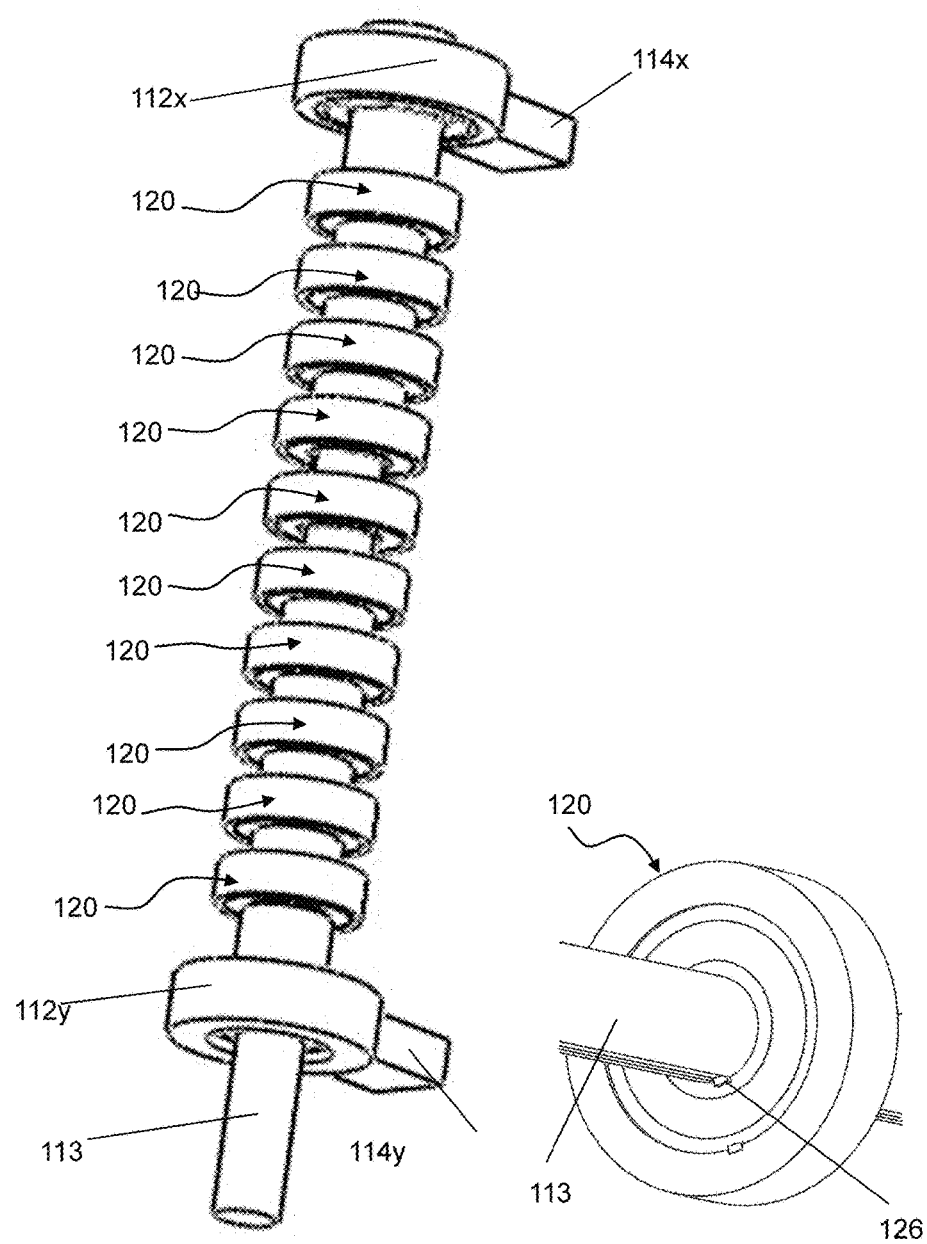
Figure 2E:
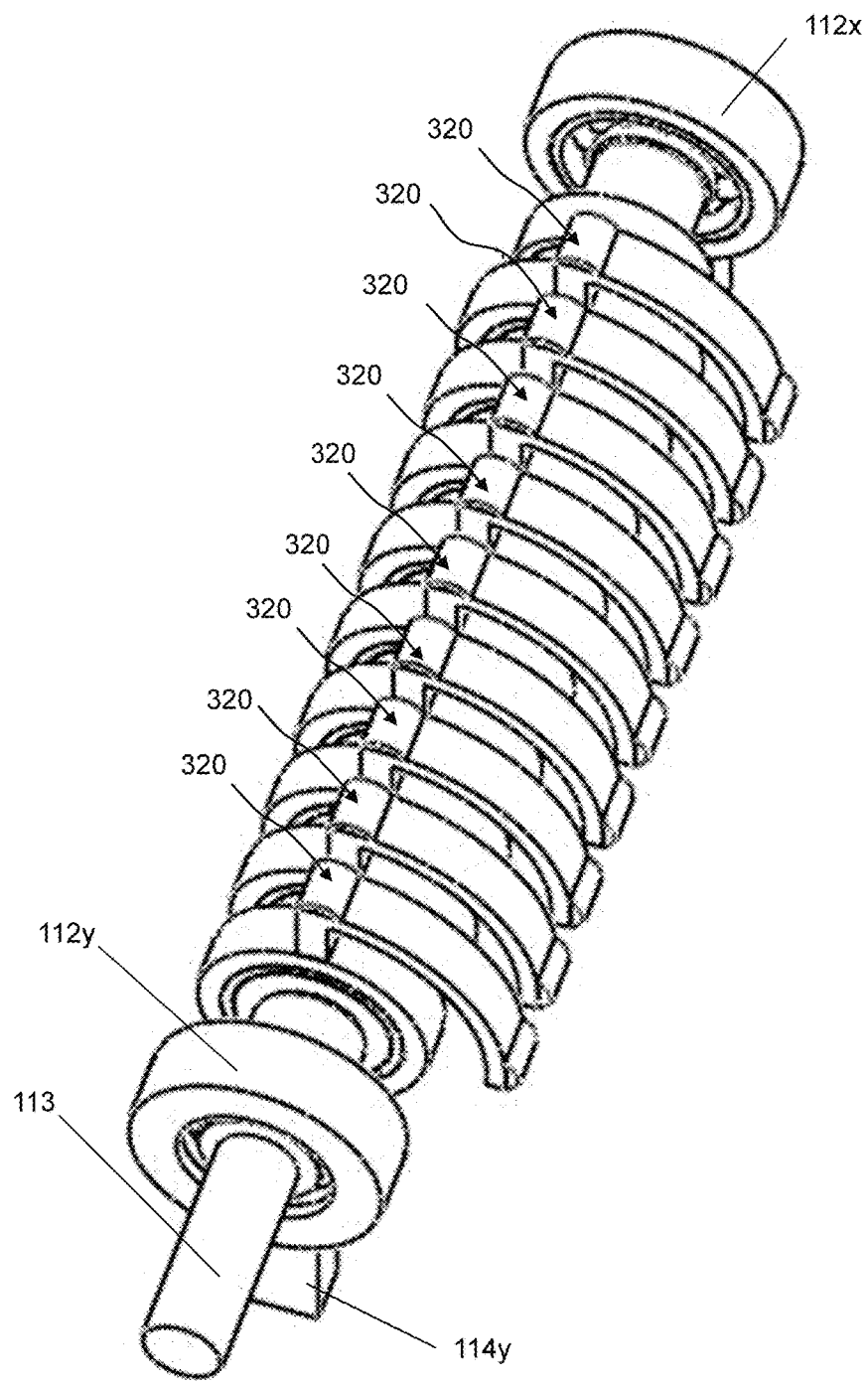

Referring to FIGS. 2A-2E, a base apparatus 110 comprises: a base support component 111 configured to float on water in an ocean, river or lake; a base rotational mechanism comprising a shaft 113 as a first mating part, a pair of bearing housings 112x, 112y as a second mating part, and a connection (comprising bearings 118x, 118y and accessories) configured to constrain the movement of the shaft 113 relative to the bearing housings 112x, 112y to a rotation around the axis of the shaft 113. The axis of the shaft 113 is referred to as the base axis. The two bearing housings 112x, 112y are rigidly connected to the base support component 111 via connectors 114x, 114y. The counter-clockwise direction of the rotation of the shaft 113 (around the base axis) as viewed in FIG. 2A is chosen to be the positive rotational direction; and the clockwise direction of the rotation of the shaft 113 as viewed in FIG. 2A is referred to as the negative rotational direction. The base apparatus 110 also comprises a plurality of freewheel mechanisms 320. The inner ring 121b of each one-way freewheel clutch bearing 121 in each freewheel mechanism 320 is fixedly connected and concentric with the shaft 113, wherein the connection of the inner ring 121b and the shaft 113 comprises a key 126 wherein the key 126 is configured to prevent a relative rotation between the inner ring 121b and the shaft 113 (see FIG. 2D). The first mating part of each freewheel mechanism 320 is free to rotate in the negative rotational direction relative to the second mating part in the freewheel mechanism 320; and the first mating part is restricted or prohibited to rotate in the positive rotational direction relative to the second mating part.

The shaft 113 will be referred to as a first shaft for our energy harvesting system.

Figure 3A:
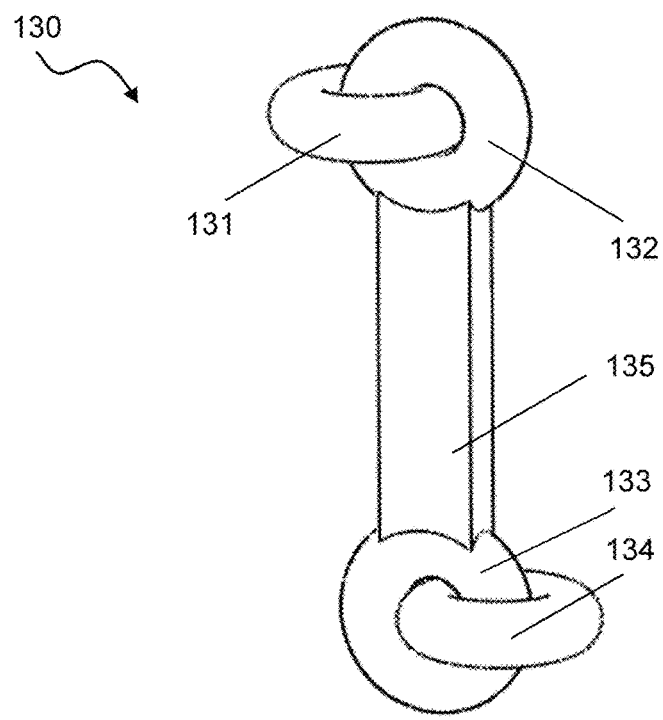
FIG. 3A shows an aerial view of a connection mechanism.

Referring to FIG. 3A, a connection sub-mechanism 130 comprises: a pair of rings 132 and 131 which are linked or hooked to each other; a pair of rings 133 and 134 which are linked or hooked to each other; a rigid connector 135 configured to rigidly join to rings 132 and 133. The pair of rings 132 and 131 may be moved relative to each other in a limited way, as they stay linked or hooked. Similarly, the pair of rings 133 and 134 may be moved relative to each other in a limited way, as they stay linked or hooked.

It should be noted that the rings 131, 132, 133 and 134 may be configured to have other geometric shapes. A cross section of each of the rings may be configured to be round, oval, polygonal, etc.

Figure 3B:
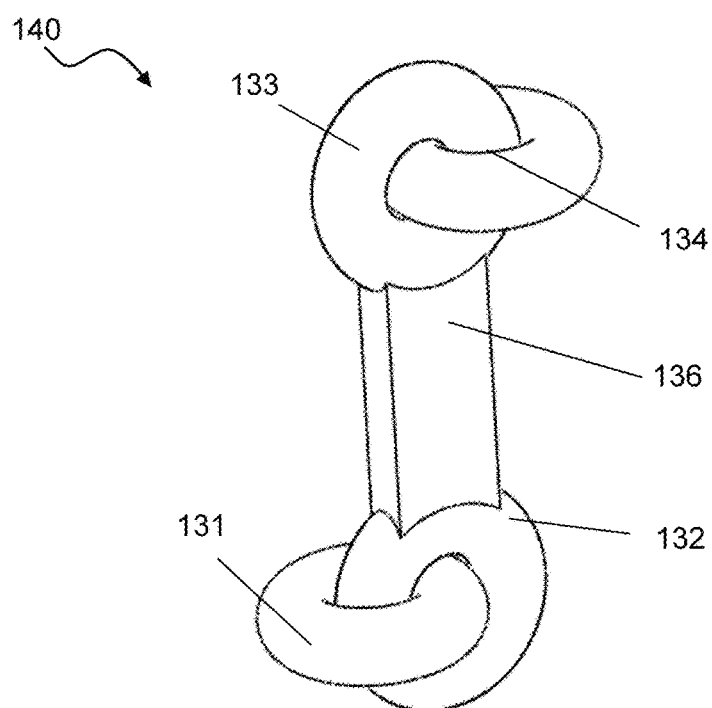
FIG. 3B shows an aerial view of a connection mechanism.

Referring to FIG. 3B, a connection sub-mechanism 140 comprises: a pair of rings 132 and 131 which are linked or hooked to each other; a pair of rings 133 and 134 which are linked or hooked to each other; a rigid connector 136 configured to rigidly join to rings 132 and 133.

It should be noted that the connection sub-mechanism 130 is similar to the connection sub-mechanism 140, except that the connector 135 in 130 may have a different length than the connector 136 in 140.

Figure 4A:
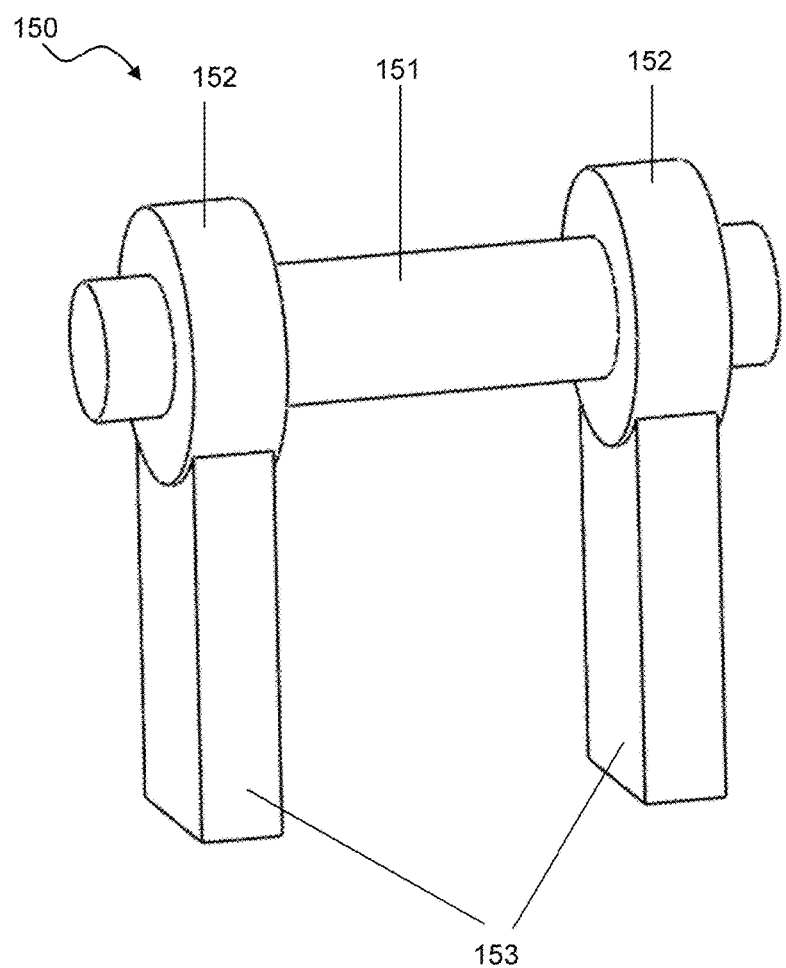
FIG. 4A shows an aerial view of a rotational mechanism.

Referring to FIG. 4A, a rotational mechanism 150 comprises a shaft 151, a pair of bearing housings 152 and a connection of the shaft 151 and the bearing housings 152, wherein the said connection is configured to constrain the movement of the shaft 151 relative to the bearing housings 152 to a rotation around the axis of the shaft 151. The rotational mechanism 150 further comprises rigid components 153 configured to be rigidly connected with the bearing housings 152. The bearing housings 152 will be referred to as a mating part of the shaft 151.

It should be noted that the bearing housings 152 and the corresponding rigid component 153 in the rotational mechanism 150 may be combined into a single rigid part.

Figure 4B:
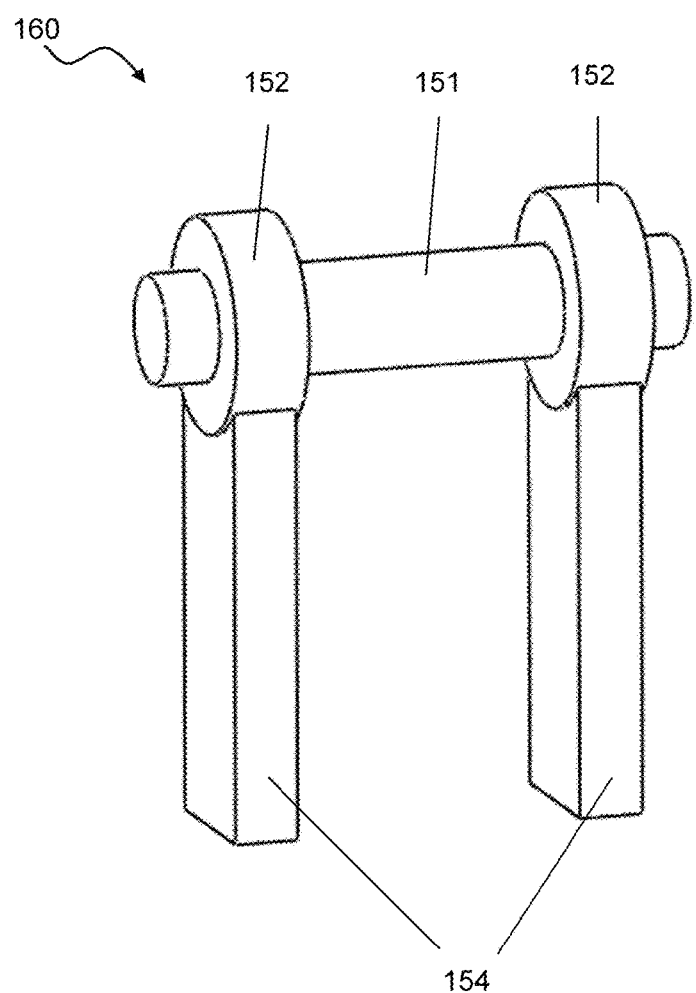
FIG. 4B shows an aerial view of a rotational mechanism.

Referring to FIG. 4B, a rotational mechanism 160 comprises a shaft 151, a pair of bearing housings 152 and a connection of the shaft 151 and the bearing housings 152, wherein the said connection is configured to constrain the movement of the shaft 151 to a rotation relative to the bearing housings 152 around the axis of the shaft 151. The rotational mechanism 150 further comprises rigid components 154 configured to be rigidly connected with the bearing housings 152. The bearing housings 152 will be referred to as a mating part of the shaft 151.

It should be noted that the bearing housings 152 and the corresponding rigid component 154 in the rotational mechanism 160 may be combined into a single rigid part.

It should be noted that the rotational mechanism 160 is similar to the rotational mechanism 150, except that the rigid component 154 in the mechanism 160 may have a different length than the rigid component 153 in the mechanism 150.

Figure 5:
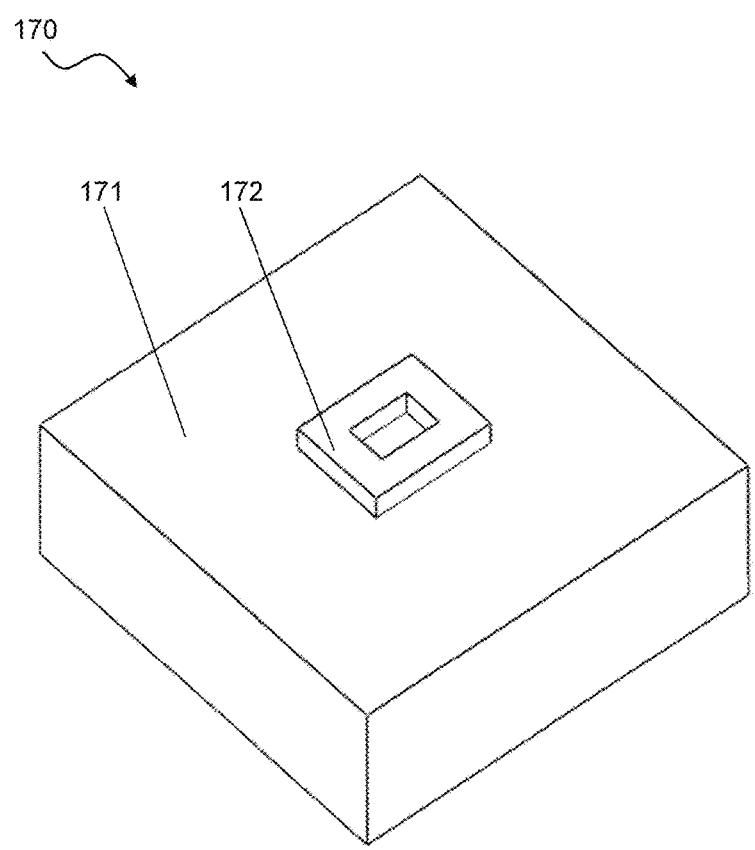
FIG. 5 shows an aerial view of a floating device.

Referring to FIG. 5, a floating device 170 comprises a floating component 171 configured to float on water, and a connector 172 which is fixedly joined with the floating component 171. The floating component 171 comprises a buoy.

Figure 6A:
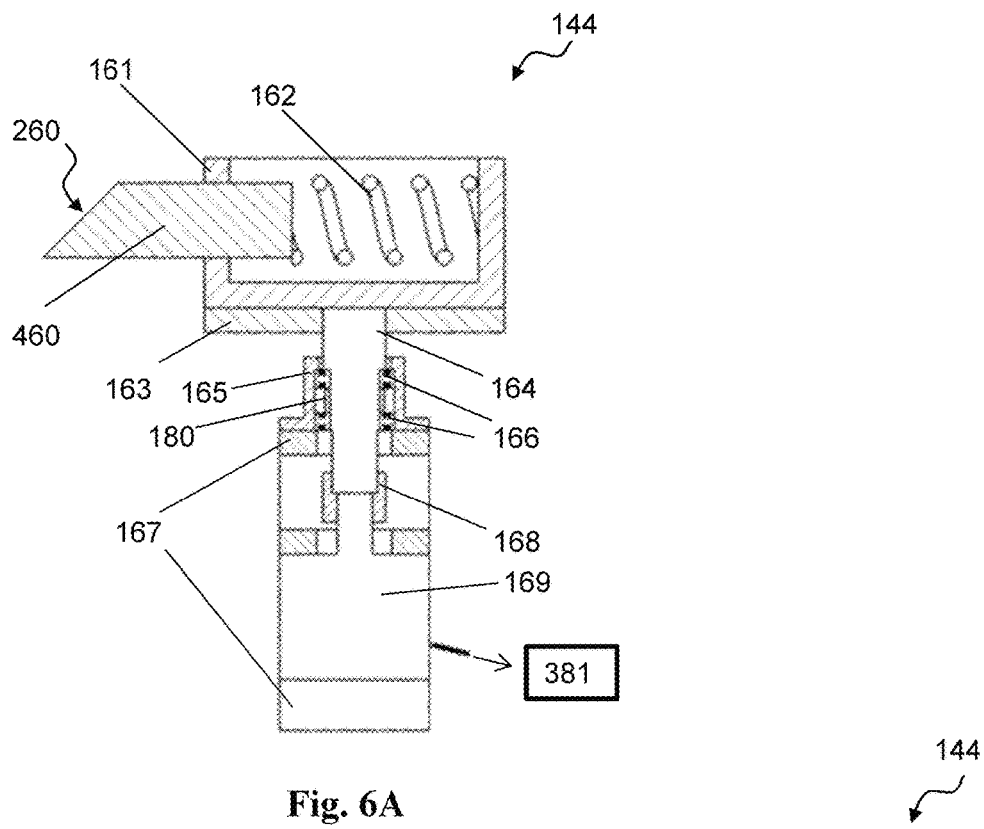
FIG. 6A shows a cut view of a locking mechanism.
Figure 6B:
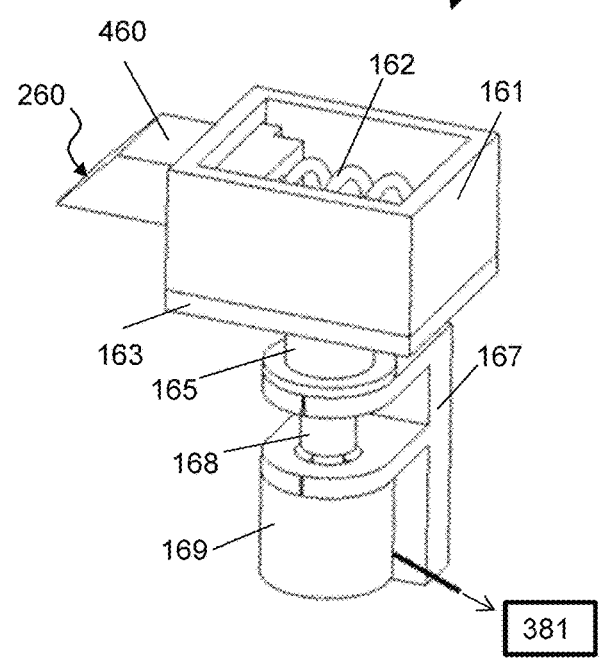
FIG. 6B shows an aerial view of the locking mechanism.
Figure 7:
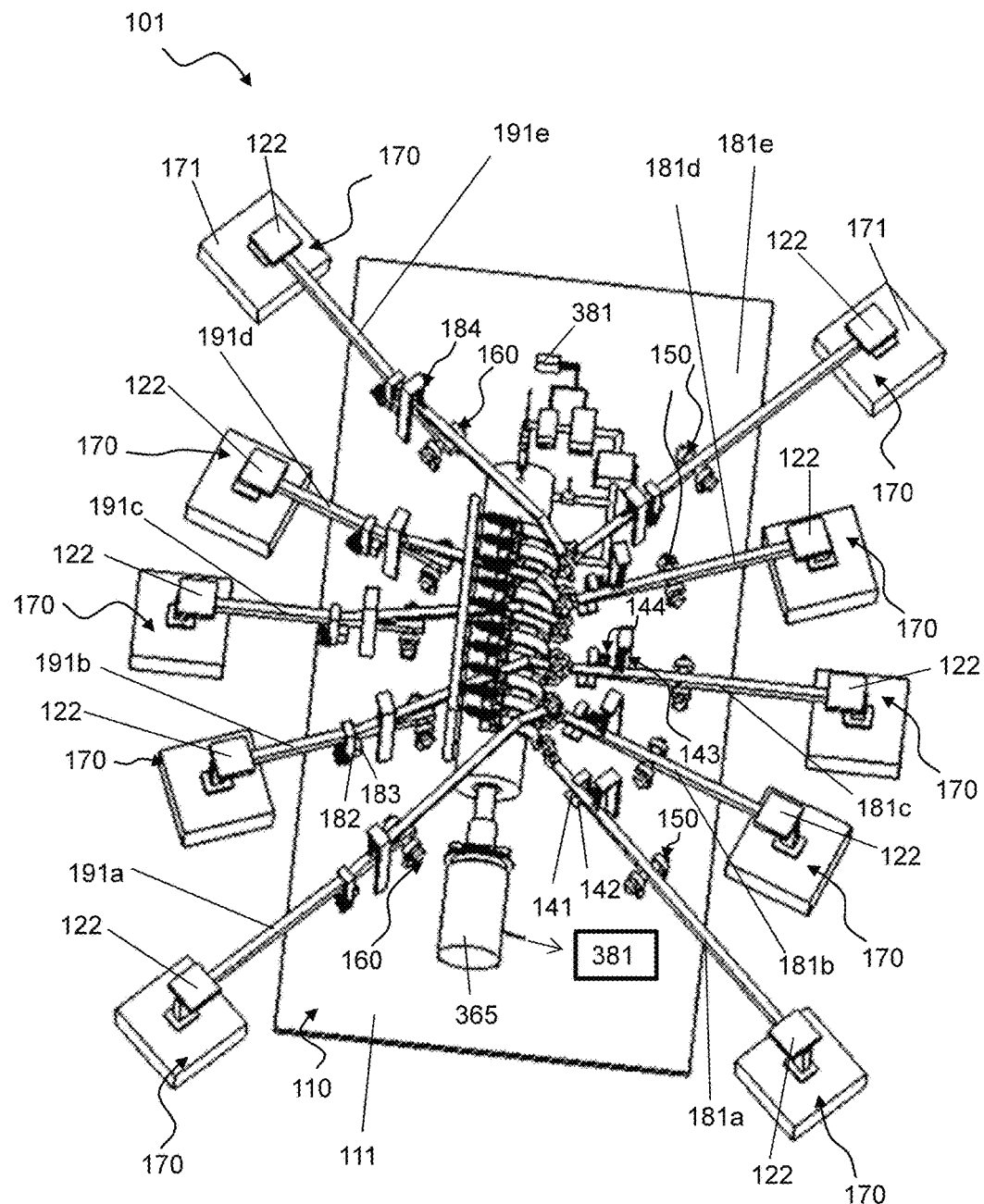
FIG. 7 shows an aerial view of an energy harvesting sub-system.
Figure 8:
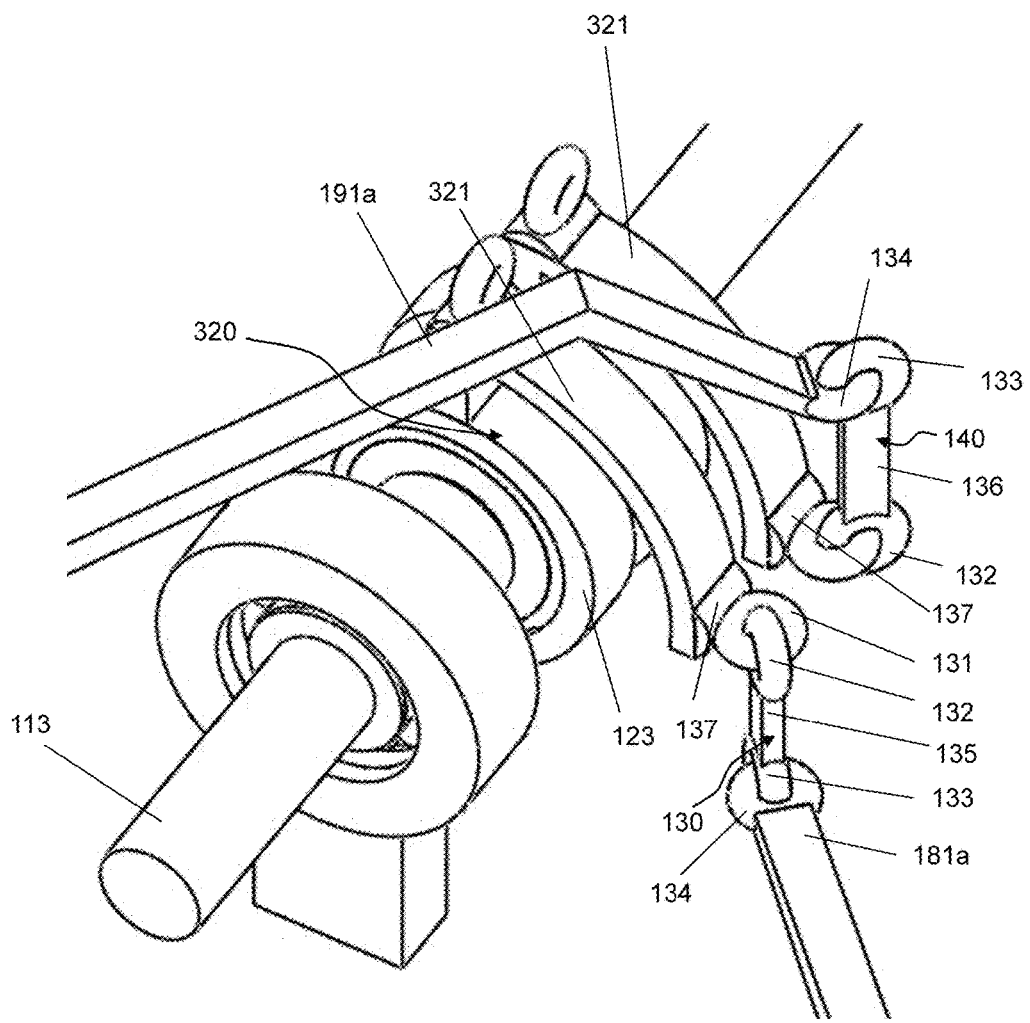
FIGS. 8-12 show aerial views of parts of the energy harvesting sub-system.
Figure 9:
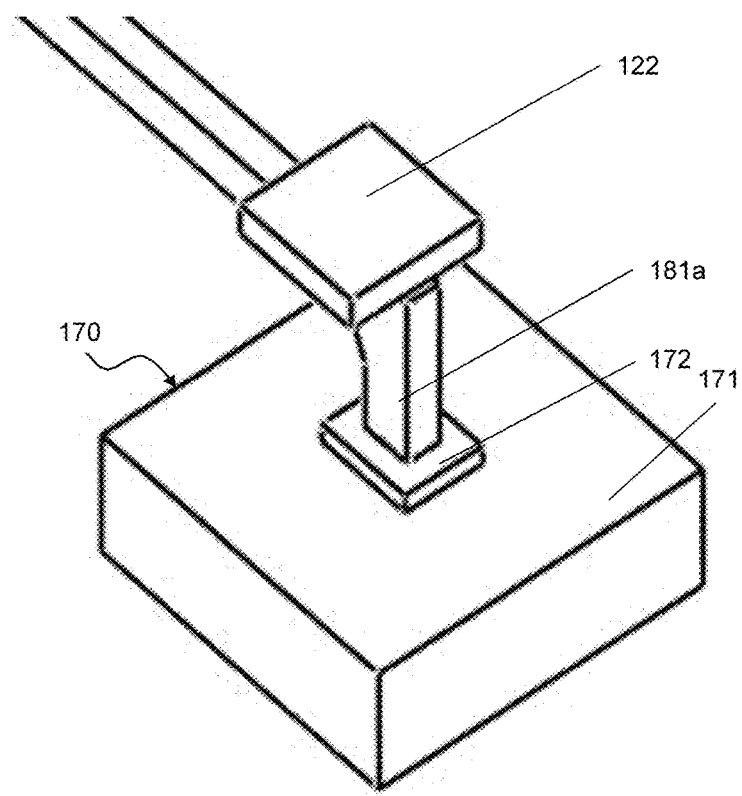

As shown in FIGS. 6A-6B, a locking mechanism 144 comprises a sliding component 460, a rigid component 161 comprising a box with holes, a spring 162, a first support component 163, a shaft 164, a bearing housing 165, a pair of bearings 166, a second support component 167, a coupling 168, a sleeve 180, and a motor 169 comprising a shaft and a base component. The sliding component 460 is configured to move linearly relative to the rigid component 161, in a horizontal direction (to left or to right, as seen in FIG. 6A); and the linear movement is configured to be limited between two end-positions. The sliding component 460 is pushed by the spring 162 to move to the left, as seen in FIG. 6A. The sliding component 460 also has a bevel face 260, on the left end as seen in FIG. 6A. The spring 162 is positioned in the box of the rigid component 161. The rigid component 161 is rigidly connected to the support component 163. The support component 163 is rigidly connected to the shaft 164, and the shaft 164 has a vertical axis. The pair of bearings 166 are configured to connect the shaft 164 and the bearing housing 165, so that the shaft 164 is constrained to be rotated relative to the bearing housing 165 around the axis of the shaft 164. The support component 167 is configured to be rigidly connected to the bearing housing 165. The base component of the motor 169 is configured to be connected to the support component 167. The shaft of the motor 169 is connected to the shaft 165 by the coupling 168. The motor 169 may drive the rotation of the shaft 165, together with the first support component 163, the rigid component 161, and the sliding component 460, around the vertical axis of the shaft 165. The rotation of the first support component 163 is configured to be between a first end-position and a second end-position. The motion driven by the motor 169 is used to put the locking mechanism in or out of use.

The sliding component 460 may also be referred to as a locking device of the locking mechanism 144.

For the purpose of present patent application, two components are said to be elastically connected to each other, if they are connected by a third component which may be elastically deformed; wherein the third component may comprise a plurality of rigid or elastic components which are bolted, or welded, or glued together.

Referring to FIGS. 7-12, an energy harvesting sub-system 101 comprises: a base apparatus 110, a plurality of floating devices 170, a plurality of rotational mechanisms 150 and 160, a plurality of connection sub-mechanisms 130 and 140, swing components 181a, 181b, 181c, 181d, 181e, 191a, 191b, 191c, 191d and 191e, and a computer 381. The rigid components 153 and 154 in the rotational mechanisms 150 and 160 are all rigidly or elastically connected to the base support component 111 in the base apparatus 110. The ring 131 in each of the connection sub-mechanisms 130 and 140 is rigidly joined with the rigid component 321 of a corresponding freewheel mechanism 320 by the connector 137 (see FIG. 8). That implies that there is one-to-one correspondence between the connection sub-mechanisms 130 and 140 and the freewheel mechanisms 320. As explained, one end of each of the swing components 181a, 181b, 181c, 181d and 181e is rigidly connected to the ring 134 of the corresponding connection sub-mechanism 130. That implies that there is a one-to-one correspondence between the connection sub-mechanisms 130 and the swing components 181a, 181b, 181c, 181d and 181e. And the other end of the swing component 181x is rigidly connected to the connector 172 of the corresponding floating device 170 (see FIG. 9), where "x" denotes one of the symbols a, b, c, d, and e. A middle part of each of the swing components 181a, 181b, 181c, 181d and 181e is rigidly connected to the shaft 151 of the corresponding rotational mechanism 150 (see FIGS. 10A-10B).

Similarly, an end of each of the swing components 191a, 191b, 191c, 191d and 191e is rigidly connected to the ring 134 of the corresponding connection sub-mechanism 140

(see FIG. 8); and the other end of the swing component 191x is rigidly connected to the connector 172 of the corresponding floating device 170 (see FIGS. 11A-11B), where "x" denotes one of the symbols a, b, c, d, and e. A middle part of each of the swing components 191a, 191b, 191c, 191d and 191e is rigidly connected to the shaft 151 of the corresponding rotational mechanism 160 (see FIGS. 11A-12).

The axis of the shaft 151 of each rotational mechanism 150 is configured to be different than the axis of the shaft 113 in the base apparatus 110. The swing components 181a, 181b, 181c, 181d, 181e, 191a, 191b, 191c, 191d and 191e may be configured to be relatively long. They may be configured to be durable. The bearing housings 152 are configured to be rigidly or elastically connected to the base support component 111.

The swing component 181x or 191x and the corresponding shaft 151 are rigidly connected to each other, where x denotes one of the symbols a, b, c, d, and e. Thus, they may be combined into a single rigid component, and the single rigid component may be referred to as a rotatable component. The rotatable component is constrained to rotate relative to the bearing housings 152 around the axis of the shaft 151.

Figure 10A:
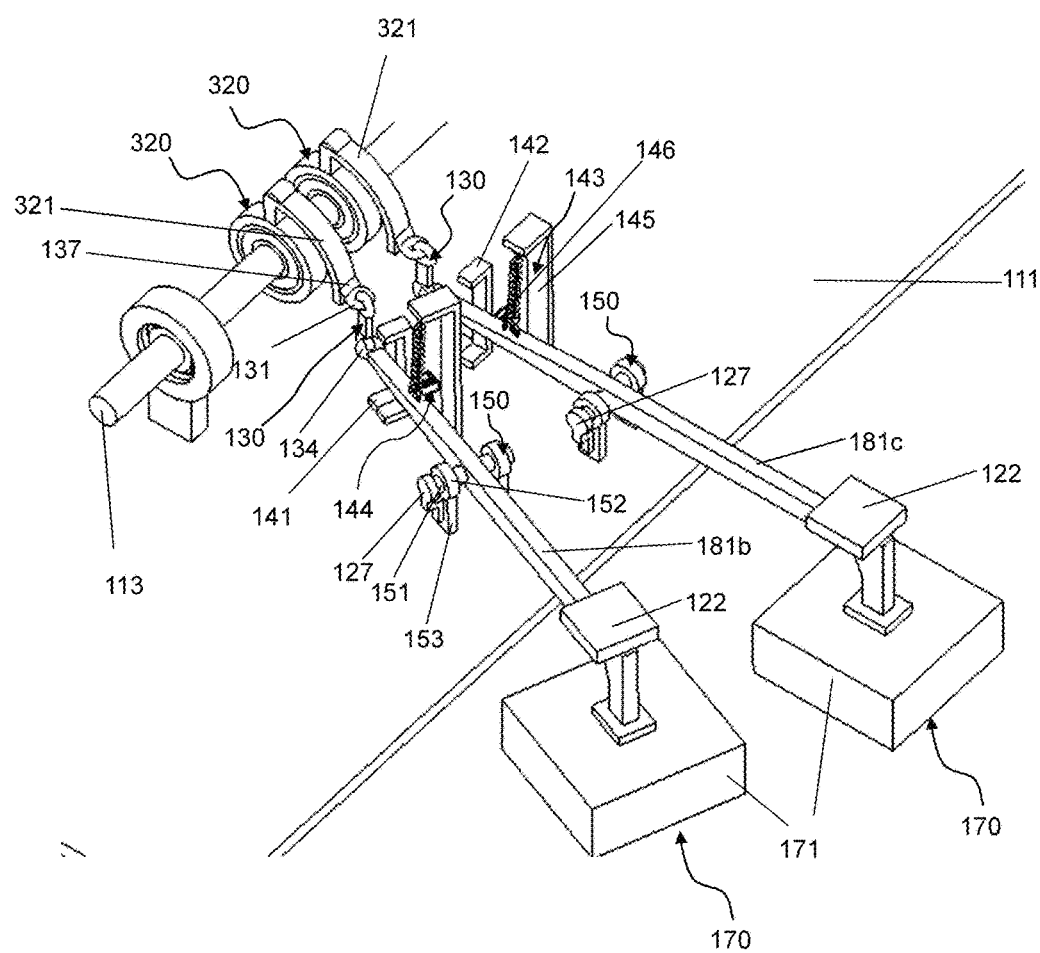
Figure 10B:
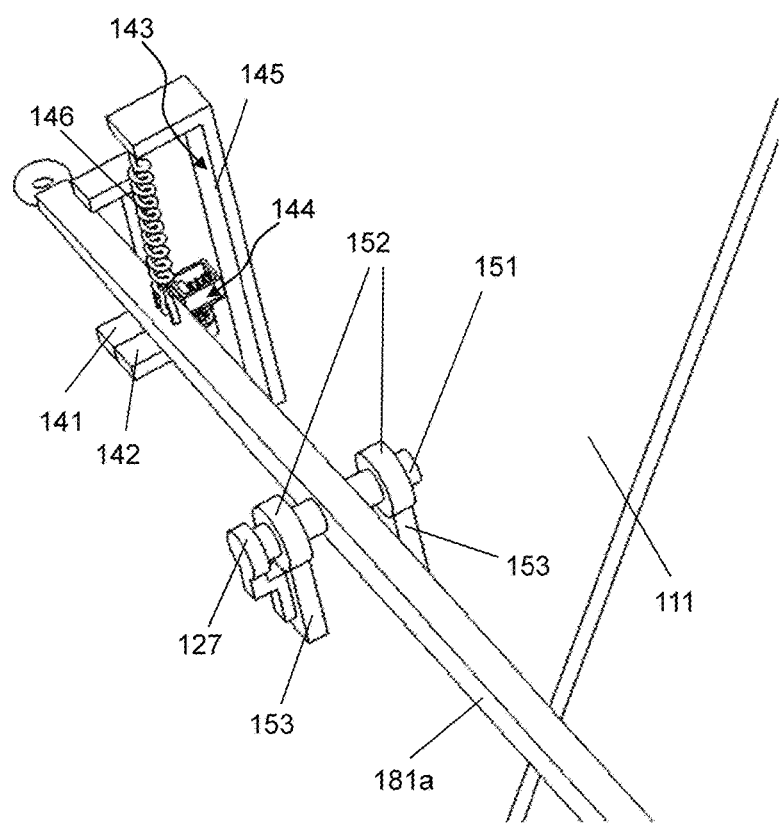

As shown in FIGS. 10A-10B, as part of the energy harvesting sub-system 101, a rotation driving apparatus of type I comprises the freewheel mechanism 320, the corresponding connection sub-mechanism 130, the corresponding rotational mechanism 150, the corresponding floating device 170, and the corresponding swing component 181x (where x may be one of the letters a, b, c, d and e). As explained, one end of the swing component 181x is rigidly connected to the ring 134 of the corresponding connection sub-mechanism 130; and the other end is rigidly connected to the connector 172 of the corresponding floating device 170; and a middle part of the swing component 181x is rigidly connected to the shaft 151 of the corresponding rotational mechanism 150. As explained, the connector 137 of the corresponding freewheel mechanism 320 is configured to be rigidly connected to the ring 131 of the corresponding connection sub-mechanism 130; and the inner ring 121b of the corresponding freewheel mechanism 320 is configured to be fixedly connected and concentric with the shaft 113.

Since the connection sub-mechanism 130 connects the connector 137 to an end of the corresponding swing component 181x in the rotational mechanism 150, the combination of the connectors 137 and 321, and the connection sub-mechanism 130 connects the end of the swing component 181x to the bearing housing 123 of the freewheel mechanism 320. The said combination may be referred to as a first connection of the rotation driving apparatus of type I. The connector 172, configured to connect the floating component 171 to the other end of the swing component 181x, may be referred to as a second connection of the rotation driving apparatus of type I.

The rotation driving apparatus of type I further comprises a limiting mechanism 142, an electromagnet 141, a spring device 143 comprising a rigid component 145 and a spring 146, the locking mechanism 144, and a weight 122 (see FIGS. 10A-10B). The limiting mechanism 142 comprises physical barriers for the corresponding swing component 181x, as to constrain the swing component 181x to rotate between two end-positions around the axis of the corresponding shaft 151. Thus, the swing components 181x may make a two-way rotation around the axis of the corresponding shaft 151. The physical barriers of the limiting mechanism 142 are configured to be rigidly or elastically connected to the base support component 111. The second support component 167 of the locking mechanism 144 is rigidly connected to the limiting mechanism 142, and hence connected to the base support component 111. The shaft of the motor 169 is fixedly connected to the shaft 164 by the coupling 168. Thus, the motor 169 may drive the rotation of the shaft 164 around the axis of the shaft 164. The motor 169 is connected to the computer 381 (see FIG. 10C). The swing components 181x comprises a ferromagnetic part, and the electromagnet 141 is rigidly connected to the limiting mechanism 142 and is configured to attract the ferromagnetic part of the swing component 181x when needed (see FIG. 10B). The electromagnet 141 may be controlled by the computer 381 so it may be turned on or off. The spring 146 is hooked onto the rigid component 145 which is rigidly or elastically connected to the base support component 111. The spring 146 is configured to be hooked onto the rigid component 145 and the swing component 181x, so that the spring 146 pulls (a part of) the swing component 181x upward. When the spring 146 pulls the swing component 181x, the corresponding floating component 171 must be configured to move in a downward direction, and at the same time, the rigid component 321 and the ring 123 of the corresponding freewheel mechanism 320 must be configured to rotate in the positive rotational direction around the axis of the shaft 113. The weight 122 is rigidly connected to the swing component 181x. The weight 122 forces the swing component 181x to rotate in a first rotational direction around the axis of the shaft 151; wherein the first rotational direction is in the clockwise direction around the axis of the corresponding shaft 151, as shown in FIG. 10A. In other words, the torque on the swing component 181x induced by the weight 122 is in the first rotational direction.

The connection comprising the spring device 143 and the connections of the spring device 143 to the corresponding swing component 181x and to the base support component 111 through the bearing housings 152 may be referred to as a third connection of the rotation driving apparatus of type I. The said third connection connects the swing component 181x to the base support component 111. The said third connection is configured to force the corresponding swing component 181x to rotate in the first rotational direction when the corresponding floating device 170 is above water level. In other words, the torque on the swing component 181x induced by the third connection is in the first rotational direction. The corresponding floating component 171 is configured to move in a downward direction when the corresponding swing component 181x rotates in the first rotational direction, and at the same time, the rotation of the corresponding swing component 181x in the first rotational direction is configured to induce a rotation of the second mating part of the corresponding freewheel mechanism 320 in the positive rotational direction around the axis of the first shaft 113 of the base rotational mechanism.

The weight 122 may be considered as an energy storage sub-apparatus of the rotation driving apparatus of type I, see FIG. 10A. When water level below the floating component 171 rises, the floating component 171 is pushed in an upward direction, and thus, the weight 122 is pushed in an upward direction, at which time the swing component 181x is rotated in the direction opposite to the first rotational direction. Potential energy is therefore stored as the weight 122 rises. When the water level recedes and the floating component 171 is no longer pushed by the water below, the weight 122 may drop down and may push the swing component 181x to rotate in the first rotational direction. The other end of the swing component 181x may then go up, thus pulling the first mating part 321 of the corresponding freewheel mechanism 320. The induced torque on the first mating part 321 of the freewheel mechanism 320 is in the positive rotational direction around the axis of the first shaft.

Similarly, the third connection comprising the spring device 143 may also be considered an energy storage sub-apparatus of the rotation driving apparatus of type I, also see FIG. 10A. When water level below the floating component 171 rises, the floating component 171 is pushed in an upward direction, and thus, the spring 146 is stretched, at which time the swing component 181x is rotated in the direction opposite to the first rotational direction. Potential energy is therefore stored as the spring 146 is stretched. When the water level recedes and the floating component 171 is no longer pushed by the water below, the spring 146 may un-stretch and may force the swing component 181x to rotate in the first rotational direction. The other end of the swing component 181x may then go up, thus pulling the first mating part 321 of the corresponding freewheel mechanism 320. The induced torque on the first mating part 321 of the freewheel mechanism 320 is in the positive rotational direction around the axis of the first shaft.

Figure 10C:
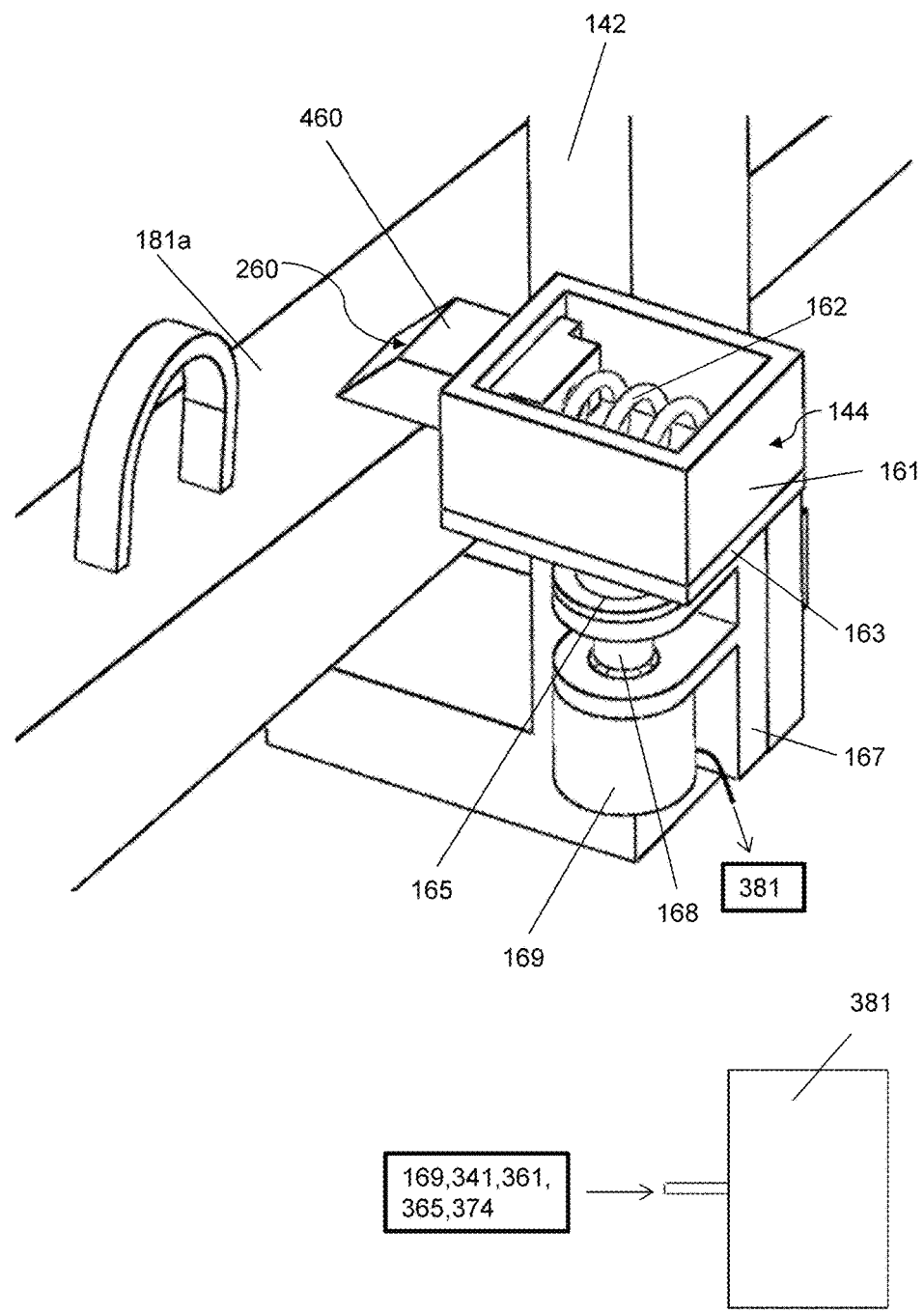

If the first support component 163 of the locking mechanism 144 is moved by the motor 169 to the first end-position, as shown in FIG. 10C, the sliding component 460 is configured to lock the swing component 181x when the floating component 171 is lifted to a sufficiently high position relative to the bearing housing 152. Then, the rotation of the swing component 181x may be stopped. This is needed when the system needs to be stopped during time periods when repairs are needed, or during time periods weather conditions are not desirable. When the first support component 163 is moved to the second end-position, the sliding component 460 is configured to not touch the swing component 181x, and thus does not interfere with the motion of the swing component 181x. We say that the locking mechanism 144 is turned on, if the first support component 163 is moved to the first end-position. We say that the locking mechanism 144 is turned off, if the first support component 163 is moved to the second end-position.

The electromagnet 141 may be turned on or off. When turned on, the electromagnet 141 may attract the swing component 181x by a large enough force, so that the floating component 171 may be lifted to a high position relative to the corresponding bearing housing 152. The electromagnet 141 may be used to stop the motion of the swing component 181x, when it is turned on. If the electromagnet 141 is turned off, then it has no magneticity and does not induce any force on the swing component 181x. The electromagnet 141 may thus function as another locking mechanism. The electromagnetic 141 may be switched on and off at the control of the computer 381, as explained earlier.

In the discussion of the paragraph here, we assume that the locking mechanism 144 and the electromagnet 141 are both turned off, so they do not interfere with the movements of the swing component 181x. When water level below the floating component 171 is receded so that the floating component 171 is entirely above the water level, the swing component 181x, the torque induced by the sum of all forces is configured to be in the first rotational direction around the axis of the corresponding shaft 151. In other words, the sum of the torques induced by all forces on the swing component 181x except the force originated from the force on the floating component 171 from the water is in the first rotational direction. Moreover, the magnitude of the torque must be at least equal to a significant percentage, at least 20%, of the maximal possible magnitude of the torque on the swing component induced by the floating component when the floating component is pushed in an upward direction by the water in the nature. This way, a significant amount of potential energy may be stored during time periods when a rising water level pushes the floating component 171 to move in an upward direction.

Figure 11A:
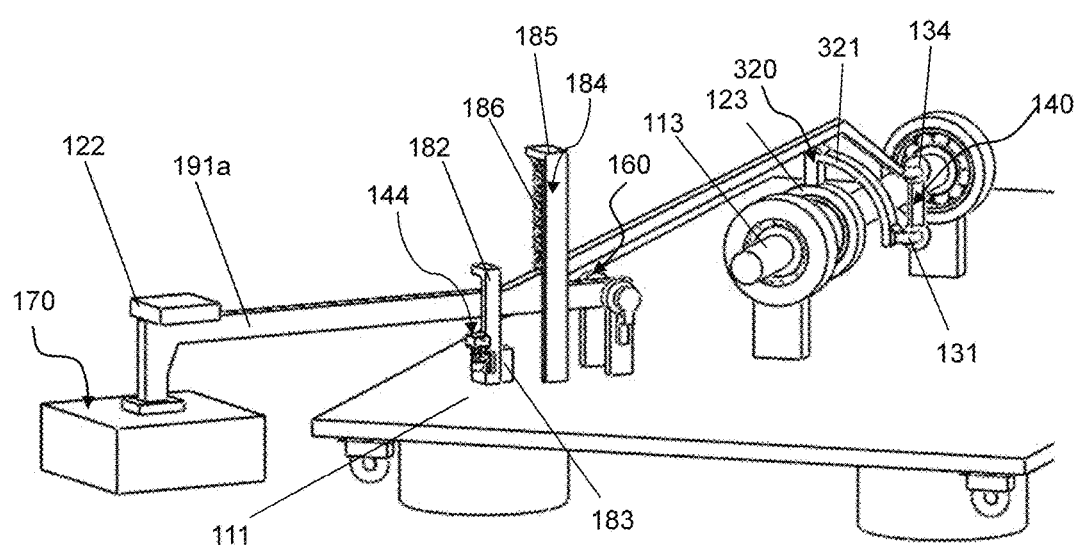
Figure 11B:
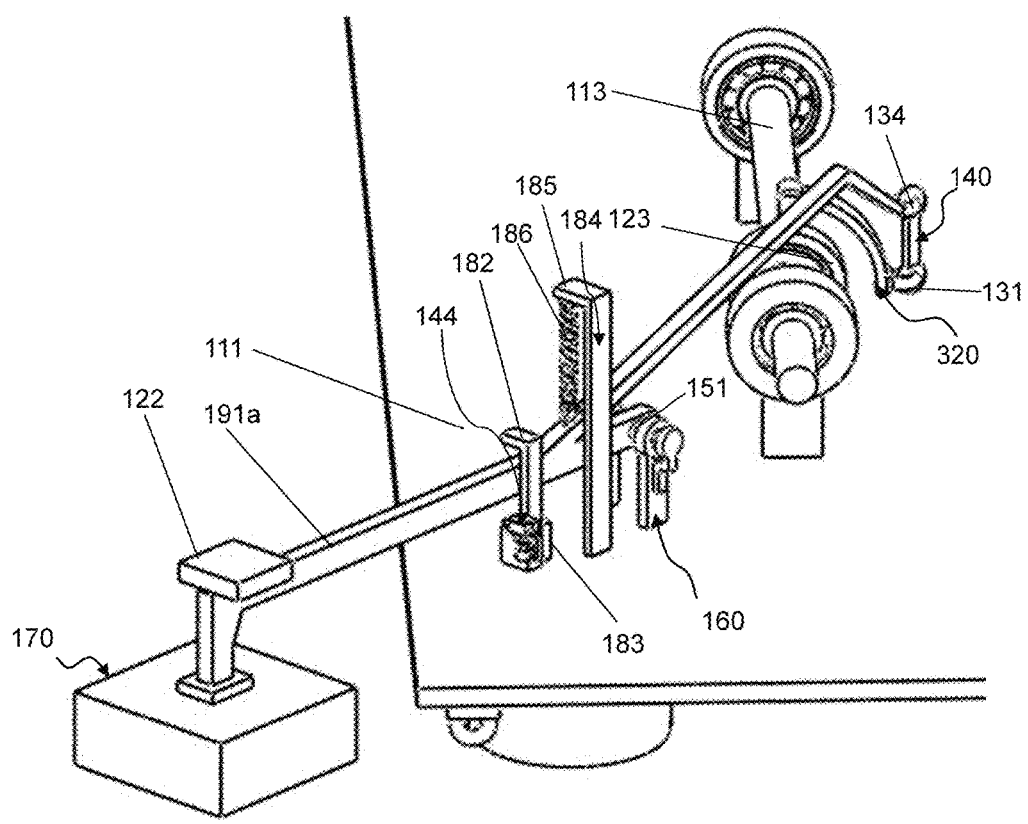

Similarly, as shown in FIGS. 11A-11B, as part of the energy harvesting sub-system 101, a rotation driving apparatus of type II comprises the freewheel mechanism 320, the corresponding connection sub-mechanism 140, the corresponding rotational mechanism 160, the corresponding floating device 170, and the corresponding swing component 191x (where x may be one of the letters a, b, c, d and e). As explained, one end of the swing component 191x is rigidly connected to the ring 134 of the corresponding connection sub-mechanism 140; and the other end is rigidly connected to the connector 172 of a corresponding floating device 170; and a middle part of the swing component 191x is rigidly connected to the shaft 151 of the corresponding rotational mechanism 150. As explained, the connector 137 of the corresponding freewheel mechanism 320 is configured to be rigidly connected to the ring 131 of the corresponding connection sub-mechanism 140; and the inner ring 121b of the corresponding freewheel mechanism 320 is configured to be fixedly connected and concentric with the shaft 113.

Since the connection sub-mechanism 140 connects the connector 137 to an end of the corresponding swing component 191x in the rotational mechanism 160, the combination of the connectors 137 and 321, and the connection sub-mechanism 140 are configured to connect an end of a corresponding swing component 191x to the bearing housing 123 of a corresponding freewheel mechanism 320. The said combination may be referred to as a first connection of the rotation driving apparatus of type II. The connector 172, configured to connect the floating component 171 to the other end of the swing component 191x, may be referred to as a second connection of the rotation driving apparatus of type II.

The rotation driving apparatus of type II further comprises a limiting mechanism 182, an electromagnet 183, a spring device 184 comprising a rigid component 185 and a spring 186, a locking mechanism 144, and a weight 122. The limiting mechanism 182 comprises physical barriers for the corresponding swing component 191x, as to constrain the swing component 191x to rotate between two end-positions around the axis of the corresponding shaft 151. Thus, the swing components 191x may make a two-way rotation around the axis of the corresponding shaft 151. The physical barriers of the limiting mechanism 182 are configured to be rigidly or elastically connected to the base support component 111. The swing components 191x comprises a ferromagnetic part, and the electromagnet 183 is rigidly connected to the limiting mechanism 182 and is configured to attract the ferromagnetic part of the swing component 191x when needed (see FIGS. 11A-11B). The electromagnet 183 may be controlled by the computer 381 so it may be turned on or off. The spring 186 is hooked onto the rigid component 185 which is rigidly or elastically connected to the base support component 111. The spring 186 is configured to be hooked onto the rigid component 185 and the swing component 191x, so that the spring 186 pulls (a part of) the swing component 191x upward. When the spring 186 pulls the swing component 191x, the corresponding floating component 171 must be configured to move in a downward direction, and at the same time, the rigid component 321 and the ring 123 of the corresponding freewheel mechanism 320 must be configured to rotate in the positive rotational direction around the axis of the shaft 113. The weight 122 is rigidly connected to the swing component 191x. The weight 122 forces the swing component 191x to rotate in a first rotational direction around the axis of the shaft 151; wherein the first rotational direction is the counter-clockwise direction around the axis of the corresponding shaft 151, as shown in FIG. 11B. In other words, the torque on the swing component 191x induced by the weight 122 is in the first rotational direction.

The connection comprising the spring device 184 and the connections of the spring device 184 to the corresponding swing component 191x and to the base support component 111 through the bearing housings 152 may be referred to as a third connection of the rotation driving apparatus of type II. The said third connection connects the swing component 191x to the base support component 111. The said third connection is configured to force the corresponding swing component 191x to rotate in the first rotational direction when the corresponding floating device 170 is above water level. In other words, the torque on the swing component 191x induced by the third connection is in the first rotational direction. The corresponding floating component 171 is configured to move in a downward direction when the corresponding swing component 191x rotates in the first rotational direction, and at the same time, the rotation of the corresponding swing component 191x in the first rotational direction is configured to induce a rotation of the second mating part of the corresponding freewheel mechanism 320 in the positive rotational direction around the axis of the first shaft 113 of the base rotational mechanism.

The weight 122 may be considered as an energy storage sub-apparatus of the rotation driving apparatus of type II, see FIG. 11B. When water level below the floating component 171 rises, the floating component 171 is pushed in an upward direction, and thus, the weight 122 is pushed in an upward direction, at which time the swing component 191x is rotated in the direction opposite to the first rotational direction. Potential energy is therefore stored as the weight 122 rises. When the water level recedes and the floating component 171 is no longer pushed by the water below, the weight 122 may drop down and may push the swing component 191x to rotate in the first rotational direction. The other end of the swing component 191x may then go up, thus pulling the first mating part 321 of the corresponding freewheel mechanism 320. The induced torque on the first mating part 321 of the freewheel mechanism 320 is in the positive rotational direction around the axis of the first shaft.

Similarly, the third connection comprising the spring device 184 may also be considered an energy storage sub-apparatus of the rotation driving apparatus of type II, also see FIG. 11B. When water level below the floating component 171 rises, the floating component 171 is pushed in an upward direction, and thus, the spring 186 is stretched, at which time the swing component 191x is rotated in the direction opposite to the first rotational direction. Potential energy is therefore stored as the spring 186 is stretched. When the water level recedes and the floating component 171 is no longer pushed by the water below, the spring 186 may un-stretch and may force the swing component 191x to rotate in the first rotational direction. The other end of the swing component 191x may then go up, thus pulling the first mating part 321 of the corresponding freewheel mechanism 320. The induced torque on the first mating part 321 of the freewheel mechanism 320 is in the positive rotational direction around the axis of the first shaft.

Figure 11C:
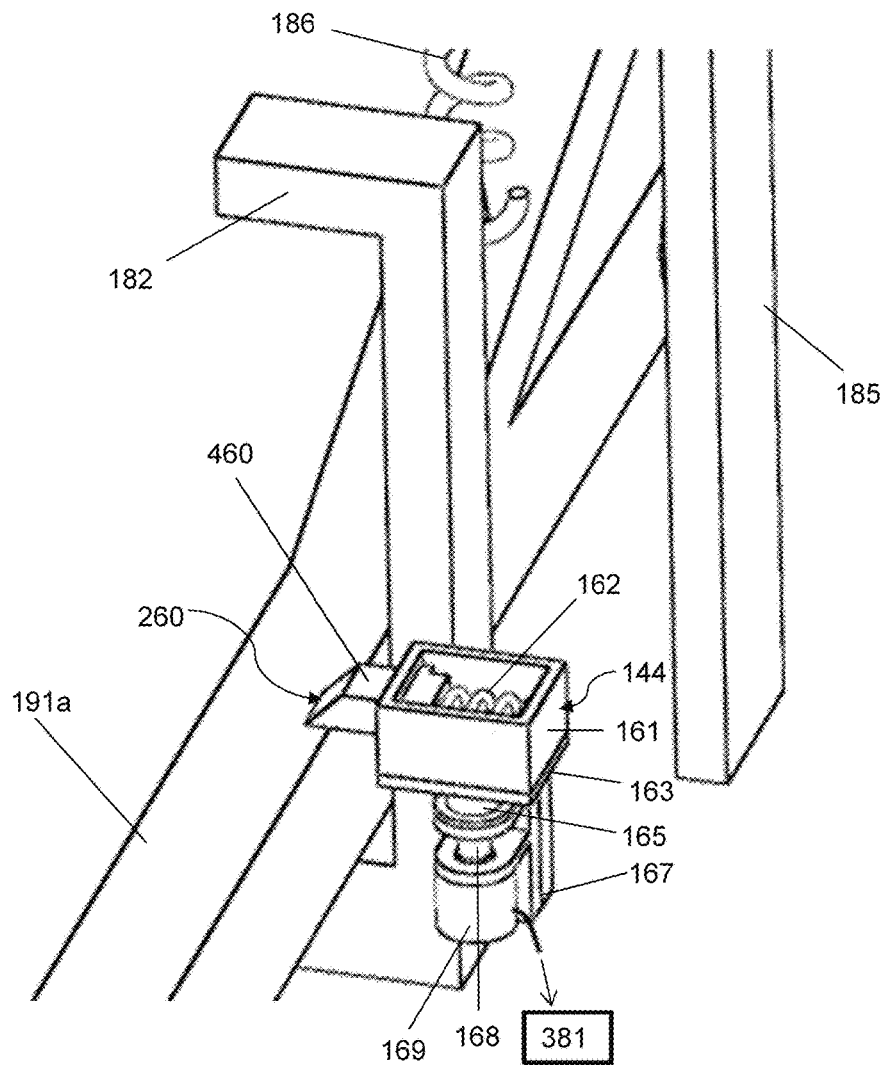
Figure 12:
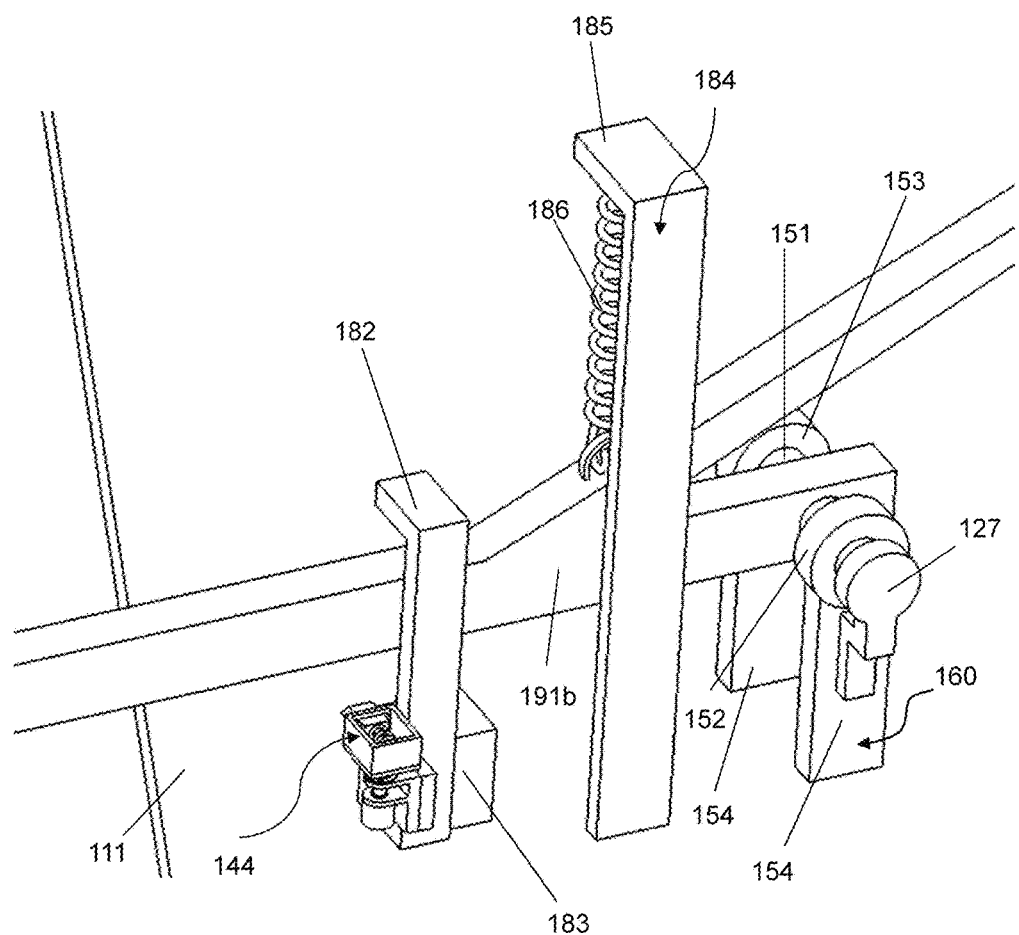
Figure 13A:
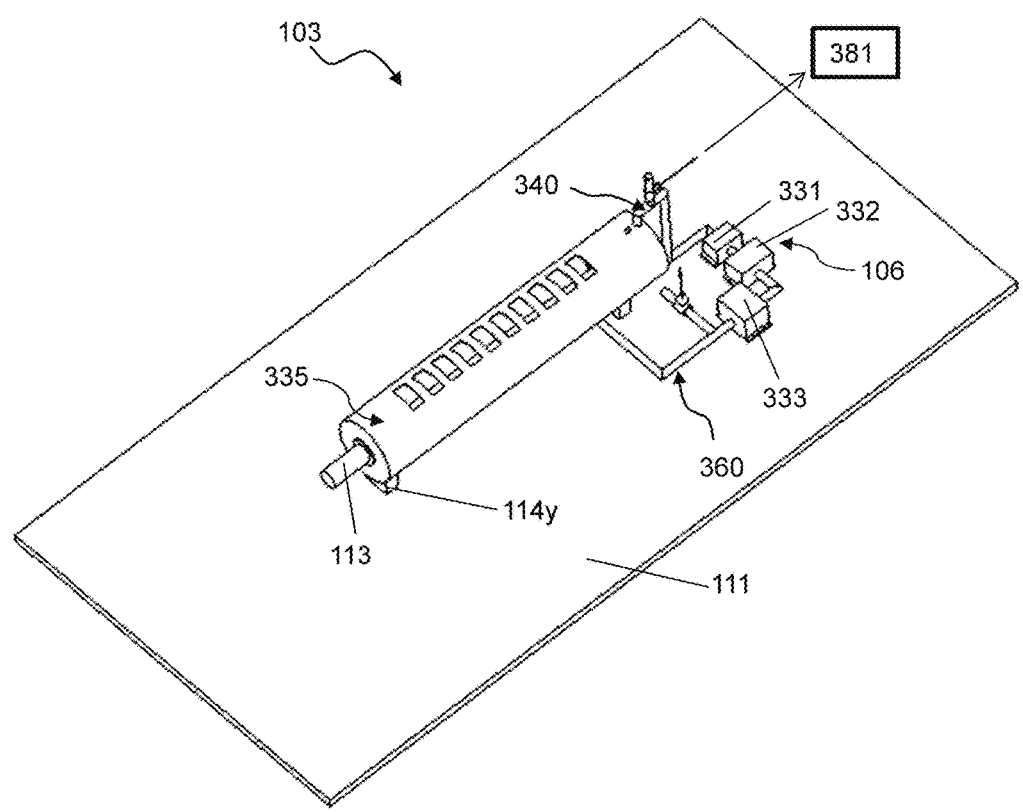
FIG. 13A shows an aerial view of an energy harvesting sub-system.
Figure 13B:
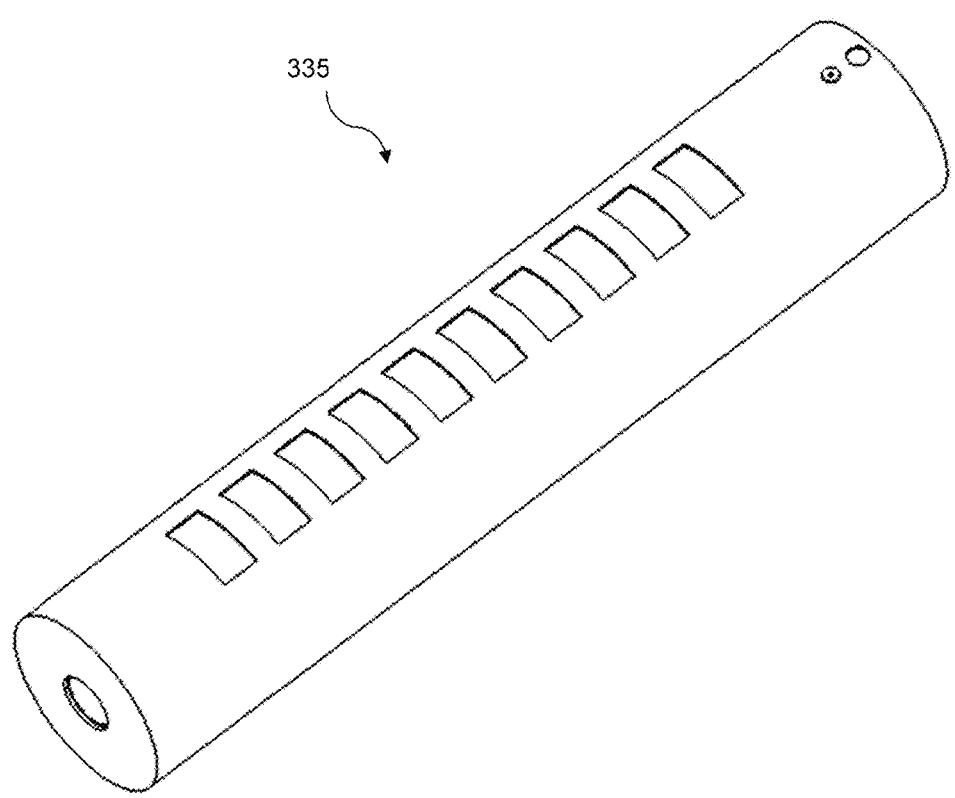
FIG. 13B shows an aerial view of a sealed enclosure.
Figure 14:
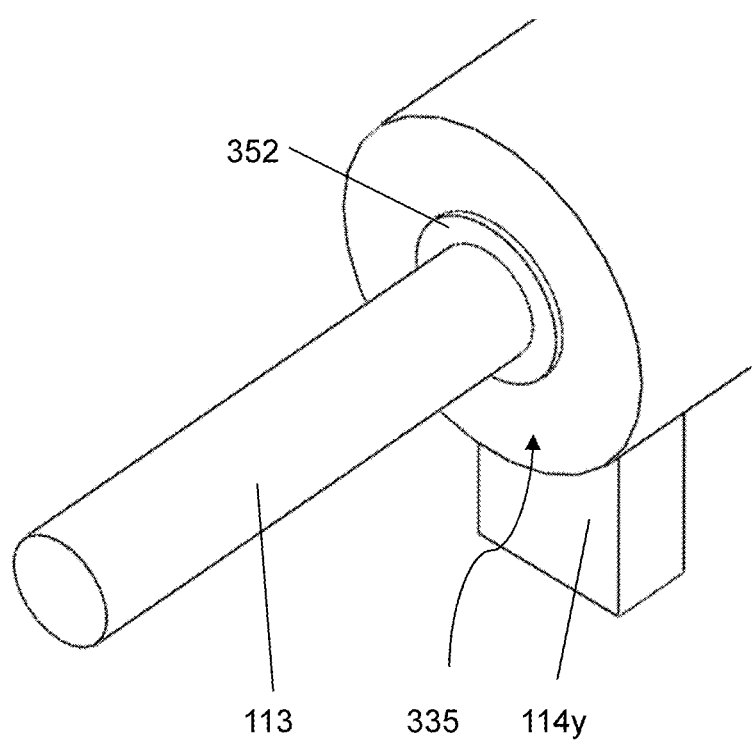
FIG. 14 shows a partial aerial view of the energy harvesting sub-system of FIG. 13A.

If the first support component 163 of the locking mechanism 144 is moved by the motor 169 to the first end-position, as shown in FIG. 11C, the sliding component 460 is configured to lock the swing component 191x when the floating component 171 is lifted to a sufficiently high position relative to the bearing housing 152. Then, the rotation of the swing component 191x may be stopped. This is needed when the system needs to be stopped during time periods when repairs are needed, or during time periods weather conditions are not desirable. When the first support component 163 is moved to the second end-position, the sliding component 460 is configured to not touch the swing component 191x, and thus does not interfere with the motion of the swing component 191x. We say that the locking mechanism 144 is turned on, if the first support component 163 is moved to the first end-position. We say that the locking mechanism 144 is turned off, if the first support component 163 is moved to the second end-position.

The electromagnet 183 may be turned on or off. When turned on, the electromagnet 183 may attract the swing component 191x by a large enough force, so that the floating component 171 may be lifted to a high position relative to the corresponding bearing housing 152. The electromagnet 183 may be used to stop the motion of the swing component 191x, when it is turned on. If the electromagnet 183 is turned off, then it has no magneticity and does not induce any force on the swing component 191x. The electromagnet 183 may thus function as another locking mechanism. The electromagnetic 183 may be switched on and off at the control of the computer 381, as explained earlier.

In the discussion of the paragraph here, we assume that the locking mechanism 144 and the electromagnet 183 are both turned off, so they do not interfere with the movements of the swing component 191x. When water level below the floating component 171 is receded so that the floating component 171 is entirely above the water level, the swing component 191x, the torque induced by the sum of all forces is configured to be in the first rotational direction around the axis of the corresponding shaft 151. This is a key feature for our invention. In other words, the sum of the torques induced by all forces on the swing component 191x except the force originated from the force on the floating component 171 from the water is in the first rotational direction. Moreover, the magnitude of the torque must be at least equal to a significant percentage, at least 20%, of the maximal possible magnitude of the torque on the swing component induced by the floating component when the floating component is pushed in an upward direction by the water in the nature. This way, a significant amount of potential energy may be stored during time periods when a rising water level pushes the floating component 171 to move in an upward direction.

It should be noted that the connection sub-mechanisms 130 and 140 in the energy harvesting sub-system 101 may be substituted by other types of connection sub-mechanisms. In particular, the linked or hooked pair of rings 131 and 132 in a connection sub-mechanism 130 or 140 may be substituted by a mechanism comprising one or more kinematic pairs. The linked or hooked pair of rings 133 and 134 in a connection sub-mechanism 130 or 140 may also be substituted by a mechanism comprising one or more kinematic pairs.

Referring to FIGS. 13A-16B, an energy harvesting sub-system 103 comprises: the base support component 111 configured to float on water in an ocean, river or lake; a base rotational mechanism comprising the shaft 113 as a first mating part, a pair of bearing housings 112x, 112y (hidden in figures) as a second mating part, and a connection (comprising bearings and accessories) configured to constrain the movement of the shaft 113 relative to the bearing housings 112x, 112y to a rotation around the axis of the shaft 113. The axis of the shaft 113 is referred to as the base axis. The two bearing housings 112x, 112y are rigidly connected to the base support component 111 via connectors 114x, 114y. The energy harvesting sub-system 103 also comprises a lubrication system 106 comprising: a sealed enclosure 335 comprising an inlet and an outlet (see FIGS. 13A-13B), a refrigeration mechanism 333, a pump 331, a filter 332, and pipes 342, 343, 345 and 347 (see FIGS. 15A-15B). The sealed enclosure 335 comprises a thin walled cylinder with a plurality of square holes 335a, as shows in FIG. 13A-13B. The sealed enclosure 335 is configured to be rigidly connected to the connectors 114x, 114y. The sealed enclosure 335 is configured to intersect the shaft 113 and the bearing housings 112x, 112y. The sealed enclosure 335 also comprises seals 352 which may be made of an elastic material, such as rubber or silica gel. The seals 352 are mounted between the shaft 113 and the walled cylinder of the sealed enclosure 335. The interior of the sealed enclosure 335 is configured to hold a lubrication liquid. The seals 352 are configured to block the lubricating liquid in the interior of the sealed enclosure 335 from leaking out through the space between the walled cylinder and the shaft 113, or through the space between the walled cylinder and any of the connector 114x and 114y. The sealed enclosure has a plurality of rectangular-shaped openings at the top. The pipes 342, 343, 345 and 347 are configured to be connected the refrigeration mechanism 333, the pump 331, the filter 332 and the sealed enclosure 335, so that the lubricating liquid may flow in the lubrication system 106. The pipe 342 is configured to connect to the inlet of the sealed enclosure 335 and the pipe 346 is configured to connect the outlet of the sealed enclosure 335. In the lubrication system 106, the lubricating liquid may be pumped by the pump 331 to flow from the outlet of the sealed enclosure 335 to the refrigeration mechanism 333, and then to the filter 332, and then to the pump 331, and back to the inlet of the sealed enclosure 335. This way, the lubricating liquid flows through the pipes may be cooled by the refrigeration mechanism 333 and filtered by the filter 332, and then flows back to interior of the sealed enclosure 335.

The floating components 171 are configured to float on the water during some time periods. The floating components may be immersed in the water during some time periods. The floating components may also be positioned above the water at times.

Figure 16A:
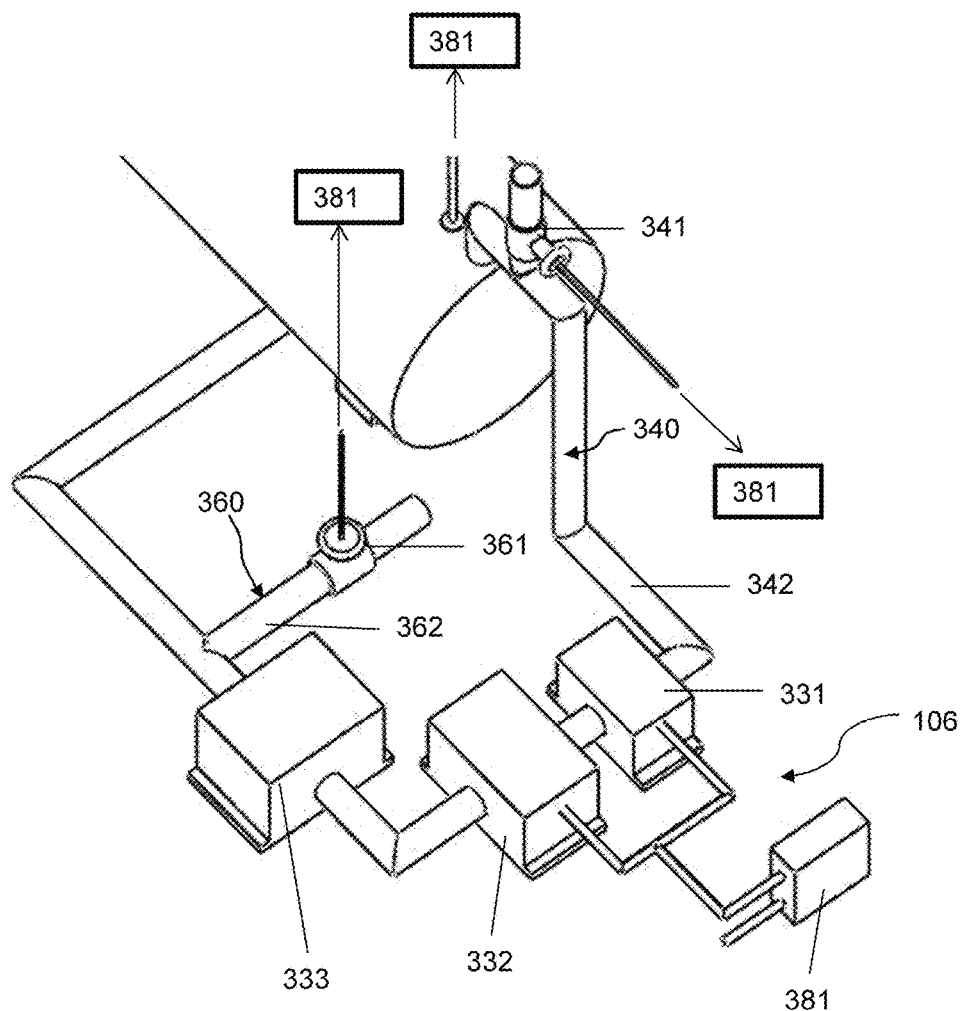
FIG. 16A shows an aerial view of parts of the lubrication system show in FIGS. 15A-15B.
Figure 16B:
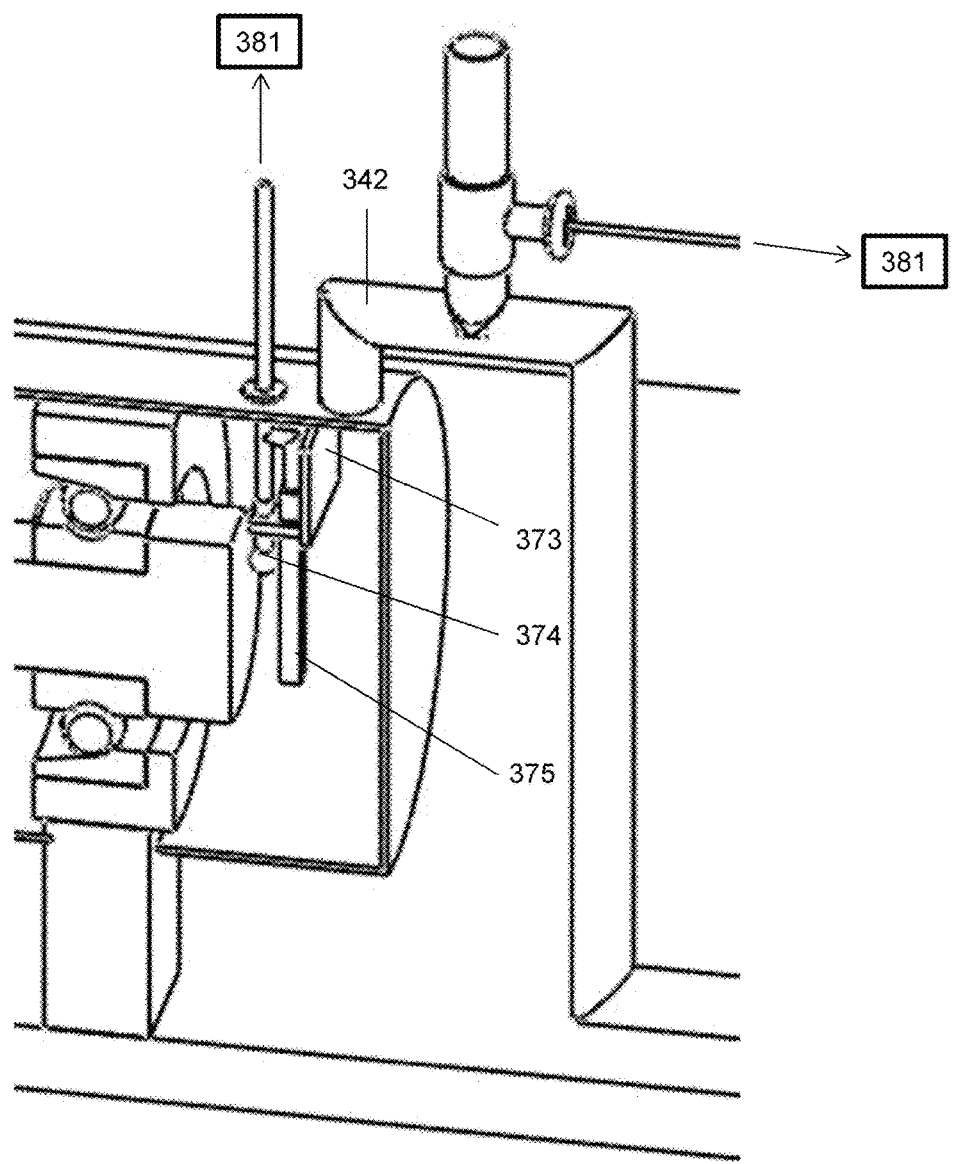
FIG. 16B shows a cut view of parts of the lubrication system.

The refrigeration mechanism 333, the pump 331, the filter 332 in the lubrication system 106 are configured to be mounted on the base support component 111. The base support component 111 may be configured to be rigidly connected with the ground, by known techniques. The lubrication system 106 of the energy harvesting sub-system 103 further comprises a liquid level sensor 375, a temperature sensor 374 and the digital computer 381, wherein the liquid level sensor 375 and the temperature sensor 374 are placed in the interior of the sealed enclosure 335 and are connected to the sealed enclosure 335 via a connector 373 (see FIG. 16B). The liquid level sensor 375 is configured to detect the level of lubricating liquid in the interior of the sealed enclosure. The temperature sensor 374 is configured to detect the temperature of the lubricating liquid in the interior of the seal enclosure. As shown in FIG. 16A, the pump 331 and the refrigeration mechanism 333 are connected to the digital computer 381 via wires. The digital computer 381 is configured to dynamically control the timing and/or power of the pump 331 and the refrigeration mechanism 333. The temperature sensor 374 and the liquid level sensor 375 are also connected to the digital computer 381, so the digital computer 381 may receive electric or electronic signals from the temperature sensor 374 and the liquid level sensor 375. The digital computer 381 may send electric or electronic signals to control the refrigeration mechanism 333 as to keep the temperature of lubricating liquid in the sealed enclosure 335 in a certain range, according to the electric or electronic signals of the temperature sensor 374. The digital computer 381 may send electric or electronic signals to control the flow rates, start and stop of the pump 331 according to the electric or electronic signals of the liquid level sensor 375.

The sealed enclosure 335 of the lubrication system 106 is fixedly connected to the connectors 114x, 114y of the base apparatus 110 of the energy harvesting sub-system 101. The sealed enclosure 335 is configured to intersect the shaft 113 and the bearing housings 112x, 112y of the energy harvesting sub-system 101. The bearing housings 123, the one-way freewheel clutch bearings 121 and parts of the rigid components 321 of the freewheel mechanisms 320 are all contained in the interior of the seal enclosure 335. The rigid component 321 of each freewheel mechanism 320 may be configured to pass through a corresponding square hole 335a of the sealed enclosure 335. The refrigeration mechanism 333, the pump 331, the filter 332 in the lubrication system 106 may be fixed to the ground by known techniques. The electricity generation mechanism 365 is connected to the shaft 113 of the base apparatus 110 and the rotation of the shaft 113 of the base apparatus 110 may be converted into electricity by the electricity generation mechanism 365. It should be noted that many components of the energy harvesting system 105 are not shown in the FIG. 18C.

Figure 15A:
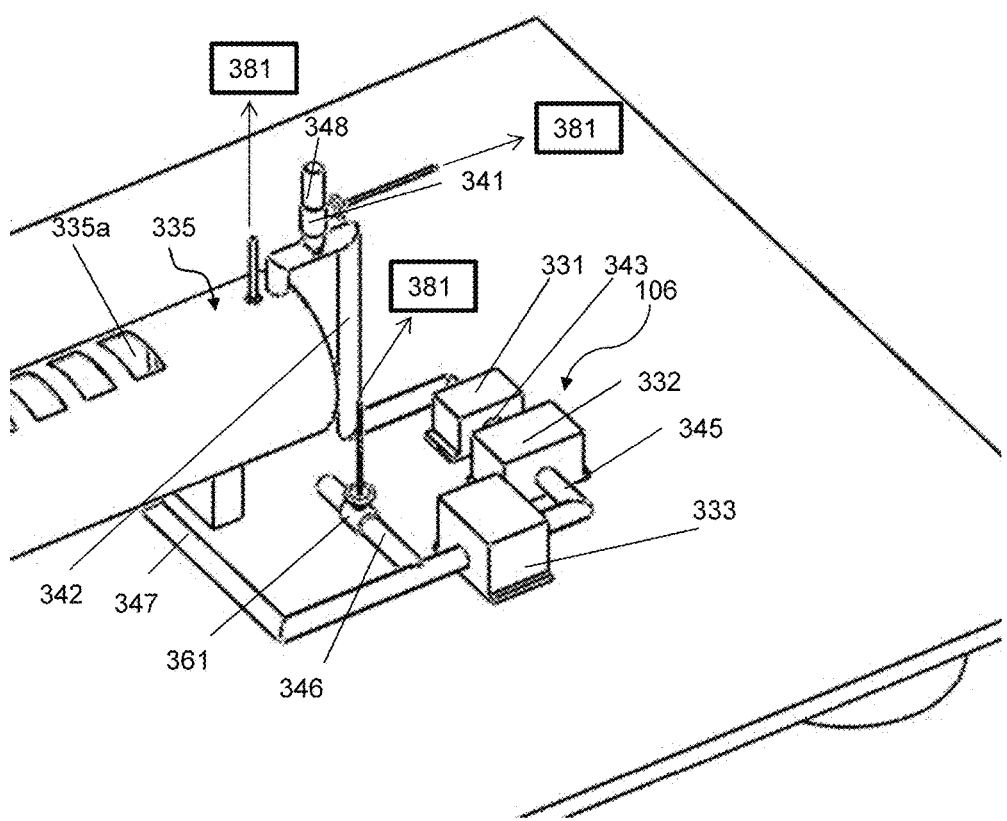
FIGS. 15A-15B show aerial views of parts of a lubrication system.
Figure 15B:
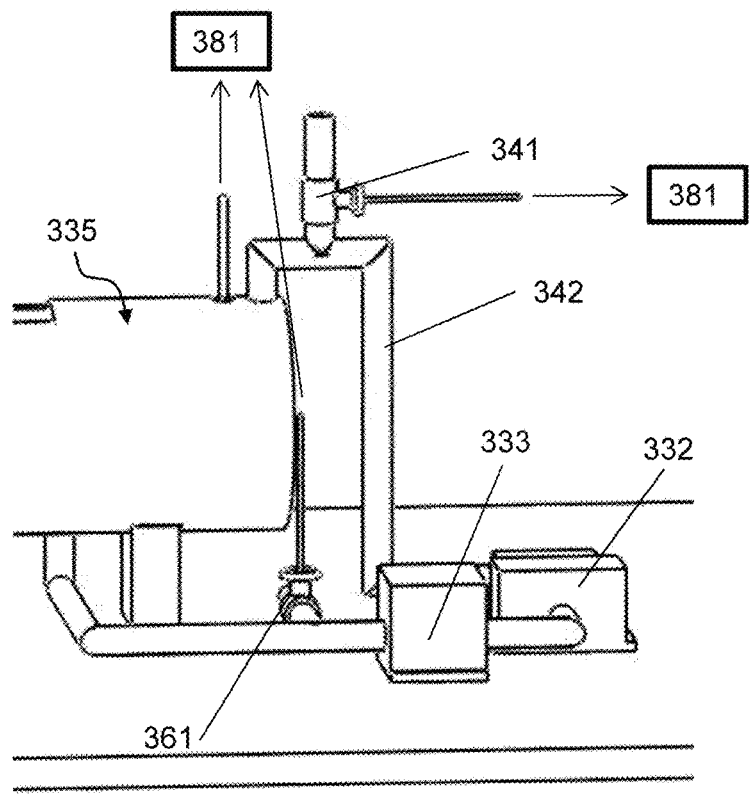

The lubrication system 106 also comprises: a pipe 348 which is joined with a source of lubricating liquid; a pipe 346 which is joined to a storage tank of waste liquid; and two valves 341 and 361; wherein the valve 341 or 361 is mounted on the pipe 348 or respectively 346, as to control the flow of the lubricating liquid through the pipe (see FIGS. 15A-15B). The valves 341 and 361 are automated valves which are connected to and controlled by the digital computer 381. When the liquid level as detected by the liquid level sensor 375 is below a certain level, the valve 341 may be opened as to let a lubricating liquid from the source to flow into the pipe 341 and eventually into the interior of the sealed enclosure 335. After a period of operation, the lubricating liquid in the interior of the sealed enclosure 335 may be too dirty, and then, after opening the valve 361, the lubricating liquid may be flowed out through the valve 361 to the storage tank of waste liquid.

It should be noted that the pipe 348 of the lubrication system 106 of the energy harvesting sub-system 103 may be configured to be placed at or above a high point of the sealed enclosure 335. The pipe 346 (or the outlet) of the lubrication system 106 of the energy harvesting sub-system 103 is configured to be placed at or below the lowest point of the sealed enclosure 335.

Figure 17:
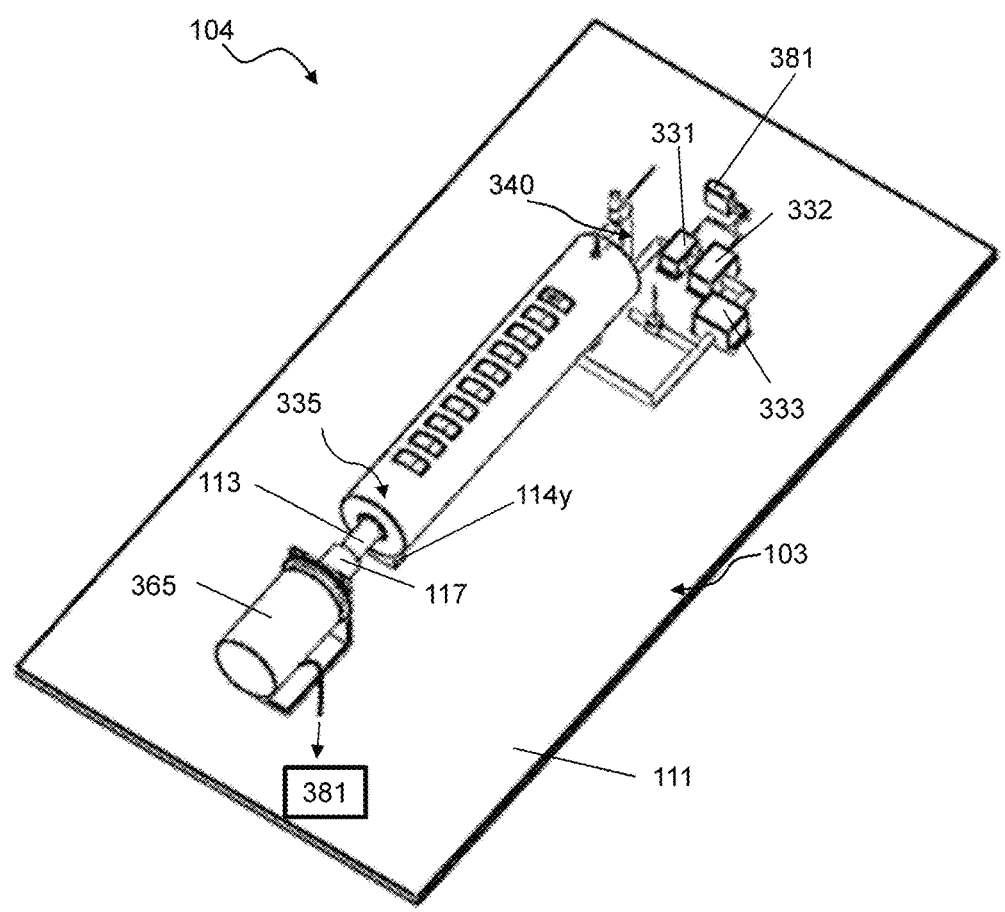
FIG. 17 shows an aerial view of an energy harvesting sub-system.

Referring to FIG. 17, an energy harvesting sub-system 104 comprises an energy harvesting sub-system 103 and an electricity generation mechanism 365 which comprises a shaft and a base support component. The shaft of the electricity generation mechanism 365 is connected to the shaft 113 of the base apparatus 110; and the base support component of the electricity generation mechanism 365 is rigidly connected to the base support component 111. The rotation of the shaft 113 of the base apparatus 110 may induce a rotation of the shaft of the electricity generation mechanism 365. The electricity generation mechanism 365 is configured to generate electricity from the rotation of its shaft.

Figure 18A:
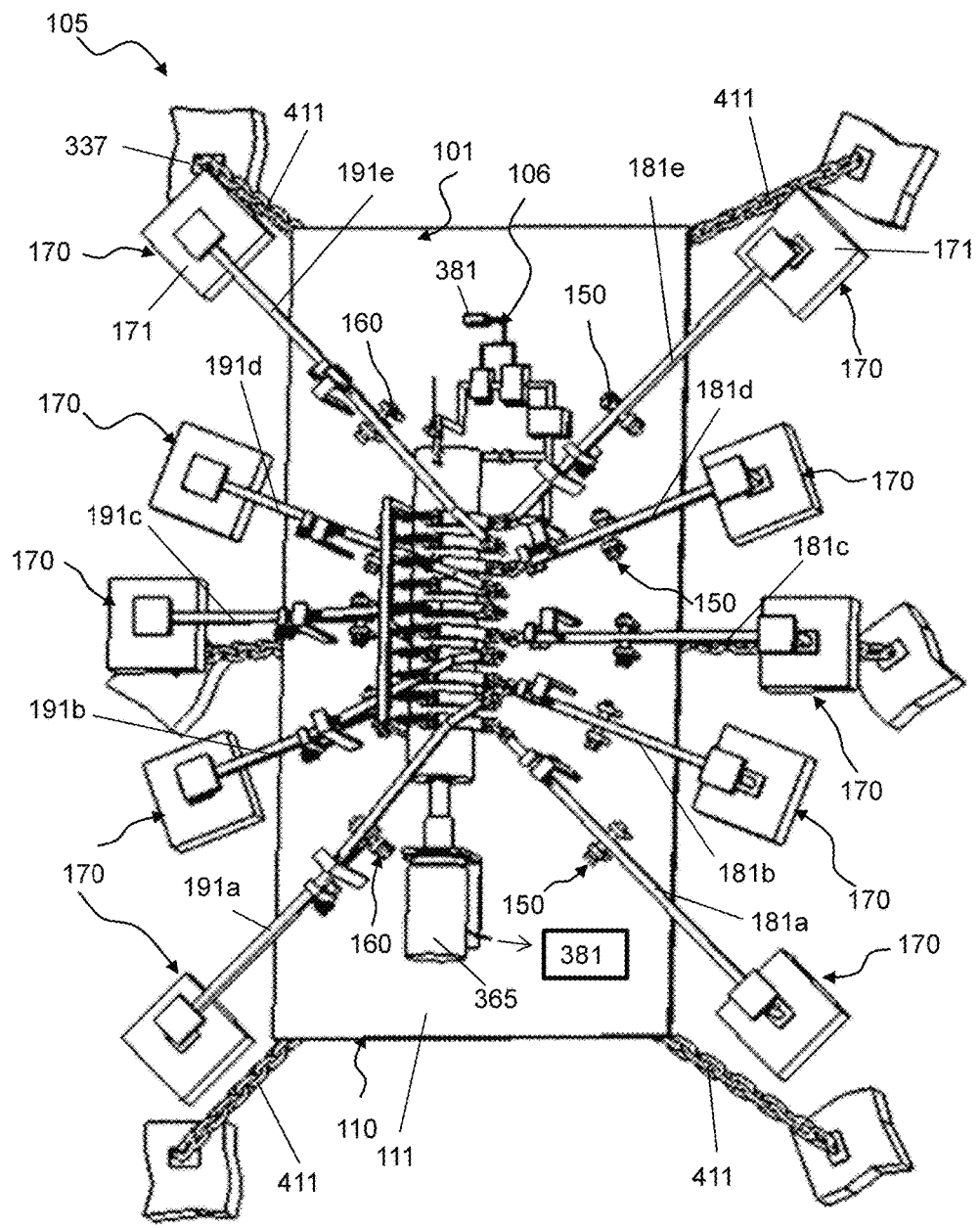
FIGS. 18A-18C show aerial views of an energy harvesting system.
Figure 18B:
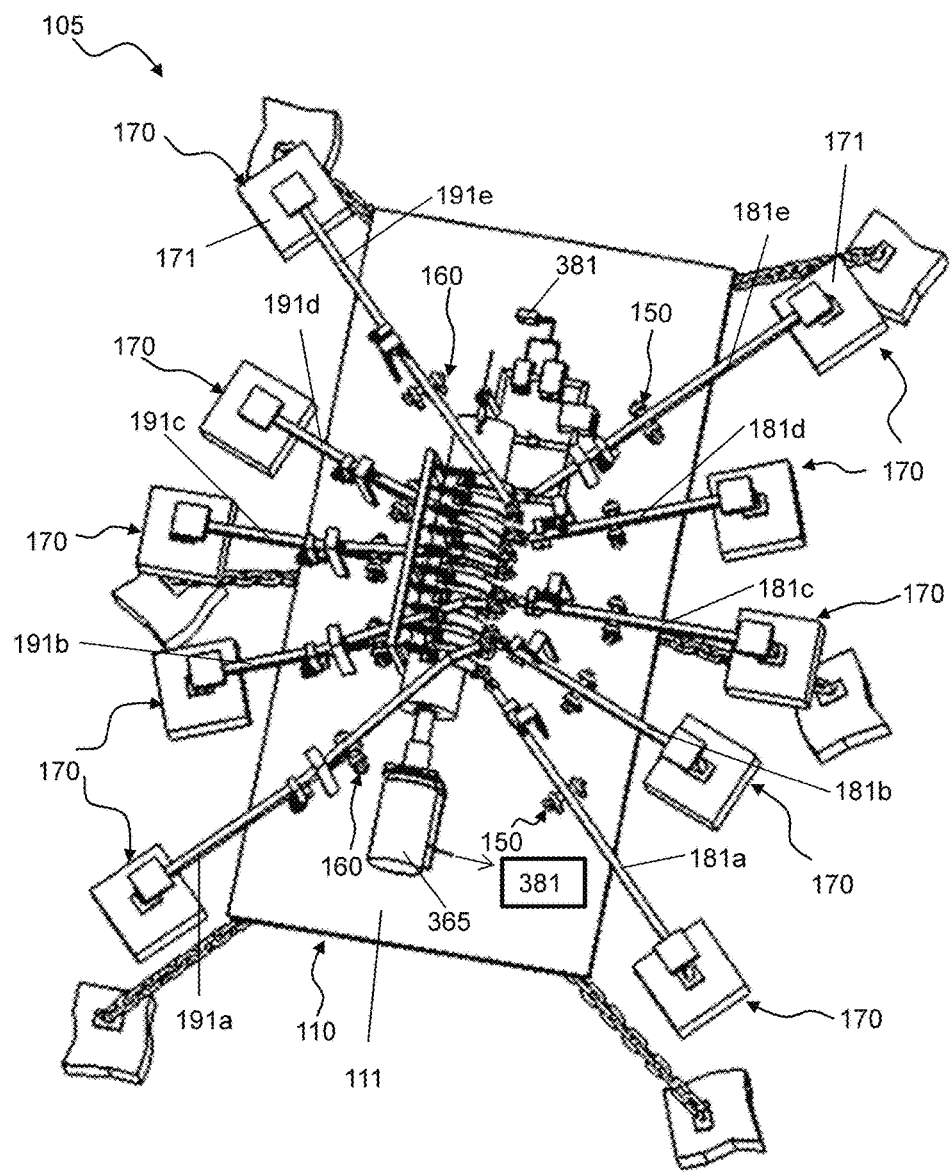
Figure 18C:
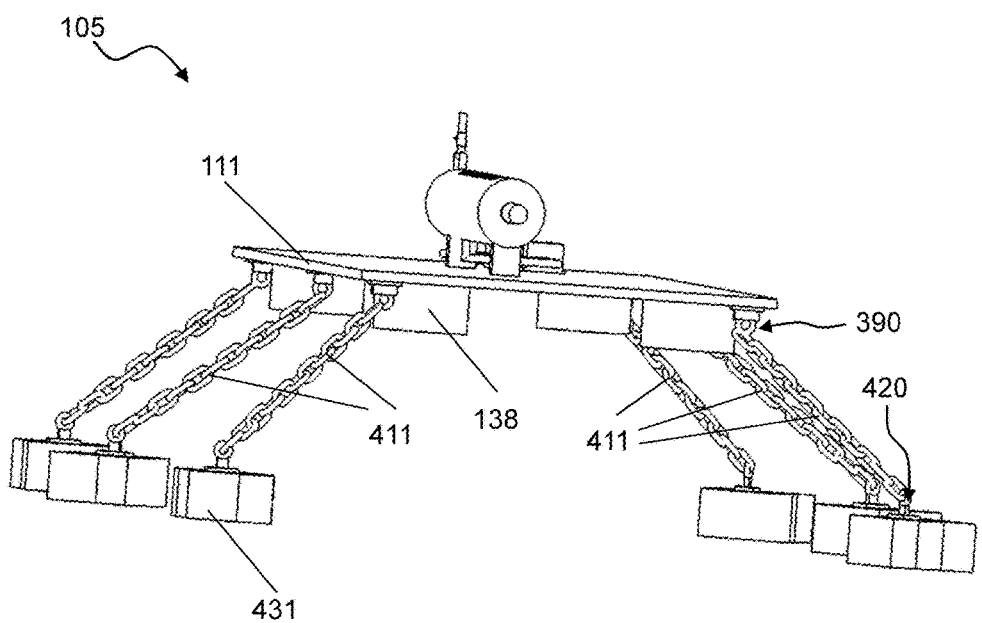
Figure 18D:
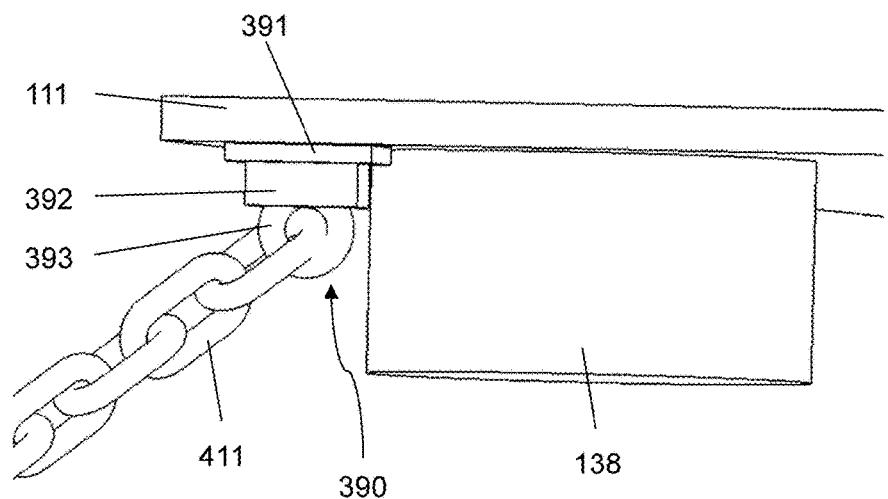
FIGS. 18D-18E show aerial views of parts of the energy harvesting system.
Figure 18E:
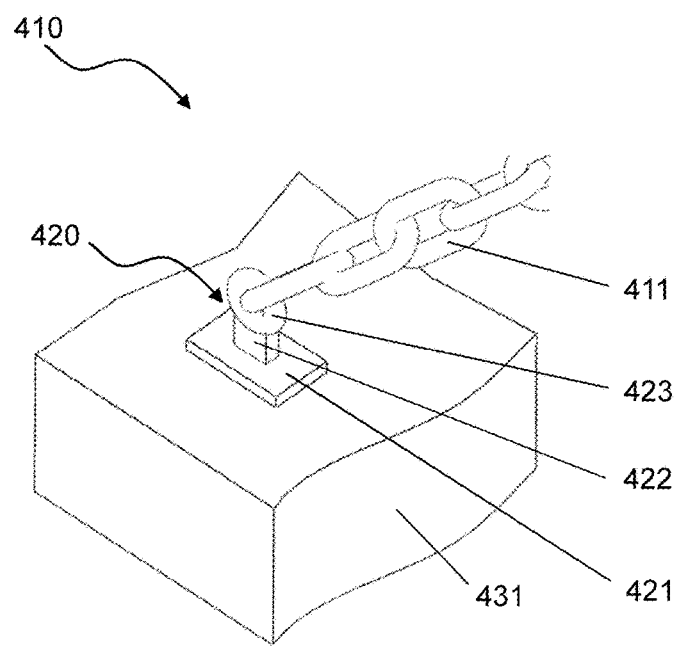

Referring to FIGS. 18A-18E, an energy harvesting system 105 comprises: the energy harvesting sub-system 104; a plurality of hooks 390; a plurality of buoys 138; a plurality of connectors 410 (see FIGS. 18D-18E). Each of the connectors 410 comprises a hook 420; a ground 431 and a chain 411. The hook 390 comprises a base component 391; a ring 393 and a connector 392, wherein the base component 391 is rigidly connected with the base support component 111 of the energy harvesting sub-system 101; wherein the connector 392 is configured to rigidly connect the ring 393 and the base component 391. Similarly, the hook 420 comprises a base component 421; a ring 423 and a connector 422, wherein the base component 421 is rigidly connected with the ground 431; wherein the connector 422 is configured to rigidly connect the ring 423 and the base component 421. One of the end of each of the chains 411 is linked or hooked to the ring 393 of a hook 390, and the other end of the chain 411 is linked or hooked to the ring 423 of a hook 420. Thus, the base support component 111 of the energy harvesting sub-system 101 may be connected to the ground 431. The length of the chains 411 may further be configured to be adjustable in accordance with tide. When tide rises, the chains 411 may be adjusted to be longer. It should be noted the chains 411 may be substituted by cables, ropes, wires, etc.

When water level rises near a floating component 171 of a rotation driving apparatus of either type, the floating component 171 is pushed by the water in an upward direction, and this induces a rotation of the swing component 181x or 191x of the rotation driving apparatus and the other end of the swing component 181x or 191x (opposite end of the floating device) is pushed in a downward direction. This induces a rotation in the negative direction in the first mating part (relative to the first mating part) of the freewheel mechanism 320 of the rotation driving apparatus. The first mating part is fixedly connected with the first shaft in the base rotational mechanism, and the first shaft should rotate in the positive rotational direction relative to the base support component 111. A rotation in the negative direction in the first mating part of the freewheel mechanism 320 does not produce a significant force in the first shaft of the base rotational mechanism. As we explained earlier, the second mating part is free to rotate in the negative direction relative to the first mating part in the freewheel mechanism.

Next, when water level falls sufficiently enough near the above floating component 171, the floating component 171 may have lesser contact, or even no contact, with the water. Then, the swing component 181x or 191x (where x can be one of the letters a, b, c, d, or e), due to well-designed weighting and/or the force of the spring, is configured to rotate so that the floating component 171 may move in a downward direction, and the other end of the rotatable component 181x or 191x (i.e., opposite of the floating device) may move in an upward direction. Thus, the first mating part of the freewheel mechanism 320 may rotate in the positive rotational direction around the base axis. As a consequence, the second mating part of the freewheel mechanism 320, and hence the first shaft must also rotate in the positive rotational direction at a speed which is bigger than or equal to the speed of the first mating part of the freewheel mechanism 320.

The positive direction rotation of the shaft 113 relative to the bearing housing 112x, 112y may further drive the electricity generation mechanism 365 to generate electricity. The pump 331 is configured to draw lubricating liquid from a bottom outlet of the sealed enclosure 335 and pump it through the pipes to an inlet to the interior of the sealed enclosure. The lubricating liquid in the interior is configured to lubricate and cool the shaft 113, the bearing housings 112x, 112y, parts of the freewheel mechanisms 320 etc., which are contained in the interior of the sealed enclosure 335 of the lubrication system 106. The first mating parts 321 of the freewheel mechanisms 320 may pass through the rectangular-shaped openings of the sealed enclosure 335.

Figure 18F:
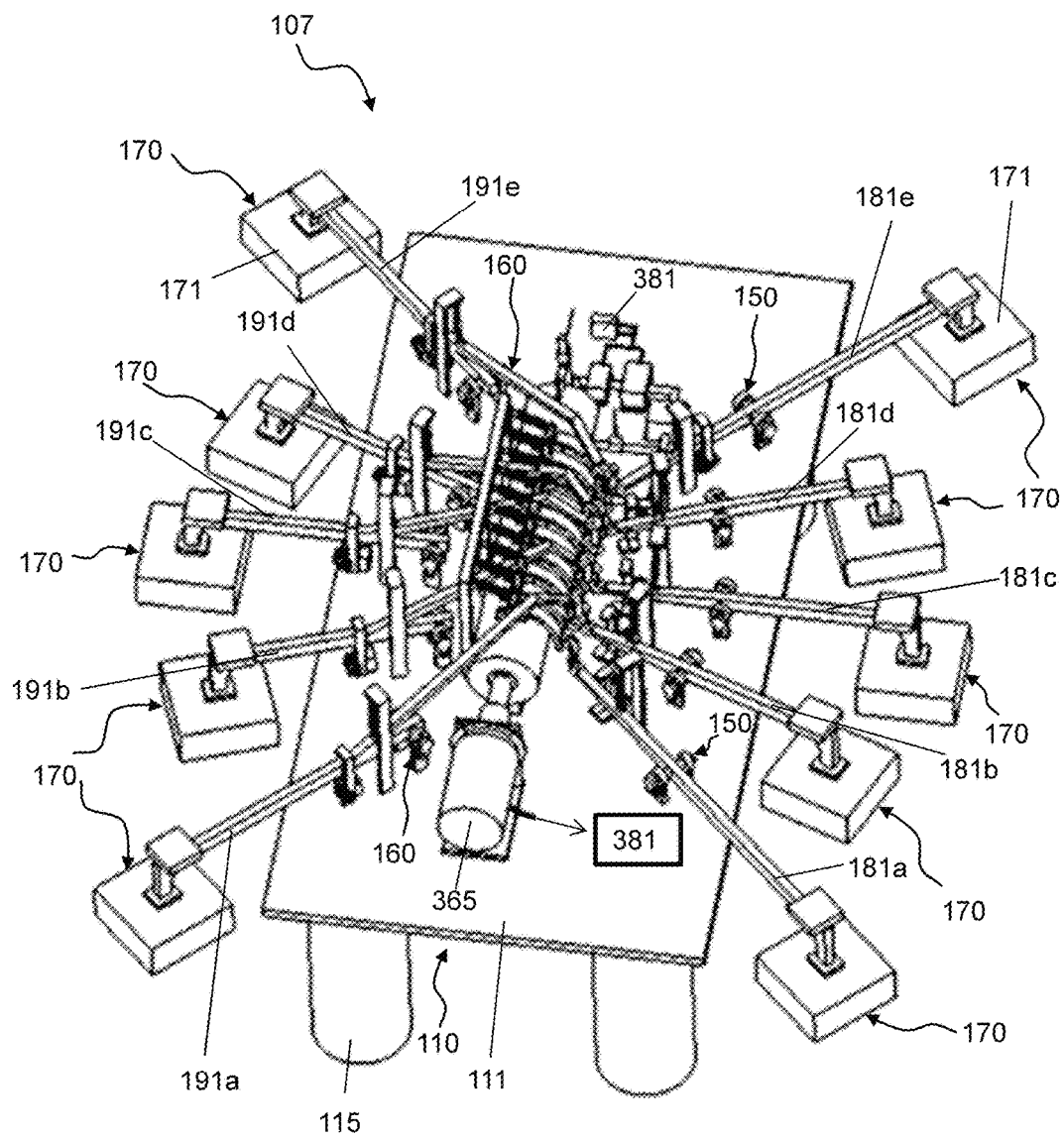
FIGS. 18F-18G show aerial views of another energy harvesting system.
Figure 18G:
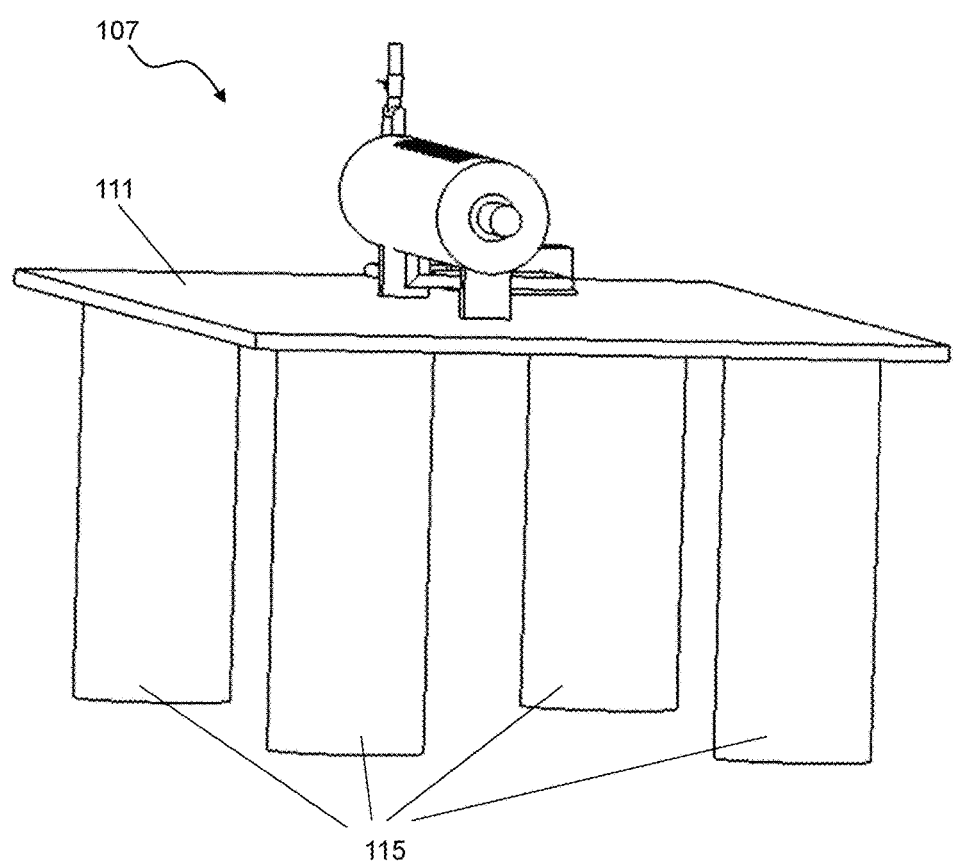

Referring to FIG. 18F-18G, an energy harvesting system 107 comprises an energy harvesting sub-system 104 and a plurality of support components 115 which are configured to fixedly connect the base support component 111 to the ground. The energy harvesting system 107 is constructed the same way as the energy harvesting system 105 except that the connectors 410 and buoys 138 are substituted by the support components 115. It should be noted that the support components 115 may be configured to have other geometric shapes. A cross section of each of the support components 115 may be configured to be round, oval, polygonal, etc.

A modified version of the energy harvesting system 105 will be presented in the next paragraphs.

Figure 19A:
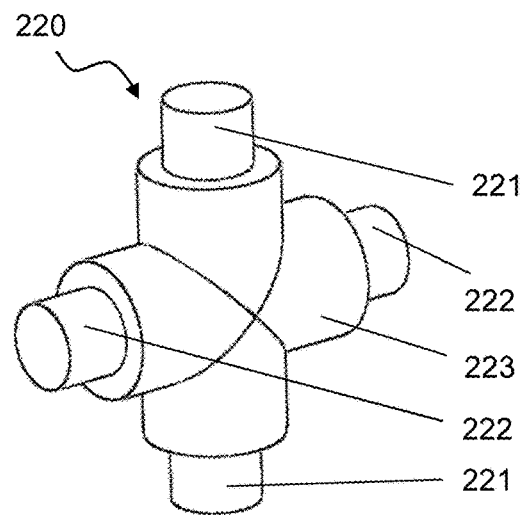
FIGS. 19A-19C show aerial views of parts of a universal joint.

Referring to FIG. 19A, a connection device 220 comprises a first pair of shafts 221 with a same axis, a second pair of shafts 222 with a same axis, and a rigid connector 223 rigidly joining all of the shafts 221 and 222. The axis of the shafts 221 and the axis of the shafts 222 are configured to intersect at a point.

It should be noted that the axis of the shafts 221 and the axis of the shafts 222 in the connection device 220 may be configured to be perpendicular to each other.

Figure 19B:
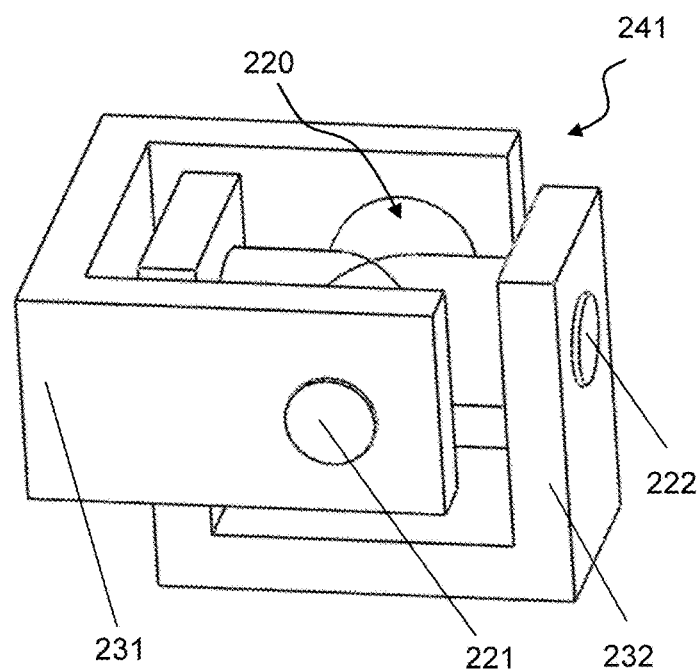

Referring to FIG. 19B, a universal joint 241 comprises: a connection device 220; a rigid component 231 comprising a pair of sleeves, wherein each sleeve is connected to one of the shafts 221 so that the sleeve and shaft are configured to be rotatable relative to each other around the axis of the shaft; a rigid component 232 comprising a pair of sleeves, wherein each sleeve is connected to one of the shafts 222 so that the sleeve and shaft may be configured to be rotatable relative to each other around the axis of the shaft. The rigid component 231 is rotatable relative to the connection device 220 around the axis of the shafts 221; and the rigid component 232 is rotatable relative to the connection device 220 around the axis of the shafts 222.

Figure 19C:
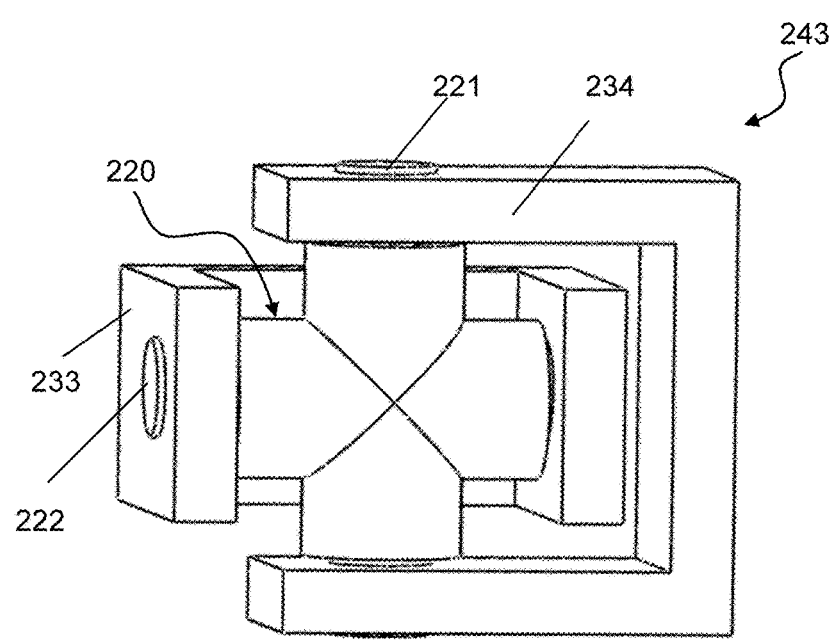

Referring to FIG. 19C, a universal joint 243 comprises: a connection device 220; a rigid component 233 comprising a pair of sleeves, wherein each sleeve is connected to one of the shafts 222 so that the sleeve and shaft are configured to be rotatable relative to each other around the axis of the shaft; a rigid component 234 comprising a pair of sleeves, wherein each sleeve is connected to one of the shafts 221 so that the sleeve and shaft may be configured to be rotatable relative to each other around the axis of the shaft. The rigid component 233 is rotatable relative to the connection device 220 around the axis of the shafts 222; and the rigid component 234 is rotatable relative to the connection device 220 around the axis of the shafts 221.

The rigid components 231 and 232 are referred to as the mating parts in the universal joint 241. The rigid components 233 and 234 are referred to as the mating parts in the universal joint 243.

Figure 20A:
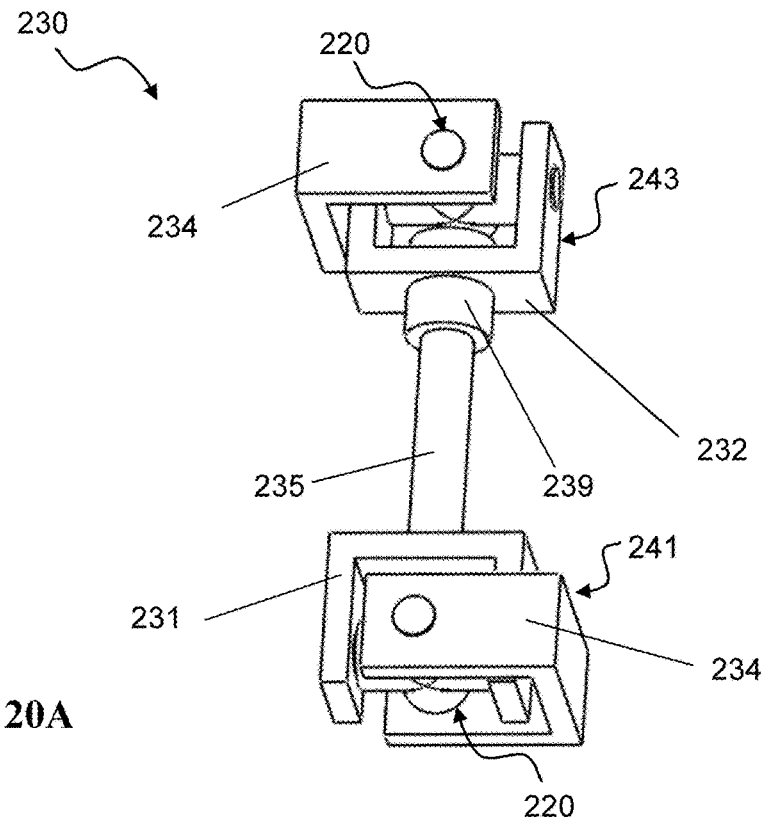
FIGS. 20A-20B show aerial views of a connection mechanism.
Figure 20B:
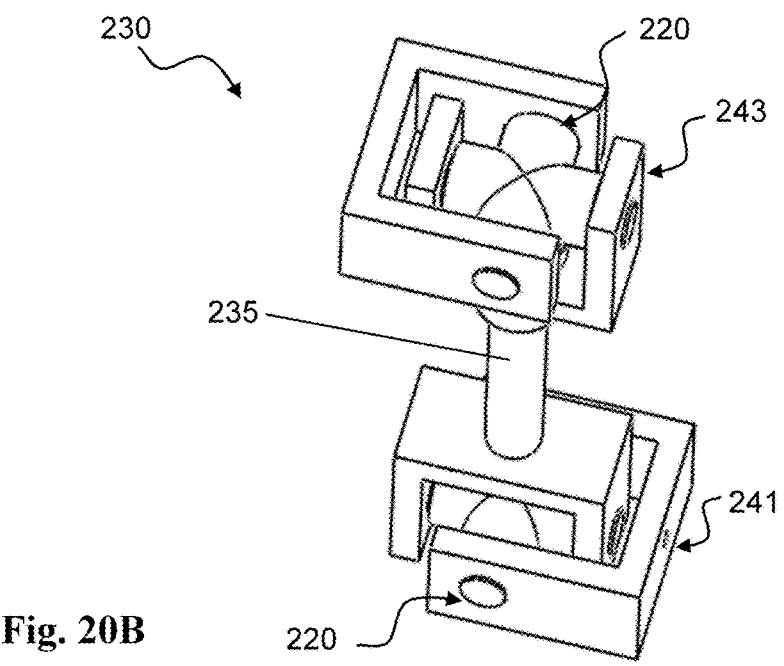

Referring to FIGS. 20A-20B, a connection sub-mechanism 230 comprises: a universal joint 241; a universal joint 243; a rotational mechanism comprising a shaft 235, a bearing housing 239 and a connection configured to constrain the relative movement of the shaft 235 and the bearing housing 239 to a rotation around the axis of the shaft 235. The bearing housing 239 is rigidly joined with the component 232 of the universal joint 243. The shaft 235 is rigidly joined with the component 231 of the universal joint 241.

Figure 21A:
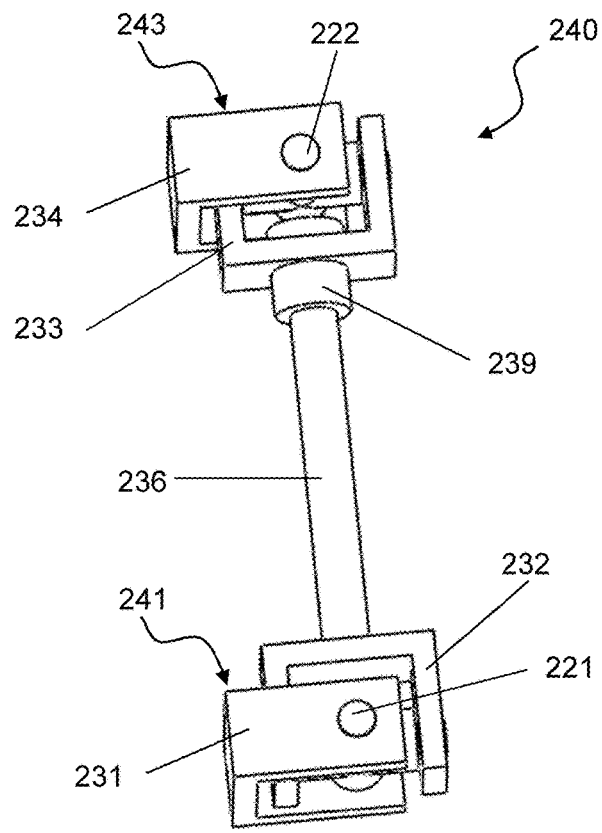
FIGS. 21A-21B show aerial views of a connection mechanism.
Figure 21B:
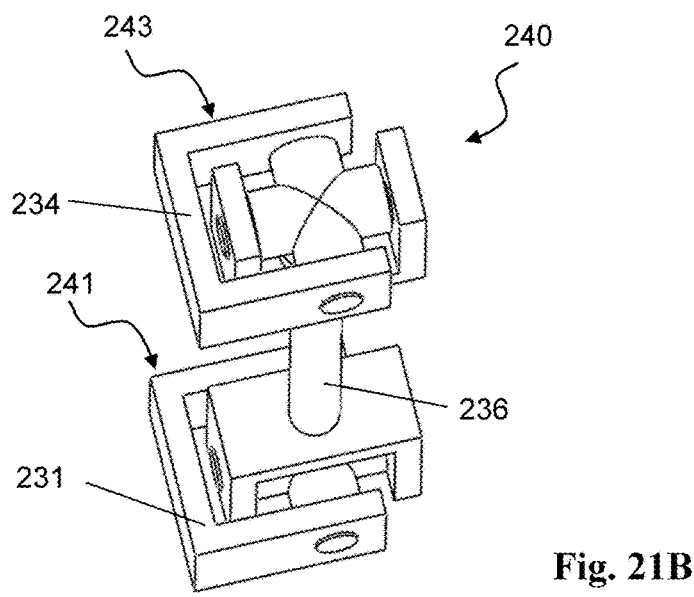
Figure 22:
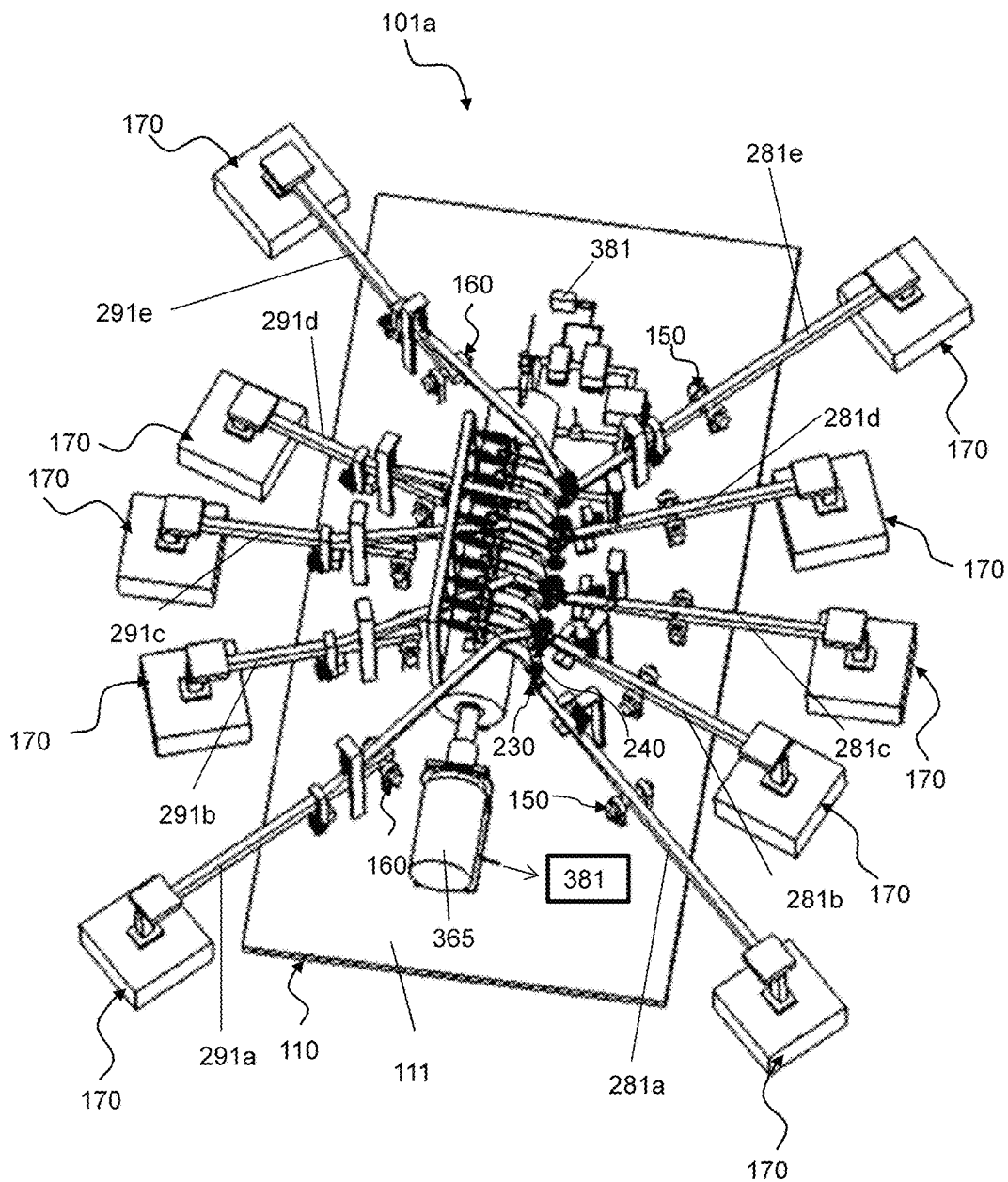
FIG. 22 shows an aerial view of an energy harvesting sub-system.
Figure 23:
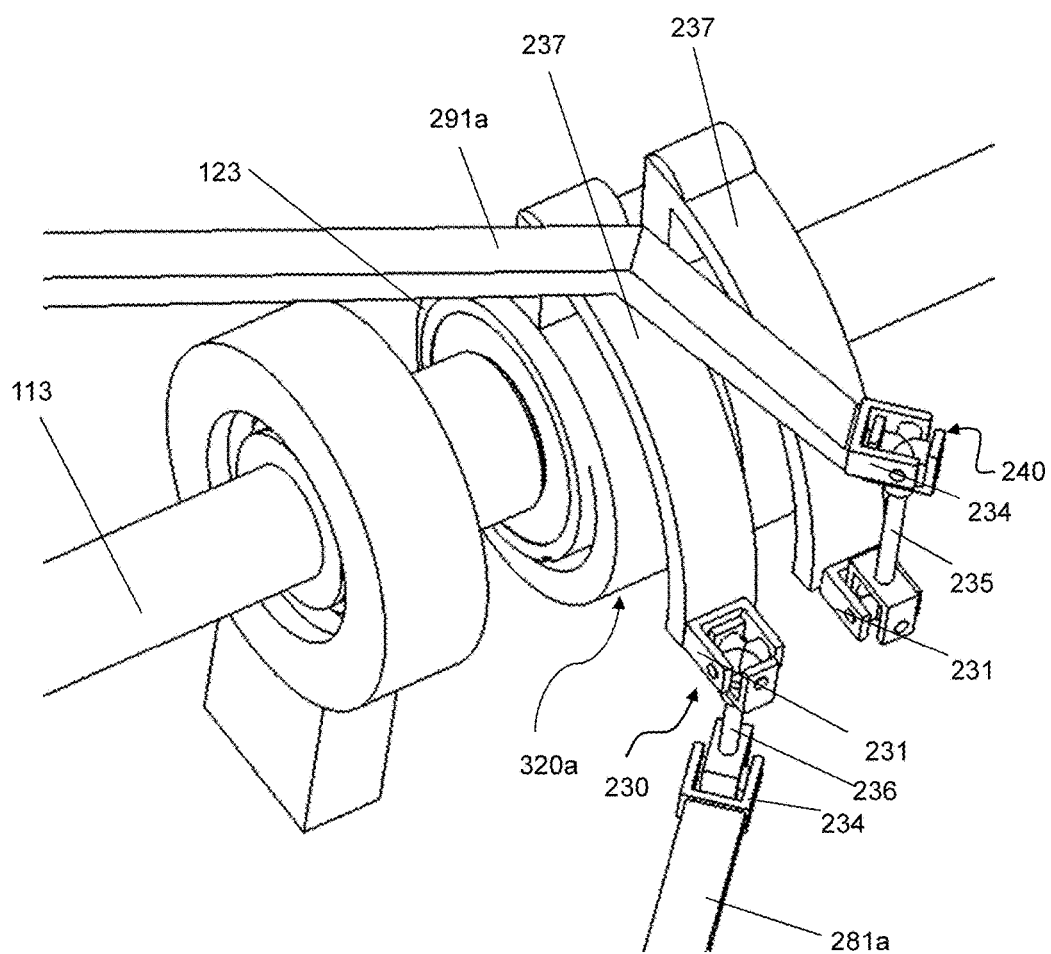
FIGS. 23-26C show aerial views of parts of the energy harvesting sub-system.
Figure 24:
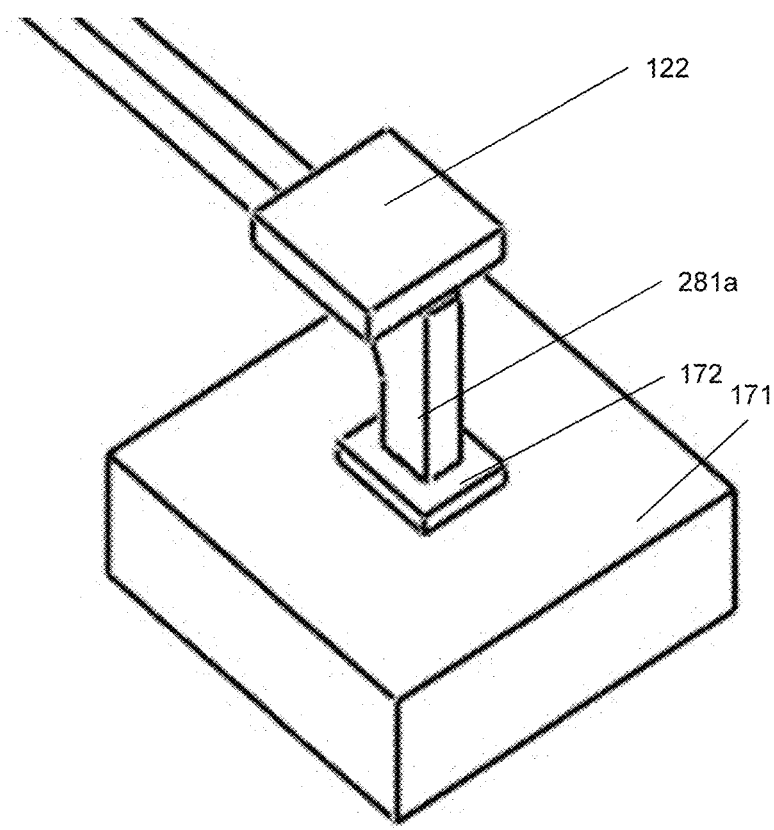

Referring to FIGS. 21A-21B, a connection sub-mechanism 240 comprises: a universal joint 241; a universal joint 243; a rotational mechanism comprising a shaft 236, a bearing housing 239 and a connection configured to constrain the relative movement of the shaft 236 and the bearing housing 239 to a rotation around the axis of the shaft 236. The bearing housing 239 is rigidly joined with the component 232 of the universal joint 241. The shaft 236 is rigidly joined with the component 233 of the universal joint 243.

It should be noted that the connection sub-mechanism 240 is identical to the connection sub-mechanism 230 except the length of the shaft 236 in the mechanism 240 can be different from the length of the shaft 235 in the mechanism 230.

Referring to FIGS. 22-26B, an energy harvesting sub-system 101a comprises: a base apparatus 110, a plurality of floating devices 170, a plurality of rotational mechanisms 150 and 160, a plurality of connection sub-mechanisms 230 and 240, and swing components 281a, 281b, 281c, 281d, 281e, 291a, 291b, 291c, 291d and 291e. The rigid components 153 and 154 in the rotational mechanisms 150 and 160 are all rigidly or otherwise joined with the base support component 111 in the base apparatus 110. The component 231 in each of the connection sub-mechanisms 230 and 240 is rigidly joined with the rigid component 321 of a corresponding freewheel mechanisms 320a. That implies that there is one-to-one correspondence between the connection sub-mechanisms 230 and 240 and the freewheel mechanisms 320a. As explained, one end of each of the swing components 281a, 281b, 281c, 281d and 281e is rigidly connected to the component 234 of the corresponding connection sub-mechanism 230 (see FIG. 23). That implies that there is a one-to-one correspondence between the connection sub-mechanisms 230 and the swing components 281a, 281b, 281c, 281d and 281e. And the other end of the swing component 281x is rigidly connected to the connector 172 of a corresponding floating device 170 (see FIG. 24), where "x" denotes one of the symbols a, b, c, d, and e. A middle part of each of the swing components 281a, 281b, 281c, 281d and 281e is rigidly connected to the shaft 151 of the corresponding rotational mechanism 150. (see FIG. 25A).

Similarly, an end of each of the swing components 291x is rigidly connected to the component 234 of the corresponding connection sub-mechanism 240; and the other end of the swing component 291x is rigidly connected to the connector 172 of the corresponding floating device 170; where "x" denotes one of the symbols a, b, c, d, and e. A middle part of each of the swing components 291a, 291b, 291c, 291d and 291e is rigidly connected to the shaft 151 of a corresponding rotational mechanism 160 (see FIGS. 26A-26B). The energy harvesting sub-system 101a further comprises an electricity generation mechanism 365 configured to generate electricity from the rotation of the shaft 113 relative to the bearing housings 112x, 112y.

The freewheel mechanisms 320a is constructed the same way as the freewheel mechanisms 320 except that the freewheel mechanisms 320a don't have the connector 137.

It should be noted that the swing components 281a, 281b, 281c, 281d, 281e, 291a, 291b, 291c, 291d and 291e may be configured to be relatively long.

Figure 25A:
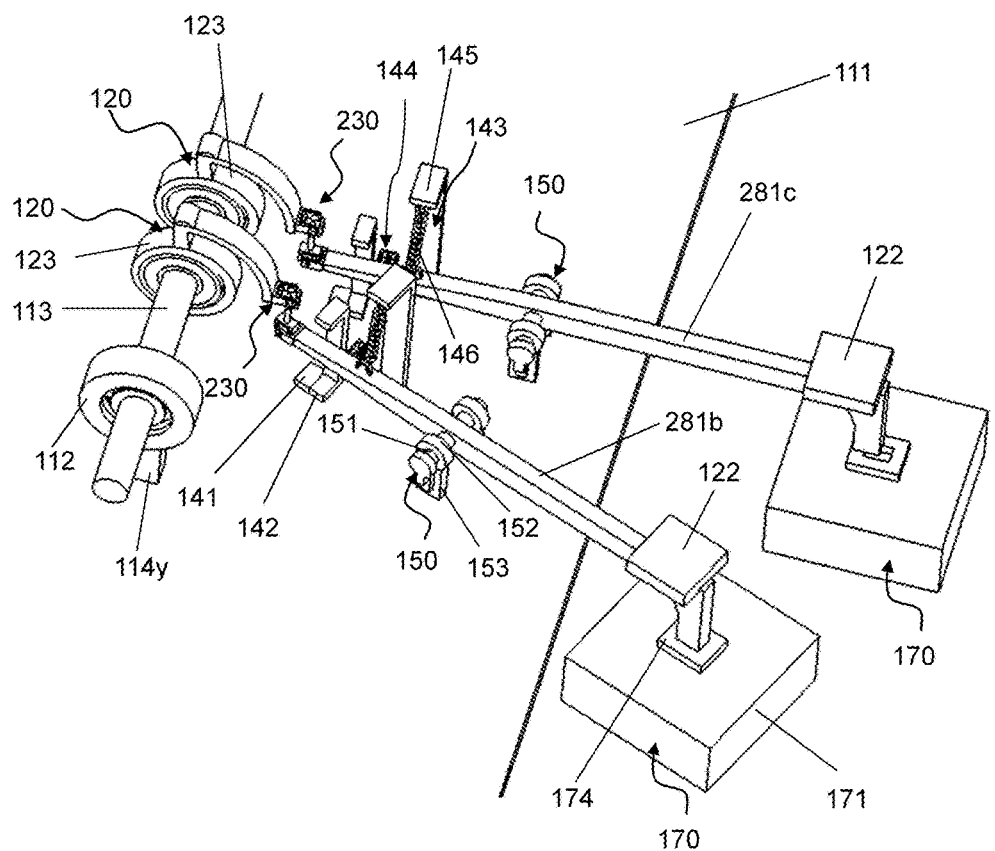

As shown in FIG. 25A, as part of the energy harvesting subsystem 101a, a rotation driving apparatus of type III comprises a freewheel mechanism 320a, the corresponding connection sub-mechanism 230, the corresponding rotational mechanism 150, the corresponding floating device 170, and the corresponding swing component 281x (where x may be one of the letters a, b, c, d and e). As explained, one end of the swing component 281x is rigidly connected to the component 234 of the corresponding connection sub-mechanism 230; and the other end is rigidly connected to the connector 172 of the corresponding floating device 170; and a middle part of the swing component 281x is rigidly connected to the shaft 151 of a corresponding rotational mechanism 150. As explained, the component 231 of the corresponding connection sub-mechanism 230 is configured to be rigidly connected to the rigid component 321 of the corresponding freewheel mechanism 320a; and the inner ring 121b of the corresponding freewheel mechanism 320a is configured to be fixedly connected and concentric with the shaft 113.

Since the connection sub-mechanism 230 connects the rigid component 321 to an end of the corresponding swing component 281x in the rotational mechanism 150, the combination of the rigid component 321, and the connection sub-mechanism 230 connects the end of the swing component 281x to the bearing housing 123 of the freewheel mechanism 320a. The said combination may be referred to as a first connection of the rotation driving apparatus of type III. The connector 172, configured to connect the floating component 171 to the other end of the swing component 281x, may be referred to as a second connection of the rotation driving apparatus of type III.

The rotation driving apparatus of type III further comprises a limiting mechanism 142, an electromagnet 141, a rigid component 145, a spring 146, a locking mechanism 144, and a weight 122. The limiting mechanism 142 comprises physical barriers for the corresponding swing component 281x, as to constrain the swing component 281x to rotate between two end-positions around the axis of the corresponding shaft 151. Thus, the swing components 281x may make a two-way rotation around the axis of the corresponding shaft 151. The physical barriers of the limiting mechanism 142 are configured to be rigidly or elastically connected to the base support component 111. The swing component 281x comprises a ferromagnetic part, and the electromagnet 141 is rigidly connected to the limiting mechanism 142 and is configured to attract the ferromagnetic part of the swing component 281x when needed (see FIG. 25A). The electromagnet 141 may be controlled by a computer so it may be turned on or off. The spring 146 is hooked onto the rigid component 145 which is rigidly or elastically connected to the base support component 111. The spring 146 is configured to be hooked onto the rigid component 145 and onto the swing component 281x, so that the spring 146 pulls (a part of) the swing component 281x upward. When the spring 146 pulls the swing component 281x, the corresponding floating component 171 must be configured to move in a downward direction, and at the same time, the rigid component 321 and the ring 123 of the corresponding freewheel mechanism 320a must be configured to rotate in the positive rotational direction around the axis of the shaft 113. The weight 122 is rigidly connected to the swing component 281x. The weight 122 forces the swing component 281x to rotate in a first rotational direction around the axis of the shaft 151; wherein the first rotational direction is in the clockwise direction around the axis of the corresponding shaft 151, as shown in FIG. 25A. In other words, the torque on the swing component 281x induced by the weight 122 is in the first rotational direction.

The connection comprising the spring device 143 and the connections of the spring device 143 to the corresponding swing component 281x and to the base support component 111 through the bearing housings 152 may be referred to as a third connection of the rotation driving apparatus of type III. The said third connection connects the swing component 281x to the base support component 111. The said third connection is configured to force the corresponding swing component 281x to rotate in the first rotational direction when the corresponding floating device 170 is above water level. In other words, the torque on the swing component 281x induced by the third connection is in the first rotational direction. The corresponding floating component 171 is configured to move in a downward direction when the corresponding swing component 281x rotates in the first rotational direction, and at the same time, the rotation of the corresponding swing component 281x in the first rotational direction is configured to induce a rotation of the second mating part of the corresponding freewheel mechanism 320a in the positive rotational direction around the axis of the first shaft 113 of the base rotational mechanism.

The weight 122 may be considered as an energy storage sub-apparatus of the rotation driving apparatus of type III, see FIG. 25A. When water level below the floating component 171 rises, the floating component 171 is pushed in an upward direction, and thus, the weight 122 is pushed in an upward direction, at which time the swing component 281x is rotated in the direction opposite to the first rotational direction. Potential energy is therefore stored as the weight 122 rises. When the water level recedes and the floating component 171 is no longer pushed by the water below, the weight 122 may drop down and may push the swing component 281x to rotate in the first rotational direction. The other end of the swing component 281x may then go up, thus pulling the first mating part 321 of the corresponding freewheel mechanism 320. The induced torque on the first mating part 321 of the freewheel mechanism 320 is in the positive rotational direction around the axis of the first shaft.

Similarly, the third connection comprising the spring device 143 may also be considered an energy storage sub-apparatus of the rotation driving apparatus of type III, also see FIG. 25A. When water level below the floating component 171 rises, the floating component 171 is pushed in an upward direction, and thus, the spring 146 is stretched, at which time the swing component 281x is rotated in the direction opposite to the first rotational direction. Potential energy is therefore stored as the spring 146 is stretched. When the water level recedes and the floating component 171 is no longer pushed by the water below, the spring 146 may un-stretch and may force the swing component 281x to rotate in the first rotational direction. The other end of the swing component 281x may then go up, thus pulling the first mating part 321 of the corresponding freewheel mechanism 320. The induced torque on the first mating part 321 of the freewheel mechanism 320 is in the positive rotational direction around the axis of the first shaft.

Figure 25B:
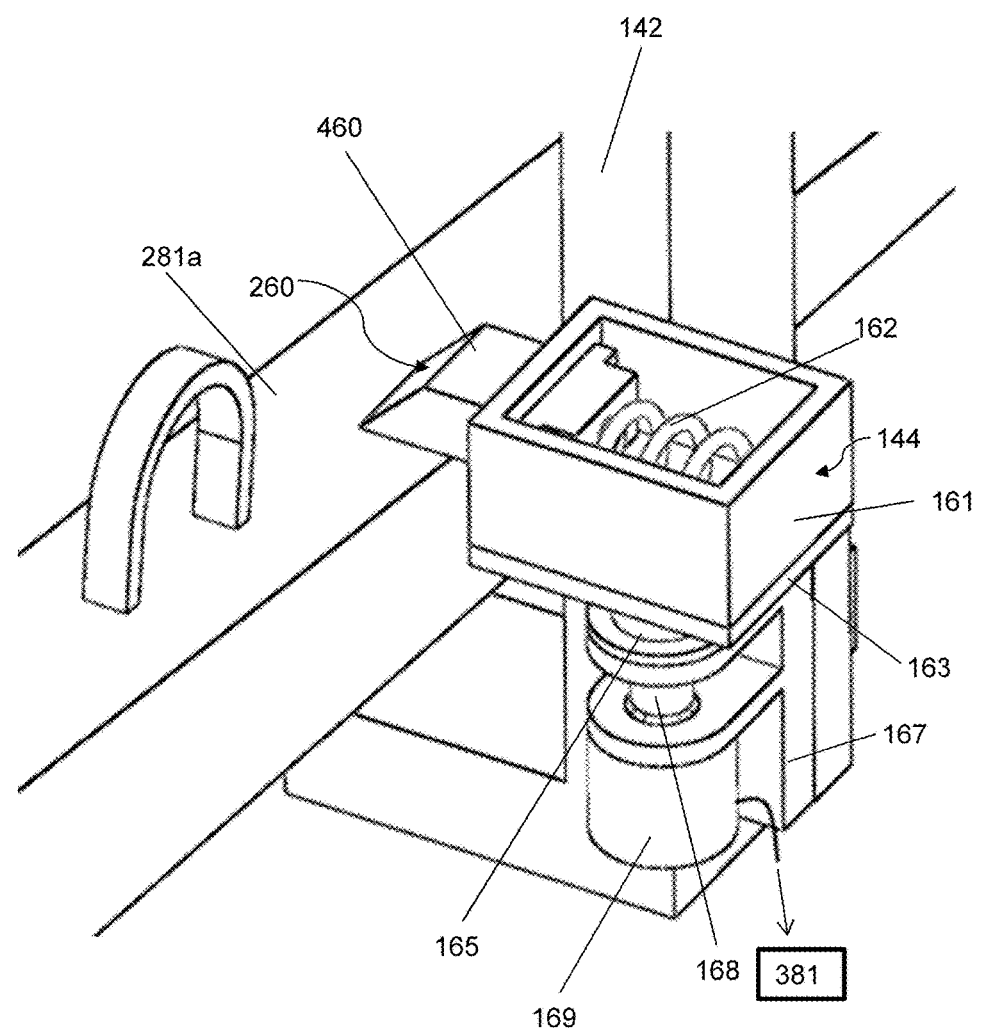

If the first support component 163 of the locking mechanism 144 is moved by the motor 169 to the first end-position, as shown in FIG. 25B, the sliding component 460 is configured to lock the swing component 281x when the floating component 171 is lifted to a sufficiently high position relative to the bearing housing 152. Then, the rotation of the swing component 281x may be stopped. This is needed when the system needs to be stopped during time periods when repairs are needed, or during time periods weather conditions are not desirable. When the first support component 163 is moved to the second end-position, the sliding component 460 is configured to not touch the swing component 281x, and thus does not interfere with the motion of the swing component 281x. We say that the locking mechanism 144 is turned on, if the first support component 163 is moved to the first end-position. We say that the locking mechanism 144 is turned off, if the first support component 163 is moved to the second end-position.

The electromagnet 141 may be turned on or off. When turned on, the electromagnet 141 may attract the swing component 281x by a large enough force, so that the floating component 171 may be lifted to a high position relative to the corresponding bearing housing 152. The electromagnet 141 may be used to stop the motion of the swing component 281x, when it is turned on. If the electromagnet 141 is turned off, then it has no magneticity and does not induce any force on the swing component 281x. The electromagnet 141 may thus function as another locking mechanism. The electromagnetic 141 may be switched on and off at the control of the computer 381, as explained earlier.

In the discussion of the paragraph here, we assume that the locking mechanism 144 and the electromagnet 141 are both turned off, so they do not interfere with the movements of the swing component 281x. When water level below the floating component 171 is receded so that the floating component 171 is entirely above the water level, the swing component 281x, the torque induced by the sum of all forces is configured to be in the first rotational direction around the axis of the corresponding shaft 151. This is a key feature for our invention. In other words, the sum of the torques induced by all forces on the swing component 281x except the force originated from the force on the floating component 171 from the water is in the first rotational direction. Moreover, the magnitude of the torque must be at least equal to a significant percentage, at least 20%, of the maximal possible magnitude of the torque on the swing component induced by the floating component when the floating component is pushed in an upward direction by the water in the nature. This way, a significant amount of potential energy may be stored during time periods when a rising water level pushes the floating component 171 to move in an upward direction.

Figure 26A:
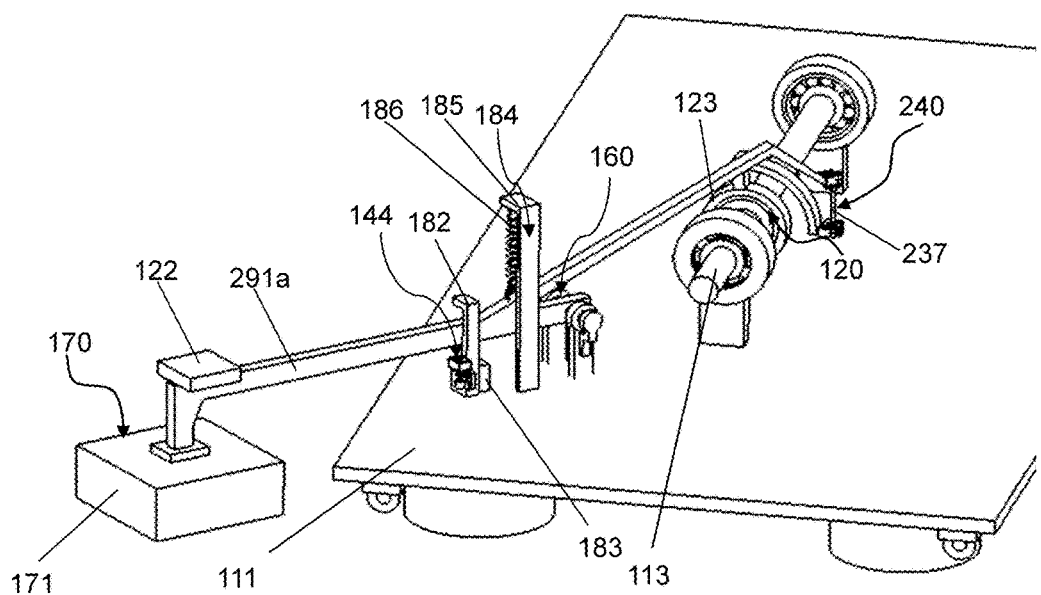
Figure 26B:
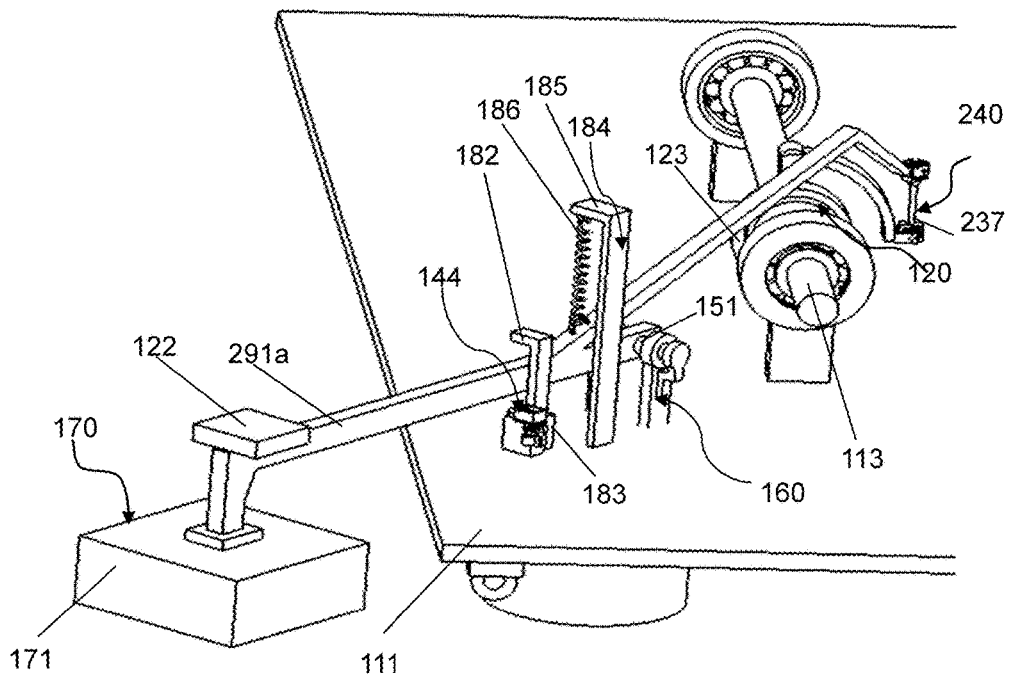

Similarly, as shown in FIGS. 26A-26B, as part of the energy harvesting subsystem 101a, a rotation driving apparatus of type IV comprises the freewheel mechanism 320a, the corresponding connection sub-mechanism 240, the corresponding rotational mechanism 160, the corresponding floating device 170, and the corresponding swing component 291x (where x may be one of the letters a, b, c, d and e). As explained, one end of the swing component 291x is rigidly connected to the component 234 of the corresponding connection sub-mechanism 240; and the other end is rigidly connected to the connector 172 of the corresponding floating device 170; and a middle part of the swing component 291x is rigidly connected to the shaft 151 of the corresponding rotational mechanism 160. As explained, the component 231 of the corresponding connection sub-mechanism 240 is configured to be rigidly connected to the rigid component 321 of the corresponding freewheel mechanism 320a; and the inner ring 121b of the corresponding freewheel mechanism 320a is configured to be fixedly connected and concentric with the shaft 113.

Since the connection sub-mechanism 240 connects the rigid component 321 to an end of the corresponding swing component 291x in the rotational mechanism 160, the combination of the rigid component 321, and the connection sub-mechanism 240 connects the end of the swing component 291x to the bearing housing 123 of the freewheel mechanism 320a. The said combination may be referred to as a first connection of the rotation driving apparatus of type IV. The connector 172, configured to connect the floating component 171 to the other end of the swing component 291*x*, may be referred to as a second connection of the rotation driving apparatus of type IV.

The rotation driving apparatus of type IV further comprises a limiting mechanism 182, an electromagnet 183, a rigid component 185, a spring 186, a locking mechanism 144, and a weight 122. The limiting mechanism 182 comprises physical barriers for the corresponding swing component 291*x*, as to constrain the swing component 291*x* to rotate between two end-positions around the axis of the corresponding shaft 151. Thus, the swing components 291*x* may make a two-way rotation around the axis of the corresponding shaft 151. The physical barriers of the limiting mechanism 182 are configured to be rigidly or elastically connected to the base support component 111. The swing component 291*x* comprises a ferromagnetic part, and the electromagnet 183 is rigidly connected to the limiting mechanism 182 and is configured to attract the ferromagnetic part of the swing component 291*x* when needed (see FIGS. 26A-26B). The electromagnet 183 may be controlled by a computer so it may be turned on or off. The spring 186 is hooked onto the rigid component 185 which is rigidly or elastically connected to the base support component 111. The spring 186 is configured to be hooked onto the rigid component 185 and the swing component 291*x*, so that the spring 186 pulls (a part of) the swing component 291*x* upward. When the spring 186 pulls the swing component 291*x*, the corresponding floating component 171 must be configured to move in a downward direction, and at the same time, the rigid component 321 and the ring 123 of the corresponding freewheel mechanism 320*a* must be configured to rotate in the positive rotational direction around the axis of the shaft 113. The weight 122 is rigidly connected to the swing component 291*x*. The weight 122 forces the swing component 291*x* to rotate in a first rotational direction around the axis of the shaft 151; wherein the first rotational direction is in the counter-clockwise direction around the axis of the corresponding shaft 151, as shown in FIG. 26B. In other words, the torque on the swing component 291*x* induced by the weight 122 is in the first rotational direction.

The connection comprising the spring device 184 and the connections of the spring device 184 to the corresponding swing component 291*x* and to the base support component 111 through the bearing housings 152 may be referred to as a third connection of the rotation driving apparatus of type IV. The said third connection connects the swing component 291*x* to the base support component 111. The said third connection is configured to force the corresponding swing component 291*x* to rotate in the first rotational direction when the corresponding floating device 170 is above water level. In other words, the torque on the swing component 291*x* induced by the third connection is in the first rotational direction. The corresponding floating component 171 is configured to move in a downward direction when the corresponding swing component 291*x* rotates in the first rotational direction, and at the same time, the rotation of the corresponding swing component 291*x* in the first rotational direction is configured to induce a rotation of the second mating part of the corresponding freewheel mechanism 320*a* in the positive rotational direction around the axis of the first shaft 113 of the base rotational mechanism.

The weight 122 may be considered as an energy storage sub-apparatus of the rotation driving apparatus of type IV, see FIG. 26B. When water level below the floating component 171 rises, the floating component 171 is pushed in an upward direction, and thus, the weight 122 is pushed in an upward direction, at which time the swing component 291*x* is rotated in the direction opposite to the first rotational direction. Potential energy is therefore stored as the weight 122 rises. When the water level recedes and the floating component 171 is no longer pushed by the water below, the weight 122 may drop down and may push the swing component 291*x* to rotate in the first rotational direction. The other end of the swing component 291*x* may then go up, thus pulling the first mating part 321 of the corresponding freewheel mechanism 320. The induced torque on the first mating part 321 of the freewheel mechanism 320 is in the positive rotational direction around the axis of the first shaft.

Similarly, the third connection comprising the spring device 184 may also be considered an energy storage sub-apparatus of the rotation driving apparatus of type IV, also see FIG. 26B. When water level below the floating component 171 rises, the floating component 171 is pushed in an upward direction, and thus, the spring 186 is stretched, at which time the swing component 291*x* is rotated in the direction opposite to the first rotational direction. Potential energy is therefore stored as the spring 186 is stretched. When the water level recedes and the floating component 171 is no longer pushed by the water below, the spring 186 may un-stretch and may force the swing component 291*x* to rotate in the first rotational direction. The other end of the swing component 291*x* may then go up, thus pulling the first mating part 321 of the corresponding freewheel mechanism 320. The induced torque on the first mating part 321 of the freewheel mechanism 320 is in the positive rotational direction around the axis of the first shaft.

Figure 26C:
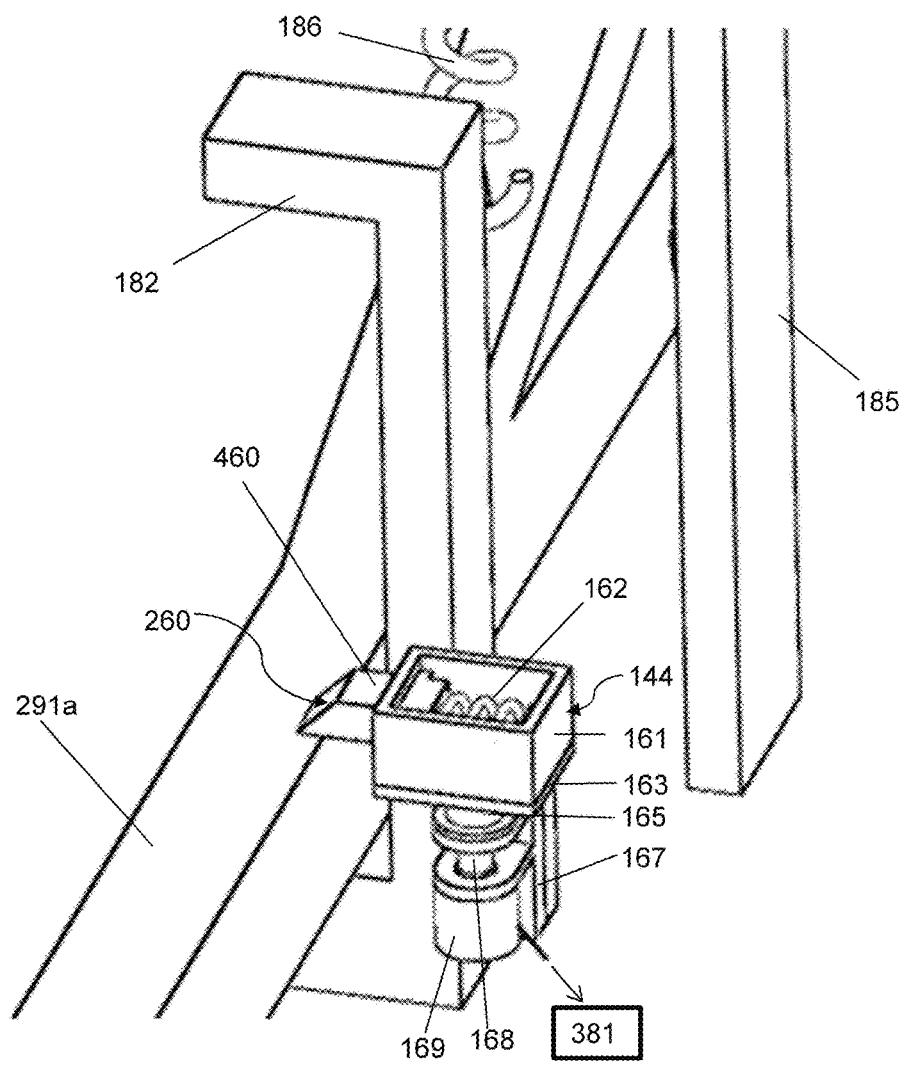

If the first support component 163 of the locking mechanism 144 is moved by the motor 169 to the first end-position, as shown in FIG. 26C, the sliding component 460 is configured to lock the swing component 291*x* when the floating component 171 is lifted to a sufficiently high position relative to the bearing housing 152. Then, the rotation of the swing component 291*x* may be stopped. This is needed when the system needs to be stopped during time periods when repairs are needed, or during time periods weather conditions are not desirable. When the first support component 163 is moved to the second end-position, the sliding component 460 is configured to not touch the swing component 291*x*, and thus does not interfere with the motion of the swing component 291*x*. We say that the locking mechanism 144 is turned on, if the first support component 163 is moved to the first end-position. We say that the locking mechanism 144 is turned off, if the first support component 163 is moved to the second end-position.

The electromagnet 183 may be turned on or off. When turned on, the electromagnet 183 may attract the swing component 291*x* by a large enough force, so that the floating component 171 may be lifted to a high position relative to the corresponding bearing housing 152. The electromagnet 183 may be used to stop the motion of the swing component 291*x*, when it is turned on. If the electromagnet 183 is turned off, then it has no magneticity and does not induce any force on the swing component 291*x*. The electromagnet 183 may thus function as another locking mechanism. The electromagnetic 183 may be switched on and off at the control of the computer 381, as explained earlier.

In the discussion of the paragraph here, we assume that the locking mechanism 144 and the electromagnet 183 are both turned off, so they do not interfere with the movements of the swing component 291*x*. When water level below the floating component 171 is receded so that the floating component 171 is entirely above the water level, the swing component 291x, the torque induced by the sum of all forces is configured to be in the first rotational direction around the axis of the corresponding shaft 151. This is a key feature for our invention. In other words, the sum of the torques induced by all forces on the swing component 291x except the force originated from the force on the floating component 171 from the water is in the first rotational direction. Moreover, the magnitude of the torque must be at least equal to a significant percentage, at least 20%, of the maximal possible magnitude of the torque on the swing component induced by the floating component when the floating component is pushed in an upward direction by the water in the nature. This way, a significant amount of potential energy may be stored during time periods when a rising water level pushes the floating component 171 to move in an upward direction.

Each of the swing components 281a, 281b, 281c, 281d, 281e, 291a, 291b, 291c, 291d and 291e, and the corresponding shaft 151 in the system 101a, rigidly joined together, may be combined into a single rigid component, referred to as a rotatable component. The rotatable component is rotatable relative to the bearing housings 152 around the axis of the shaft 151.

It should be noted that the connection sub-mechanisms 230 and 240 in the system 101a may be substituted by other types of connection sub-mechanisms.

Figure 27A:
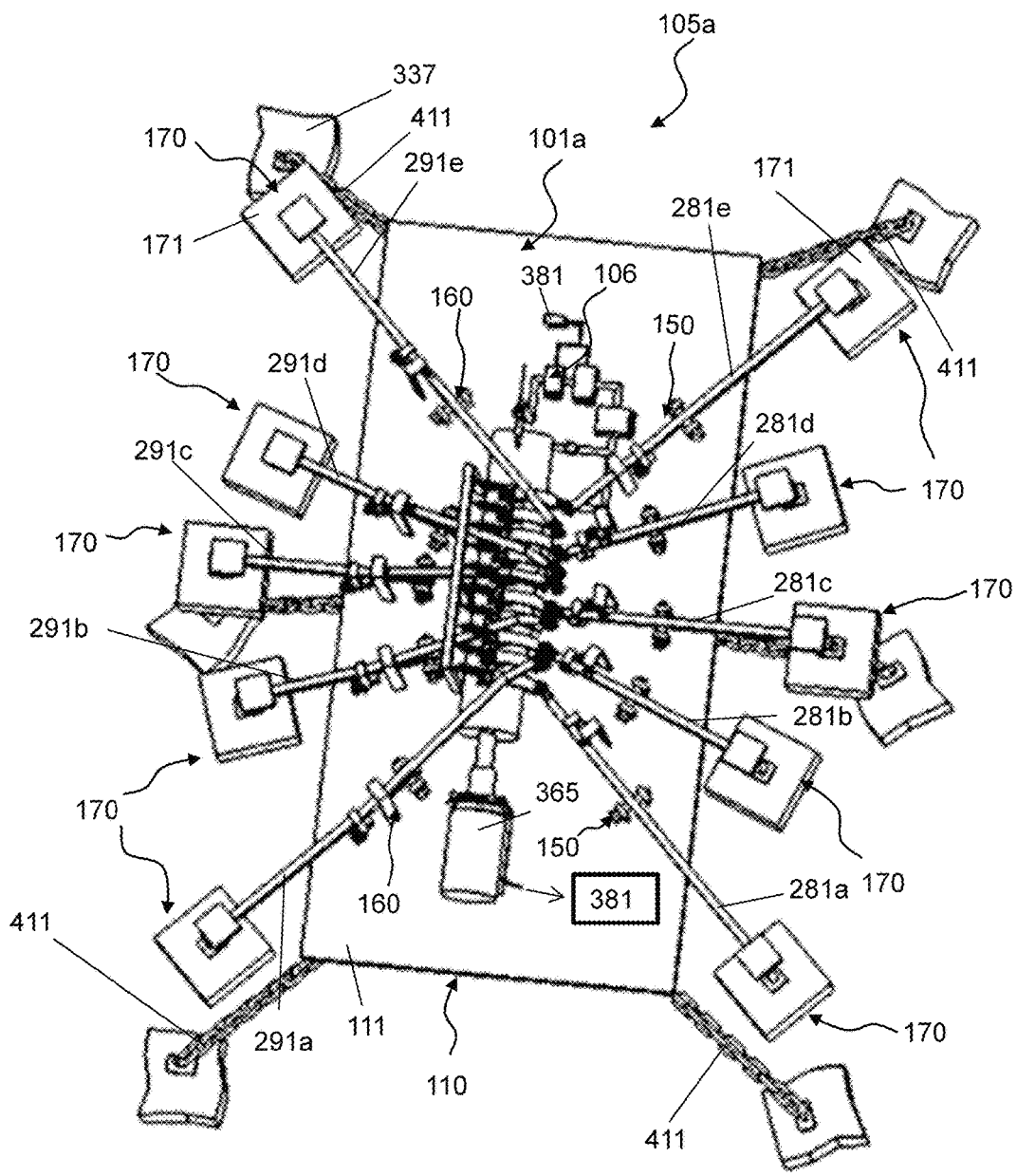
FIG. 27A shows an aerial view of an energy harvesting system.

Referring to FIG. 27A, an energy harvesting system 105a is constructed the same way as the energy harvesting system 105 except that the energy harvesting sub-system 101 is substituted by the energy harvesting sub-system 101a. Indeed, the energy harvesting system 105a comprises an energy harvesting sub-system 101a, a lubrication system 106 and an electricity generation mechanism 365. The sealed enclosure 335 of the lubrication system 106 is fixedly connected to the connectors 114x, 114y of the base apparatus 110 of the energy harvesting sub-system 101a, as the energy harvesting system 105. The sealed enclosure 335 is configured to wrap the shaft 113 and the bearing housings 112x, 112y of the energy harvesting sub-system 101a, wherein the axis of the sealed enclosure 335 is concentric with the shaft 113. The sealed enclosure 335 may also wrap the bearing housings 123, the one-way freewheel clutch bearings 121 and a part of the rigid components 321 of the freewheel mechanisms 320a. The rigid component 321 of each freewheel mechanism 320a may be configured to pass through a corresponding square hole 335a of the sealed enclosure 335. The refrigeration mechanism 333, the pump 331, the filter 332 in the lubrication system 106 are mounted on the based support component 111. The electricity generation mechanism 365 is connected to the shaft 113 of the base apparatus 110 and the rotation of the shaft 113 of the base apparatus 110 may be converted into electricity by the electricity generation mechanism 365.

The energy harvesting system 105a may also comprises a plurality of hooks 390; a plurality of hooks 420 and a plurality of chains 411 comprising a plurality of links 411 (FIGS. 18D-18E). The hook 390 comprises a base component 391; a ring 393 and a connector 392, wherein the base component 391 is rigidly connected with the base support component 111 of the energy harvesting sub-system 101a; wherein the connector 392 is configured to rigidly connect the ring 393 and the base component 391. Similarly, the hook 420 comprises a base component 421; a ring 423 and a connector 422, wherein the base component 421 is rigidly connected with the ground 431; wherein the connector 422 is configured to rigidly connect the ring 423 and the base component 421. An end of each chain 411 is linked or hooked to the ring 393 of a hook 390, and the other end of the chain 411 is linked or hooked to the ring 423 of a hook 420. Thus, the base support component 111 of the energy harvesting sub-system 101a may be connected to the ground 431. The length of the chains 411 may further be configured to be adjustable in accordance with tide. When tide rises, the chains 411 may be adjusted to be longer. It should be noted the chains 411 may be substituted by cables, ropes, wires, etc.

In the energy harvesting system 105a, when water level rises near a floating component 171 of a rotation driving apparatus of either type, the floating component 171 is pushed by the water in an upward direction, and this induces a rotation of the swing component 281x or 291x of the rotation driving apparatus and the other end of the swing component 281x or 291x (opposite end of the floating device) is pushed in a downward direction. This induces a rotation in the negative direction in the first mating part (relative to the first mating part) of the freewheel mechanism 320a of the rotation driving apparatus. The first mating part is fixedly connected with the first shaft in the base rotational mechanism, and the first shaft should rotate in the positive rotational direction relative to the base support component 111. A rotation in the negative direction in the first mating part of the freewheel mechanism 320a does not produce a significant force in the first shaft of the base rotational mechanism. As we explained earlier, the second mating part is free to rotate in the negative direction relative to the first mating part in the freewheel mechanism.

Next, when water level falls sufficiently enough near the above mentioned floating component 171, the floating component 171 may be positioned above water level. Then, the swing component 281x or 291x (where x can be one of the letters a, b, c, d, or e), due to the weight 122 and/or the force of the spring 146 or 186, is configured to rotate so that the floating component 171 may move in a downward direction, and the other end of the rotatable component 281x or 291x (i.e., opposite of the floating device) may move in an upward direction. Thus, the first mating part of the freewheel mechanism 320a may rotate in the positive rotational direction around the base axis. As a consequence, the second mating part of the freewheel mechanism 320a, and hence the first shaft must also rotate in the positive rotational direction at a speed which is bigger than or equal to the speed of the first mating part of the freewheel mechanism 320a. The energy stored by the weight or the spring may then be released as to force the rotation of the first shaft in the positive rotational direction.

The positive direction rotation of the shaft 113 relative to the bearing housing 112x, 112y may further drive the electricity generation mechanism 365 to generate electricity. The lubrication system 106 may be configured to lubricate and cool the shaft 113, the bearing housings 112x, 112y, the freewheel mechanisms 320a etc., which are contained in the interior of the sealed enclosure 335 of the lubrication system 106.

Figure 27B:
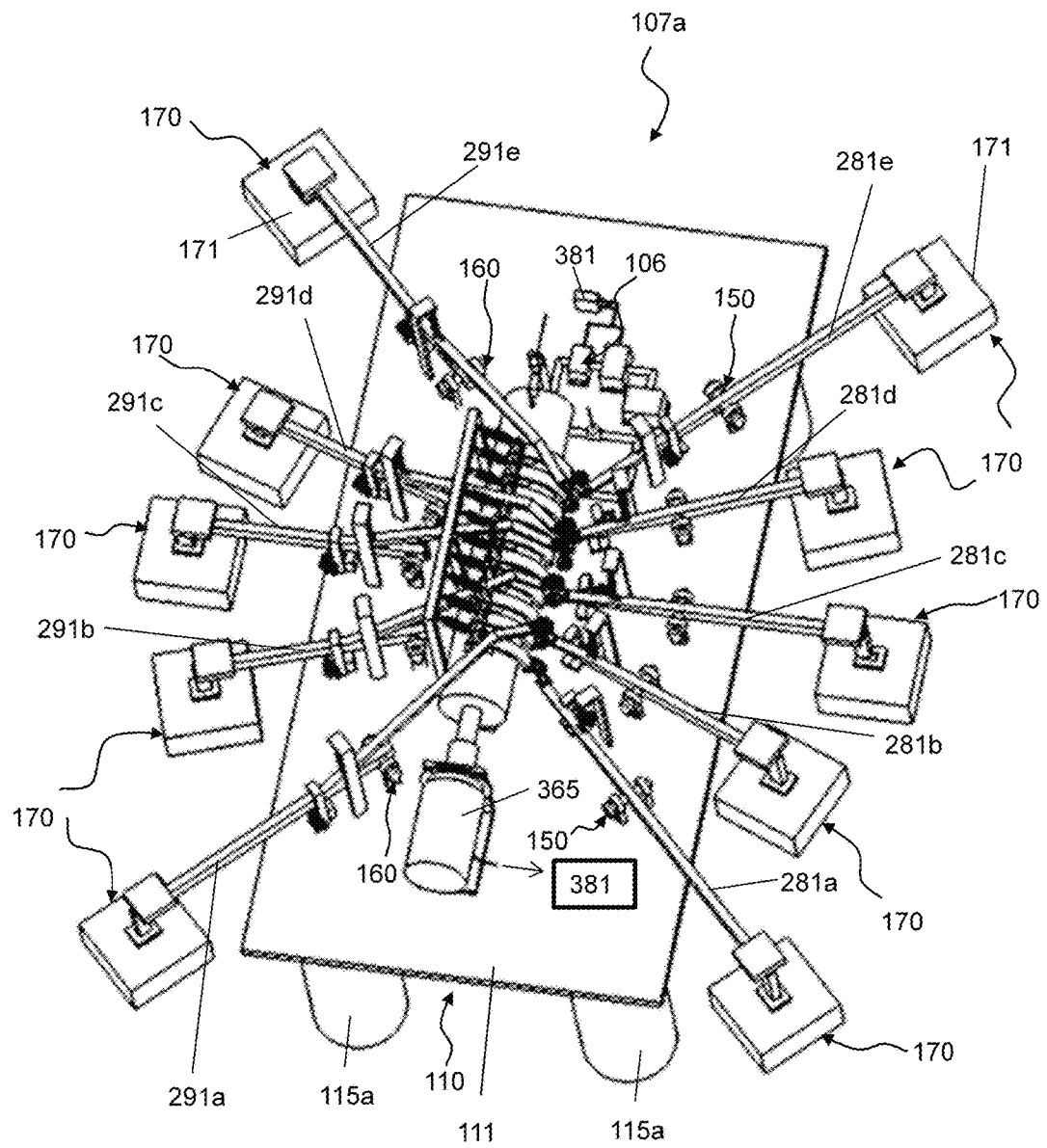
FIG. 27B shows an aerial view of another energy harvesting system.

Referring to FIG. 27B, an energy harvesting system 107a comprises an energy harvesting sub-system 101a and a plurality of support components 115a which are configured to fixedly connect the base support component 111 to the ground. The energy harvesting system 107a is constructed the same way as the energy harvesting system 105a except that the connectors 410 and buoys 138 are substituted by the support components 115a. It should be noted that the support components 115a may be configured to have other geometric shapes. A cross section of each of the support components 115a may be configured to be round, oval, polygonal, etc.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Our energy harvesting system may comprise a wire, a cable, a chain, a rope, a plurality of hooks, a universal joint or other types of joint, etc., to reinforce or stabilize various components, mechanisms, apparatuses, or their connections.

In some embodiments, the components in the above systems may be configured to be durable. They may be configured to be elastic with high enough yield strength. The surface of the components may be treated, as to become anti-corrosive and heat resistant.

It should be noted that the components of the above systems may be exposed to stress, corrosion, temperature changes, and other harshness in the nature. These components may be treated for anti-corrosion and other purposes, using known techniques.

A cable in the above systems may be made of steel or resistant alloy or other known materials, of high durability and elasticity, and/or treated by known techniques.

For the purpose of the present patent application, a bearing in the present patent application can be a ball bearing, a roller bearing (e.g., a tapered roller bearing), or other type of bearing.

A connector, a rod, a beam, a frame, a shaft, a bearing housing, a cable, a wire, a hook, a support component, a rigid component or any other component in any of the above described systems or apparatuses may be made from materials which are commonly used for a wind or water turbine of any type. They include various metals or alloys, carbon fiber or carbon-glass-hybrid, glass fiber or other types of fiber, or other materials new or old, etc. For example, a swing component in an angle varying apparatus (or in an energy harvesting system) described above can comprise a strong, lightweight carbon fiber or carbon-glass-hybrid blade.

In theory, all solid materials may be elastically deformed under stress, and thus any component in our system may be elastically deformed when the component is under stress. A rigid component in our systems is a solid which is "rigid" in the sense that its elastic deformation is negligible.

A swing component may be any type of solid. Typically, a swing component is made by steel, or metal, or alloys, and is treated for corrosion resistance.

Many of the components of our energy harvesting systems may be treated for corrosion resistance.

For the purpose of the present patent application, different rigid parts which are rigidly connected to each other may be combined into a single rigid part.

A mating part in the present patent application can be any rigid component.

It should be noted that the axis of the base rotational mechanism may be configured to be horizontal; although this is not a strict requirement.

It should be noted that an electricity generating mechanism in the systems described above may comprise a gearbox, similarly as in some of the known wind turbines.

Only a few examples and implementations are described. Other implementations, variations, modifications and enhancements to the described examples and implementations may be made without deviating from the spirit of the present invention.

What is claimed is:

1. An energy harvesting system comprising:
   a base support component;
   a first shaft comprising an axis, wherein the movement of said first shaft is constrained to be a rotation around said axis relative to the base support component;
   a positive rotational direction around the axis of the first shaft;
   an electric generator configured to generate electricity from the rotation of the first shaft around the axis of the first shaft;
   a plurality of rotation driving apparatuses, each comprising:
      a freewheel mechanism comprising a first mating part, a second mating part and a connection configured to constrain the relative movement of the first and second mating parts to a rotation around the axis of the first shaft, wherein the rotation of the first mating part relative to the second mating part in the positive direction is configured to be restricted or limited, wherein the second mating part of the freewheel mechanism is fixedly connected to the first shaft;
      a swing component and a corresponding mating part, wherein the swing component is configured to make a back-and-forth motion relative to the corresponding mating part, wherein the mating part is configured to be connected to the base support component;
      a floating component comprising a buoy, wherein the floating component is configured to touch a body of water in the nature during some time periods;
      a first connection mechanism configured to connect the swing component with the first mating part of the freewheel mechanism, wherein the first connection mechanism comprises one of:
         a first pair of linked or hooked rings, a second pair of linked or hooked rings, and a connector joining the first and second pairs of rings, or
         a first universal joint, a second universal joint, and an axial rotational mechanism joining the first and second universal joints;
      a second connection mechanism configured to connect the swing component with the floating component;
      wherein a rotation of the swing component in a first rotational direction is configured to induce a rotation of the second mating part of the freewheel mechanism in the positive rotational direction around the axis of the first shaft;
      wherein the swing component is configured to rotate in the direction opposite to the first rotational direction when the floating component is pushed up by a rising water.

2. The energy harvesting system of claim 1, further comprising a connection of the base support component to the ground by chains or cables.

3. The energy harvesting system of claim 1, wherein the mating part of the swing component of each rotation driving apparatus is configured to be rigidly or elastically connected to the base support component.

4. The energy harvesting system of claim 1, wherein each rotation driving apparatus further comprises a limiting mechanism comprising physical barriers configured to limit the range of the rotation of the swing component relative to the corresponding mating part.

5. The energy harvesting system of claim 1 further comprising a computer, wherein each rotation driving apparatus further comprises a locking mechanism configured to lock the rotation of the swing component under the control of the computer, said locking mechanism comprising:
- a locking device with a bevel face;
- a first support component;
- a motion mechanism configured to move the first support component, wherein the motion mechanism is configured to be connected to the computer;
- wherein the locking device is movable relative to the first support component.

6. The energy harvesting system of claim 1, further comprising an enclosure configured to be fixedly connected to the base support component, wherein said enclosure is configured to hold a lubricating liquid which lubricates and cools down bearings of the first shaft and the freewheel mechanisms of the rotation driving apparatuses.

7. The energy harvesting system of claim 6, further comprising:
- a computer;
- a pump configured to draw the lubricating liquid from the enclosure and to feed the lubricating liquid back to the enclosure, wherein the pump is configured to be connected to the computer; and
- a filter configured to filter the lubricating liquid.

8. The energy harvesting system of claim 6, further comprising:
- a computer; and
- a refrigeration mechanism configured to cool down the lubricating liquid, wherein the refrigeration mechanism is configured to be connected to the computer.

9. The energy harvesting system of claim 1, wherein the second connection mechanism of each rotation driving apparatus is configured to rigidly connect an end of the swing component to a part of the floating component.

10. The energy harvesting system of claim 1, wherein the axis of rotation of the swing component in each rotation driving apparatus is configured to not coincide with the axis of the first shaft.

11. The energy harvesting system of claim 1, wherein the axis of rotation of the swing component in each rotation driving apparatus is configured to be parallel to the axis of the first shaft.

12. The energy harvesting system of claim 1, wherein the base support component is configured to be floated on water.

13. The energy harvesting system of claim 1, wherein the axis of rotation of the swing component in each rotation driving apparatuses is configured to be coplanar with the axis of the first shaft.

14. The energy harvesting system of claim 1, wherein the axis of rotation of the swing component in one of the rotation driving apparatuses is configured to be parallel with the axis of the first shaft.

15. The energy harvesting system of claim 1, wherein the second connection mechanism in one of the rotation driving apparatuses is configured to rigidly connect an end of the swing component to the floating component of the rotation driving apparatus.

16. The energy harvesting system of claim 1, wherein the first second mating part of the freewheel mechanism in each rotation driving apparatus is configured to be rigidly connected to the first shaft.

17. The energy harvesting system of claim 1, wherein each rotation driving apparatus further comprises a spring or weight, wherein the spring or the weight is configured to exert a force on the second mating part so that the induced torque on the second mating part is in the positive rotational direction around the axis of the first shaft.

18. An energy harvesting system comprising:
- a base support component;
- a first shaft comprising an axis, wherein the movement of said first shaft is constrained to be a rotation around said axis relative to the base support component;
- a positive rotational direction around the axis of the first shaft;
- a plurality of rotation driving apparatuses, each comprising:
  - a freewheel mechanism comprising a first mating part, a second mating part and a connection configured to constrain the relative movement of the first and second mating parts to a rotation around the axis of the first shaft, wherein the rotation of the first mating part relative to the second mating part in the positive direction is configured to be restricted or limited;
  - a connection of the second mating part of the freewheel mechanism with the first shaft;
  - a swing component and a corresponding mating part, wherein the swing component is configured to make a back-and-forth motion relative to the corresponding mating part, wherein the mating part is configured to be connected to the base support component;
  - a floating component comprising a buoy, wherein the floating component is configured to touch a body of water in the nature during some time periods;
  - a first connection mechanism configured to connect the swing component with the first mating part of the freewheel mechanism, wherein the first connection mechanism comprises one of:
    - a first pair of linked or hooked rings, a second pair of linked or hooked rings, and a connector joining the first and second pairs of rings, or
    - a first universal joint and a second universal joint, and an axial rotational mechanism joining the first and second universal joints;
  - a second connection mechanism configured to connect the swing component with the floating component.

* * * * *